(12) United States Patent  
Peterson et al.

(10) Patent No.: US 8,508,383 B2  
(45) Date of Patent: Aug. 13, 2013

(54) INTERIOR REARVIEW MIRROR SYSTEM

(75) Inventors: Kenneth C. Peterson, Ada, MI (US); Keith D. Foote, Grand Rapids, MI (US); Richard R. Hook, Hudsonville, MI (US); Eric S. Deuel, Allendale, MI (US); Niall R. Lynam, Holland, MI (US)

(73) Assignee: Magna Mirrors of America, Inc, Holland, MI (US)

( * ) Notice: Subject to any disclaimer, the term of this patent is extended or adjusted under 35 U.S.C. 154(b) by 0 days.

(21) Appl. No.: 13/429,544

(22) Filed: Mar. 26, 2012

(65) Prior Publication Data

US 2012/0182141 A1 Jul. 19, 2012

Related U.S. Application Data

(63) Continuation of application No. 12/414,190, filed on Mar. 30, 2009, now Pat. No. 8,154,418.

(60) Provisional application No. 61/040,902, filed on Mar. 31, 2008, provisional application No. 61/048,687, filed on Apr. 29, 2008, provisional application No. 61/050,810, filed on May 6, 2008, provisional application No. 61/098,431, filed on Sep. 19, 2008, provisional application No. 61/112,436, filed on Nov. 7, 2008.

(51) Int. Cl.
  *G08B 5/00* (2006.01)
  *B60Q 1/00* (2006.01)
  *H04N 7/18* (2006.01)

(52) U.S. Cl.
  USPC .................. 340/815.4; 340/425.5; 340/438; 348/148; 362/494; 359/838

(58) Field of Classification Search
  USPC ........................................ 340/815.4
  See application file for complete search history.

(56) References Cited

U.S. PATENT DOCUMENTS 1,096,452 A 5/1914 Perrin
1,563,258 A 11/1925 Cunningham
(Continued)

FOREIGN PATENT DOCUMENTS

AU A-40317/95 2/1995
CN 1189224 7/1998
(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — Donnie Crosland
(74) *Attorney, Agent, or Firm* — Gardner, Linn, Burkhart & Flory, LLP

(57) ABSTRACT

An interior rearview mirror system of a vehicle includes an interior rearview mirror assembly having an electro-optic reflective element. The reflective element includes (i) an electro-optic active region where an electro-optic medium is disposed and is bounded by a perimeter seal and (ii) a user input region outboard of the electro-optic active region. At least one backlit user input, such as a capacitive touch sensor, is disposed at the reflective element at the user input region and outboard of the perimeter seal and the electro-optic medium. A control is operable to determine a location of a touch or proximity of a finger of a user that is at or near the first surface of the front substrate at the user input region, and the control generates an output signal indicative of a determined touch or proximity of a finger of a user.

20 Claims, 36 Drawing Sheets

(56) References Cited

U.S. PATENT DOCUMENTS

| | | |
|---|---|---|
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,664,479 A | 5/1987 | Hiroshi |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |

| | | |
|---|---|---|
| 4,781,436 A | 11/1988 | Armbruster |
| 4,789,774 A | 12/1988 | Koch et al. |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,989,956 A | 2/1991 | Wu et al. |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jerkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,166,815 A | 11/1992 | Elderfield |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinami et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |

| Patent No. | Date | Name |
|---|---|---|
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,519,621 A | 5/1996 | Worthman |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenck et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,621,571 A | 4/1997 | Bantli et al. |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |

| | | |
|---|---|---|
| 5,686,975 A | 11/1997 | Lipton |
| 5,686,979 A | 11/1997 | Weber et al. |
| 5,689,241 A | 11/1997 | Clarke, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| D394,833 S | 6/1998 | Muth |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A | 12/1998 | Van Ryzin |
| 5,848,373 A | 12/1998 | DeLorme et al. |
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,942,895 A | 8/1999 | Popovic et al. |
| 5,947,586 A | 9/1999 | Weber |
| 5,949,331 A | 9/1999 | Schofield et al. |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,975,715 A | 11/1999 | Bauder |
| 5,984,482 A | 11/1999 | Rumsey et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,983 A | 12/1999 | Alland et al. |
| 6,005,724 A | 12/1999 | Todd |
| 6,007,222 A | 12/1999 | Thau |
| 6,008,486 A | 12/1999 | Stam et al. |
| 6,008,871 A | 12/1999 | Okumura |
| 6,009,359 A | 12/1999 | El-Hakim et al. |
| 6,016,035 A | 1/2000 | Eberspächer et al. |
| 6,016,215 A | 1/2000 | Byker |
| 6,019,411 A | 2/2000 | Carter et al. |
| 6,019,475 A | 2/2000 | Lynam et al. |
| 6,020,987 A | 2/2000 | Baumann et al. |
| 6,021,371 A | 2/2000 | Fultz |

| | | | | | | |
|---|---|---|---|---|---|---|
| 6,023,229 A | 2/2000 | Bugno et al. | | 6,148,261 A | 11/2000 | Obradovich et al. |
| 6,025,872 A | 2/2000 | Ozaki et al. | | 6,149,287 A | 11/2000 | Pastrick et al. |
| 6,028,537 A | 2/2000 | Suman et al. | | 6,150,014 A | 11/2000 | Chu et al. |
| 6,037,689 A | 3/2000 | Bingle et al. | | 6,151,065 A | 11/2000 | Steed et al. |
| 6,040,939 A | 3/2000 | Demiryont et al. | | 6,151,539 A | 11/2000 | Bergholz et al. |
| 6,042,253 A | 3/2000 | Fant, Jr. et al. | | 6,152,551 A | 11/2000 | Annas |
| 6,042,934 A | 3/2000 | Guiselin et al. | | 6,152,590 A | 11/2000 | Fürst et al. |
| 6,045,243 A | 4/2000 | Muth et al. | | 6,154,149 A | 11/2000 | Tyckowski et al. |
| 6,045,643 A | 4/2000 | Byker et al. | | 6,154,306 A | 11/2000 | Varaprasad et al. |
| 6,046,766 A | 4/2000 | Sakata | | 6,157,294 A | 12/2000 | Urai et al. |
| 6,046,837 A | 4/2000 | Yamamoto | | 6,157,418 A | 12/2000 | Rosen |
| 6,049,171 A | 4/2000 | Stam et al. | | 6,157,424 A | 12/2000 | Eichenlaub |
| D425,466 S | 5/2000 | Todd et al. | | 6,157,480 A | 12/2000 | Anderson et al. |
| 6,060,989 A | 5/2000 | Gehlot | | 6,158,655 A | 12/2000 | DeVries, Jr. et al. |
| 6,061,002 A | 5/2000 | Weber et al. | | 6,161,865 A | 12/2000 | Rose et al. |
| 6,062,920 A | 5/2000 | Jordan et al. | | 6,164,564 A | 12/2000 | Franco et al. |
| 6,064,508 A | 5/2000 | Forgette et al. | | 6,166,625 A | 12/2000 | Teowee et al. |
| 6,065,840 A | 5/2000 | Caskey et al. | | 6,166,629 A | 12/2000 | Hamma et al. |
| 6,066,920 A | 5/2000 | Torihara et al. | | 6,166,834 A | 12/2000 | Taketomi et al. |
| 6,067,111 A | 5/2000 | Hahn et al. | | 6,166,847 A | 12/2000 | Tench et al. |
| 6,067,500 A | 5/2000 | Morimoto et al. | | 6,166,848 A | 12/2000 | Cammenga et al. |
| 6,068,380 A | 5/2000 | Lynn et al. | | 6,167,255 A | 12/2000 | Kennedy, III et al. |
| D426,506 S | 6/2000 | Todd et al. | | 6,167,755 B1 | 1/2001 | Damson et al. |
| D426,507 S | 6/2000 | Todd et al. | | 6,169,955 B1 | 1/2001 | Fultz |
| D427,128 S | 6/2000 | Mathieu | | 6,170,956 B1 | 1/2001 | Rumsey et al. |
| 6,072,391 A | 6/2000 | Suzuki et al. | | 6,172,600 B1 | 1/2001 | Kakinami et al. |
| 6,074,077 A | 6/2000 | Pastrick et al. | | 6,172,601 B1 | 1/2001 | Wada et al. |
| 6,074,777 A | 6/2000 | Reimers et al. | | 6,172,613 B1 | 1/2001 | DeLine et al. |
| 6,076,948 A | 6/2000 | Bukosky et al. | | 6,173,501 B1 | 1/2001 | Blank et al. |
| 6,078,355 A | 6/2000 | Zengel | | 6,175,164 B1 | 1/2001 | O'Farrell et al. |
| 6,078,865 A | 6/2000 | Koyanagi | | 6,175,300 B1 | 1/2001 | Kendrick |
| D428,372 S | 7/2000 | Todd et al. | | 6,176,602 B1 | 1/2001 | Pastrick et al. |
| D428,373 S | 7/2000 | Todd et al. | | 6,178,034 B1 | 1/2001 | Allemand et al. |
| 6,082,881 A | 7/2000 | Hicks | | 6,178,377 B1 | 1/2001 | Ishihara et al. |
| 6,084,700 A | 7/2000 | Knapp et al. | | 6,181,387 B1 | 1/2001 | Rosen |
| 6,086,131 A | 7/2000 | Bingle et al. | | 6,182,006 B1 | 1/2001 | Meek |
| 6,086,229 A | 7/2000 | Pastrick | | 6,183,119 B1 | 2/2001 | Desmond et al. |
| 6,087,012 A | 7/2000 | Varaprasad et al. | | 6,184,679 B1 | 2/2001 | Popovic et al. |
| 6,087,953 A | 7/2000 | DeLine et al. | | 6,184,781 B1 | 2/2001 | Ramakesavan |
| 6,091,343 A | 7/2000 | Dykema et al. | | 6,185,492 B1 | 2/2001 | Kagawa et al. |
| 6,093,976 A | 7/2000 | Kramer et al. | | 6,185,501 B1 | 2/2001 | Smith et al. |
| 6,094,618 A | 7/2000 | Harada | | 6,188,505 B1 | 2/2001 | Lomprey et al. |
| D428,842 S | 8/2000 | Todd et al. | | 6,191,704 B1 | 2/2001 | Takenaga et al. |
| D429,202 S | 8/2000 | Todd et al. | | 6,193,379 B1 | 2/2001 | Tonar et al. |
| D430,088 S | 8/2000 | Todd et al. | | 6,193,912 B1 | 2/2001 | Thieste et al. |
| 6,097,023 A | 8/2000 | Schofield et al. | | 6,195,194 B1 | 2/2001 | Roberts et al. |
| 6,097,316 A | 8/2000 | Liaw et al. | | 6,196,688 B1 | 3/2001 | Caskey et al. |
| 6,099,131 A | 8/2000 | Fletcher et al. | | 6,198,409 B1 | 3/2001 | Schofield et al. |
| 6,099,155 A | 8/2000 | Pastrick et al. | | 6,199,014 B1 | 3/2001 | Walker et al. |
| 6,102,546 A | 8/2000 | Carter | | 6,199,810 B1 | 3/2001 | Wu et al. |
| 6,102,559 A | 8/2000 | Nold et al. | | 6,200,010 B1 | 3/2001 | Anders |
| 6,104,552 A | 8/2000 | Thau et al. | | 6,201,642 B1 | 3/2001 | Bos |
| 6,106,121 A | 8/2000 | Buckley et al. | | 6,206,553 B1 | 3/2001 | Boddy et al. |
| 6,111,498 A | 8/2000 | Jobes, I et al. | | 6,207,083 B1 | 3/2001 | Varaprasad et al. |
| 6,111,683 A | 8/2000 | Cammenga et al. | | 6,210,008 B1 | 4/2001 | Hoekstra et al. |
| 6,111,684 A | 8/2000 | Forgette et al. | | 6,210,012 B1 | 4/2001 | Broer |
| 6,111,685 A | 8/2000 | Tench et al. | | 6,212,470 B1 | 4/2001 | Seymour et al. |
| 6,111,696 A | 8/2000 | Allen et al. | | 6,217,181 B1 | 4/2001 | Lynam et al. |
| 6,115,086 A | 9/2000 | Rosen | | 6,218,934 B1 | 4/2001 | Regan |
| 6,115,651 A | 9/2000 | Cruz | | 6,222,447 B1 | 4/2001 | Schofield et al. |
| 6,116,743 A | 9/2000 | Hoek | | 6,222,460 B1 | 4/2001 | DeLine et al. |
| 6,118,219 A | 9/2000 | Okigami et al. | | 6,222,689 B1 | 4/2001 | Higuchi et al. |
| 6,122,597 A | 9/2000 | Saneyoshi et al. | | 6,227,689 B1 | 5/2001 | Miller |
| 6,122,921 A | 9/2000 | Brezoczky et al. | | 6,232,937 B1 | 5/2001 | Jacobsen et al. |
| 6,124,647 A | 9/2000 | Marcus et al. | | 6,236,514 B1 | 5/2001 | Sato |
| 6,124,886 A | 9/2000 | DeLine et al. | | 6,239,851 B1 | 5/2001 | Hatazawa et al. |
| 6,127,919 A | 10/2000 | Wylin | | 6,239,898 B1 | 5/2001 | Byker et al. |
| 6,127,945 A | 10/2000 | Mura-Smith | | 6,239,899 B1 | 5/2001 | DeVries et al. |
| 6,128,576 A | 10/2000 | Nishimoto et al. | | 6,243,003 B1 | 6/2001 | DeLine et al. |
| 6,130,421 A | 10/2000 | Bechtel et al. | | 6,244,716 B1 | 6/2001 | Steenwyk et al. |
| 6,130,448 A | 10/2000 | Bauer et al. | | 6,245,262 B1 | 6/2001 | Varaprasad et al. |
| 6,132,072 A | 10/2000 | Turnbull et al. | | 6,247,820 B1 | 6/2001 | Van Order |
| 6,137,620 A | 10/2000 | Guarr et al. | | 6,249,214 B1 | 6/2001 | Kashiwazaki |
| 6,139,171 A | 10/2000 | Waldmann | | 6,249,310 B1 | 6/2001 | Lefkowitz |
| 6,139,172 A | 10/2000 | Bos et al. | | 6,249,369 B1 | 6/2001 | Theiste et al. |
| 6,140,933 A | 10/2000 | Bugno et al. | | 6,250,148 B1 | 6/2001 | Lynam |
| 6,142,656 A | 11/2000 | Kurth | | 6,250,766 B1 | 6/2001 | Strumolo et al. |
| 6,146,003 A | 11/2000 | Thau | | 6,250,783 B1 | 6/2001 | Stidham et al. |
| 6,147,934 A | 11/2000 | Arikawa et al. | | 6,255,639 B1 | 7/2001 | Stam et al. |

| | | |
|---|---|---|
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Ragan et al. |
| 6,301,039 B1 | 10/2001 | Tench |
| 6,304,173 B2 | 10/2001 | Pala et al. |
| 6,305,807 B1 | 10/2001 | Schlerbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,369,701 B1 | 4/2002 | Yoshida et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,476,855 B1 | 11/2002 | Yamamoto |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek et al. |
| 6,515,378 B2 | 2/2003 | Drummond et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |

| | | |
|---|---|---|
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chautorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,552,653 B2 | 4/2003 | Nakaho et al. |
| 6,553,308 B1 | 4/2003 | Uhlmann et al. |
| 6,559,761 B1 | 5/2003 | Miller et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takahashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,612,723 B2 | 9/2003 | Futhey et al. |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | DeLine et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,657,708 B1 | 12/2003 | Bechtel et al. |
| 6,661,482 B2 | 12/2003 | Hara |
| 6,661,830 B1 | 12/2003 | Reed et al. |
| 6,663,262 B2 | 12/2003 | Boyd et al. |
| 6,665,592 B2 | 12/2003 | Kodama |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,935 B2 | 12/2003 | Yeon et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsburg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,704,434 B1 | 3/2004 | Sakoh et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |

| Patent | Kind | Date | Inventor |
|---|---|---|---|
| 6,823,261 | B2 | 11/2004 | Sekiguchi |
| 6,824,281 | B2 | 11/2004 | Schofield et al. |
| 6,831,268 | B2 | 12/2004 | Bechtel et al. |
| 6,832,848 | B2 | 12/2004 | Pastrick |
| 6,834,969 | B2 | 12/2004 | Bade et al. |
| 6,836,725 | B2 | 12/2004 | Millington et al. |
| 6,838,980 | B2 | 1/2005 | Gloger et al. |
| 6,842,189 | B2 | 1/2005 | Park |
| 6,842,276 | B2 | 1/2005 | Poll et al. |
| 6,845,805 | B1 | 1/2005 | Köster |
| 6,846,098 | B2 | 1/2005 | Bourdelais et al. |
| 6,847,424 | B2 | 1/2005 | Gotoh et al. |
| 6,847,487 | B2 | 1/2005 | Burgner |
| 6,848,817 | B2 | 2/2005 | Bos et al. |
| 6,849,165 | B2 | 2/2005 | Klöppel et al. |
| 6,853,491 | B1 | 2/2005 | Ruhle et al. |
| 6,859,148 | B2 | 2/2005 | Miller et al. |
| 6,861,789 | B2 | 3/2005 | Wei |
| 6,870,655 | B1 | 3/2005 | Northman et al. |
| 6,870,656 | B2 | 3/2005 | Tonar et al. |
| 6,871,982 | B2 | 3/2005 | Holman et al. |
| 6,877,888 | B2 | 4/2005 | DeLine et al. |
| 6,882,287 | B2 | 4/2005 | Schofield |
| 6,889,064 | B2 | 5/2005 | Baratono et al. |
| 6,891,563 | B2 | 5/2005 | Schofield et al. |
| 6,891,677 | B2 | 5/2005 | Nilsen et al. |
| 6,898,518 | B2 | 5/2005 | Padmanabhan |
| 6,902,284 | B2 | 6/2005 | Hutzel et al. |
| 6,904,348 | B2 | 6/2005 | Drummond et al. |
| 6,906,620 | B2 | 6/2005 | Nakai et al. |
| 6,906,632 | B2 | 6/2005 | DeLine et al. |
| 6,909,486 | B2 | 6/2005 | Wang et al. |
| 6,910,779 | B2 | 6/2005 | Abel et al. |
| 6,912,001 | B2 | 6/2005 | Okamoto et al. |
| 6,912,396 | B2 | 6/2005 | Sziraki et al. |
| 6,914,521 | B2 | 7/2005 | Rothkop |
| 6,916,099 | B2 | 7/2005 | Su et al. |
| 6,917,404 | B2 | 7/2005 | Baek |
| 6,918,674 | B2 | 7/2005 | Drummond et al. |
| 6,922,902 | B2 | 8/2005 | Schierbeek et al. |
| 6,923,080 | B1 | 8/2005 | Dobler et al. |
| 6,928,180 | B2 | 8/2005 | Stam et al. |
| 6,928,366 | B2 | 8/2005 | Ockerse et al. |
| 6,930,737 | B2 | 8/2005 | Weindorf et al. |
| 6,933,837 | B2 | 8/2005 | Gunderson et al. |
| 6,934,067 | B2 | 8/2005 | Ash et al. |
| 6,940,423 | B2 | 9/2005 | Takagi et al. |
| 6,946,978 | B2 | 9/2005 | Schofield |
| 6,947,576 | B2 | 9/2005 | Stam et al. |
| 6,947,577 | B2 | 9/2005 | Stam et al. |
| 6,949,772 | B2 | 9/2005 | Shimizu et al. |
| 6,950,035 | B2 | 9/2005 | Tanaka et al. |
| 6,951,410 | B2 | 10/2005 | Parsons |
| 6,951,681 | B2 | 10/2005 | Hartley et al. |
| 6,952,312 | B2 | 10/2005 | Weber et al. |
| 6,958,495 | B2 | 10/2005 | Nishijima et al. |
| 6,958,683 | B2 | 10/2005 | Mills et al. |
| 6,959,994 | B2 | 11/2005 | Fujikawa et al. |
| 6,961,178 | B2 | 11/2005 | Sugino et al. |
| 6,961,661 | B2 | 11/2005 | Sekiguchi |
| 6,963,438 | B2 | 11/2005 | Busscher et al. |
| 6,968,273 | B2 | 11/2005 | Ockerse et al. |
| 6,971,181 | B2 | 12/2005 | Ohm et al. |
| 6,972,888 | B2 | 12/2005 | Poll et al. |
| 6,974,236 | B2 | 12/2005 | Tenmyo |
| 6,975,215 | B2 | 12/2005 | Schofield et al. |
| 6,977,702 | B2 | 12/2005 | Wu |
| 6,980,092 | B2 | 12/2005 | Turnbull et al. |
| 6,985,291 | B2 | 1/2006 | Watson et al. |
| 6,989,736 | B2 | 1/2006 | Berberich et al. |
| 6,992,573 | B2 | 1/2006 | Blank et al. |
| 6,992,718 | B1 | 1/2006 | Takahara |
| 6,992,826 | B2 | 1/2006 | Wong |
| 6,995,687 | B2 | 2/2006 | Lang et al. |
| 6,997,571 | B2 | 2/2006 | Tenmyo |
| 7,001,058 | B2 | 2/2006 | Inditsky |
| 7,004,592 | B2 | 2/2006 | Varaprasad et al. |
| 7,004,593 | B2 | 2/2006 | Weller et al. |
| 7,005,974 | B2 | 2/2006 | McMahon et al. |
| 7,006,173 | B1 | 2/2006 | Hiyama et al. |
| 7,008,090 | B2 | 3/2006 | Blank |
| 7,009,751 | B2 | 3/2006 | Tonar et al. |
| 7,012,543 | B2 | 3/2006 | DeLine et al. |
| 7,012,727 | B2 | 3/2006 | Hutzel et al. |
| 7,023,331 | B2 | 4/2006 | Kodama |
| 7,029,156 | B2 | 4/2006 | Suehiro et al. |
| 7,030,738 | B2 | 4/2006 | Ishii |
| 7,030,775 | B2 | 4/2006 | Sekiguchi |
| 7,038,577 | B2 | 5/2006 | Pawlicki et al. |
| 7,041,965 | B2 | 5/2006 | Heslin et al. |
| 7,042,616 | B2 | 5/2006 | Tonar et al. |
| 7,046,418 | B2 | 5/2006 | Lin et al. |
| 7,046,448 | B2 | 5/2006 | Burgner |
| 7,050,908 | B1 | 5/2006 | Schwartz et al. |
| 7,057,505 | B2 | 6/2006 | Iwamoto |
| 7,057,681 | B2 | 6/2006 | Hinata et al. |
| 7,063,893 | B2 | 6/2006 | Hoffman |
| 7,064,882 | B2 | 6/2006 | Tonar et al. |
| 7,068,289 | B2 | 6/2006 | Satoh et al. |
| 7,074,486 | B2 | 7/2006 | Boire et al. |
| 7,081,810 | B2 | 7/2006 | Henderson et al. |
| 7,085,633 | B2 | 8/2006 | Nishira et al. |
| 7,092,052 | B2 | 8/2006 | Okamoto et al. |
| 7,095,432 | B2 | 8/2006 | Nakayama et al. |
| 7,095,567 | B2 | 8/2006 | Troxell et al. |
| 7,106,213 | B2 | 9/2006 | White |
| 7,106,392 | B2 | 9/2006 | You |
| 7,108,409 | B2 | 9/2006 | DeLine et al. |
| 7,110,021 | B2 | 9/2006 | Nobori et al. |
| 7,114,554 | B2 | 10/2006 | Bergman et al. |
| 7,121,028 | B2 | 10/2006 | Shoen et al. |
| 7,125,131 | B2 | 10/2006 | Olczak |
| 7,130,727 | B2 | 10/2006 | Liu et al. |
| 7,132,064 | B2 | 11/2006 | Li et al. |
| 7,136,091 | B2 | 11/2006 | Ichikawa et al. |
| 7,138,974 | B2 | 11/2006 | Hirakata et al. |
| 7,149,613 | B2 | 12/2006 | Stam et al. |
| 7,150,552 | B2 | 12/2006 | Weidel |
| 7,151,515 | B2 | 12/2006 | Kim et al. |
| 7,151,997 | B2 | 12/2006 | Uhlmann et al. |
| 7,153,588 | B2 | 12/2006 | McMan et al. |
| 7,154,657 | B2 | 12/2006 | Poll et al. |
| 7,158,881 | B2 | 1/2007 | McCarthy et al. |
| 7,160,017 | B2 | 1/2007 | Lee et al. |
| 7,161,567 | B2 | 1/2007 | Homma et al. |
| 7,167,796 | B2 | 1/2007 | Taylor et al. |
| 7,168,830 | B2 | 1/2007 | Pastrick et al. |
| 7,175,291 | B1 | 2/2007 | Li |
| 7,176,790 | B2 | 2/2007 | Yamazaki |
| 7,184,190 | B2 | 2/2007 | McCabe et al. |
| 7,185,995 | B2 | 3/2007 | Hatanaka et al. |
| 7,187,498 | B2 | 3/2007 | Bengoechea et al. |
| 7,188,963 | B2 | 3/2007 | Schofield et al. |
| 7,193,764 | B2 | 3/2007 | Lin et al. |
| 7,195,381 | B2 | 3/2007 | Lynam et al. |
| 7,199,767 | B2 | 4/2007 | Spero |
| 7,202,987 | B2 | 4/2007 | Varaprasad et al. |
| 7,206,697 | B2 | 4/2007 | Olney et al. |
| 7,209,277 | B2 | 4/2007 | Tonar et al. |
| 7,215,238 | B2 | 5/2007 | Buck et al. |
| 7,215,473 | B2 | 5/2007 | Fleming |
| 7,221,363 | B2 | 5/2007 | Roberts et al. |
| 7,221,365 | B1 | 5/2007 | Lévesque et al. |
| 7,224,324 | B2 | 5/2007 | Quist et al. |
| 7,227,472 | B1 | 6/2007 | Roe |
| 7,230,523 | B2 | 6/2007 | Harter, Jr. et al. |
| 7,232,231 | B2 | 6/2007 | Shih |
| 7,232,594 | B2 | 6/2007 | Miroshin et al. |
| 7,233,304 | B1 | 6/2007 | Aratani et al. |
| 7,235,918 | B2 | 6/2007 | McCullough et al. |
| 7,241,030 | B2 | 7/2007 | Mok et al. |
| 7,241,037 | B2 | 7/2007 | Mathieu et al. |
| 7,245,207 | B1 | 7/2007 | Dayan et al. |
| 7,245,231 | B2 | 7/2007 | Kiefer et al. |
| 7,245,336 | B2 | 7/2007 | Hiyama et al. |
| 7,248,283 | B2 | 7/2007 | Takagi et al. |
| 7,248,305 | B2 | 7/2007 | Ootsuta et al. |
| 7,249,860 | B2 | 7/2007 | Kulas et al. |

| | | | | | | |
|---|---|---|---|---|---|---|
| 7,251,079 | B2 | 7/2007 | Capaldo et al. | 7,471,438 | B2 | 12/2008 | McCabe et al. |
| 7,253,723 | B2 | 8/2007 | Lindahl et al. | 7,474,963 | B2 | 1/2009 | Taylor et al. |
| 7,255,451 | B2 | 8/2007 | McCabe et al. | 7,477,439 | B2 | 1/2009 | Tonar et al. |
| 7,255,465 | B2 | 8/2007 | DeLine et al. | 7,480,149 | B2 | 1/2009 | DeWard et al. |
| 7,259,036 | B2 | 8/2007 | Borland et al. | 7,488,080 | B2 | 2/2009 | Skiver et al. |
| 7,262,406 | B2 | 8/2007 | Heslin et al. | 7,488,099 | B2 | 2/2009 | Fogg et al. |
| 7,262,916 | B2 | 8/2007 | Kao et al. | 7,489,374 | B2 | 2/2009 | Utsumi et al. |
| 7,265,342 | B2 | 9/2007 | Heslin et al. | 7,490,007 | B2 | 2/2009 | Taylor et al. |
| 7,268,841 | B2 | 9/2007 | Kasajima et al. | 7,490,943 | B2 | 2/2009 | Kikuchi et al. |
| 7,269,327 | B2 | 9/2007 | Tang | 7,490,944 | B2 | 2/2009 | Blank et al. |
| 7,269,328 | B2 | 9/2007 | Tang | 7,494,231 | B2 | 2/2009 | Varaprasad et al. |
| 7,271,951 | B2 | 9/2007 | Weber et al. | 7,495,719 | B2 | 2/2009 | Adachi et al. |
| 7,274,501 | B2 | 9/2007 | McCabe et al. | 7,496,439 | B2 | 2/2009 | McCormick |
| 7,281,491 | B2 | 10/2007 | Iwamaru | 7,502,156 | B2 | 3/2009 | Tonar et al. |
| 7,286,280 | B2 | 10/2007 | Whitehead et al. | 7,505,047 | B2 | 3/2009 | Yoshimura |
| 7,287,868 | B2 | 10/2007 | Carter et al. | 7,505,188 | B2 | 3/2009 | Niiyama et al. |
| 7,289,037 | B2 | 10/2007 | Uken et al. | 7,511,607 | B2 | 3/2009 | Hubbard et al. |
| 7,290,919 | B2 | 11/2007 | Pan et al. | 7,511,872 | B2 | 3/2009 | Tonar et al. |
| 7,292,208 | B1 | 11/2007 | Park et al. | 7,525,604 | B2 | 4/2009 | Xue |
| 7,300,183 | B2 | 11/2007 | Kiyomoto et al. | 7,525,715 | B2 | 4/2009 | McCabe et al. |
| 7,302,344 | B2 | 11/2007 | Olney et al. | 7,526,103 | B2 | 4/2009 | Schofield et al. |
| 7,304,661 | B2 | 12/2007 | Ishikura | 7,533,998 | B2 | 5/2009 | Schofield et al. |
| 7,308,341 | B2 | 12/2007 | Schofield et al. | 7,538,316 | B2 | 5/2009 | Heslin et al. |
| 7,310,177 | B2 | 12/2007 | McCabe et al. | 7,540,620 | B2 | 6/2009 | Weller et al. |
| 7,311,428 | B2 | 12/2007 | DeLine et al. | 7,541,570 | B2 | 6/2009 | Drummond et al. |
| 7,316,485 | B2 | 1/2008 | Roose | 7,542,193 | B2 | 6/2009 | McCabe et al. |
| 7,317,386 | B2 | 1/2008 | Lengning et al. | 7,543,946 | B2 | 6/2009 | Ockerse et al. |
| 7,318,664 | B2 | 1/2008 | Hatanaka et al. | 7,543,947 | B2 | 6/2009 | Varaprasad et al. |
| 7,323,819 | B2 | 1/2008 | Hong et al. | 7,545,429 | B2 | 6/2009 | Travis |
| 7,324,043 | B2 | 1/2008 | Purden et al. | 7,547,467 | B2 | 6/2009 | Olson et al. |
| 7,324,172 | B2 | 1/2008 | Yamazaki et al. | 7,548,291 | B2 | 6/2009 | Lee et al. |
| 7,324,174 | B2 | 1/2008 | Hafuka et al. | 7,551,354 | B2 | 6/2009 | Horsten et al. |
| 7,324,261 | B2 | 1/2008 | Tonar et al. | 7,561,181 | B2 | 7/2009 | Schofield et al. |
| 7,327,225 | B2 | 2/2008 | Nicholas et al. | 7,562,985 | B2 | 7/2009 | Cortenraad et al. |
| 7,327,226 | B2 | 2/2008 | Turnbull et al. | 7,567,291 | B2 | 7/2009 | Bechtel et al. |
| 7,327,855 | B1 | 2/2008 | Chen | 7,571,038 | B2 | 8/2009 | Butler et al. |
| 7,328,103 | B2 | 2/2008 | McCarthy et al. | 7,571,042 | B2 | 8/2009 | Taylor et al. |
| 7,329,013 | B2 | 2/2008 | Blank et al. | 7,572,017 | B2 | 8/2009 | Varaprasad et al. |
| 7,329,850 | B2 | 2/2008 | Drummond et al. | 7,572,490 | B2 | 8/2009 | Park et al. |
| 7,331,415 | B2 | 2/2008 | Hawes et al. | 7,579,939 | B2 | 8/2009 | Schofield et al. |
| 7,338,177 | B2 | 3/2008 | Lynam | 7,579,940 | B2 | 8/2009 | Schofield et al. |
| 7,342,707 | B2 | 3/2008 | Roberts et al. | 7,580,795 | B2 | 8/2009 | McCarthy et al. |
| 7,344,284 | B2 | 3/2008 | Lynam et al. | 7,581,859 | B2 | 9/2009 | Lynam |
| 7,349,143 | B2 | 3/2008 | Tonar et al. | 7,581,867 | B2 | 9/2009 | Lee et al. |
| 7,349,144 | B2 | 3/2008 | Varaprasad et al. | 7,583,184 | B2 | 9/2009 | Schofield et al. |
| 7,349,582 | B2 | 3/2008 | Takeda et al. | 7,586,566 | B2 | 9/2009 | Nelson et al. |
| 7,355,524 | B2 | 4/2008 | Schofield | 7,586,666 | B2 | 9/2009 | McCabe et al. |
| 7,360,932 | B2 | 4/2008 | Uken et al. | 7,589,883 | B2 | 9/2009 | Varaprasad et al. |
| 7,362,505 | B2 | 4/2008 | Hikmet et al. | 7,589,893 | B2 | 9/2009 | Rottcher |
| 7,368,714 | B2 | 5/2008 | Remillard et al. | 7,600,878 | B2 | 10/2009 | Blank et al. |
| 7,370,983 | B2 | 5/2008 | DeWind et al. | 7,605,883 | B2 | 10/2009 | Yamaki et al. |
| 7,372,611 | B2 | 5/2008 | Tonar et al. | 7,619,508 | B2 | 11/2009 | Lynam et al. |
| 7,375,895 | B2 | 5/2008 | Brynielsson | 7,623,202 | B2 | 11/2009 | Araki et al. |
| 7,379,224 | B2 | 5/2008 | Tonar et al. | 7,626,749 | B2 | 12/2009 | Baur et al. |
| 7,379,225 | B2 | 5/2008 | Tonar et al. | 7,629,996 | B2 | 12/2009 | Rademacher et al. |
| 7,379,243 | B2 | 5/2008 | Horsten et al. | 7,633,567 | B2 | 12/2009 | Yamada et al. |
| 7,379,814 | B2 | 5/2008 | Ockerse et al. | 7,636,188 | B2 | 12/2009 | Baur et al. |
| 7,379,817 | B1 | 5/2008 | Tyson et al. | 7,636,195 | B2 | 12/2009 | Nieuwkerk et al. |
| 7,380,633 | B2 | 6/2008 | Shen et al. | 7,636,930 | B2 | 12/2009 | Chang |
| 7,389,171 | B2 | 6/2008 | Rupp | 7,643,200 | B2 | 1/2010 | Varaprasad et al. |
| 7,391,563 | B2 | 6/2008 | McCabe et al. | 7,643,927 | B2 | 1/2010 | Hils |
| 7,396,147 | B2 | 7/2008 | Munro | 7,651,228 | B2 | 1/2010 | Skiver et al. |
| 7,411,637 | B2 | 8/2008 | Weiss | 7,658,521 | B2 | 2/2010 | DeLine et al. |
| 7,411,732 | B2 | 8/2008 | Kao et al. | 7,663,798 | B2 | 2/2010 | Tonar et al. |
| 7,412,328 | B2 | 8/2008 | Uhlmann et al. | 7,667,579 | B2 | 2/2010 | DeLine et al. |
| 7,417,781 | B2 | 8/2008 | Tonar et al. | 7,670,016 | B2 | 3/2010 | Weller et al. |
| 7,420,159 | B2 | 9/2008 | Heslin et al. | 7,688,495 | B2 | 3/2010 | Tonar et al. |
| 7,420,756 | B2 | 9/2008 | Lynam | 7,695,174 | B2 | 4/2010 | Takayanagi et al. |
| 7,429,998 | B2 | 9/2008 | Kawauchi et al. | 7,696,964 | B2 | 4/2010 | Lankhorst et al. |
| 7,446,462 | B2 | 11/2008 | Lim et al. | 7,706,046 | B2 | 4/2010 | Bauer et al. |
| 7,446,650 | B2 | 11/2008 | Schofield et al. | 7,710,631 | B2 | 5/2010 | McCabe et al. |
| 7,446,924 | B2 | 11/2008 | Schofield et al. | 7,711,479 | B2 | 5/2010 | Taylor et al. |
| 7,448,776 | B2 | 11/2008 | Tang | 7,724,434 | B2 | 5/2010 | Cross et al. |
| 7,452,090 | B2 | 11/2008 | Weller et al. | 7,726,822 | B2 | 6/2010 | Blank et al. |
| 7,453,057 | B2 | 11/2008 | Drummond et al. | 7,728,276 | B2 | 6/2010 | Drummond et al. |
| 7,455,412 | B2 | 11/2008 | Rottcher | 7,728,721 | B2 | 6/2010 | Schofield et al. |
| 7,460,007 | B2 | 12/2008 | Schofield et al. | 7,728,927 | B2 | 6/2010 | Nieuwkerk et al. |
| 7,467,883 | B2 | 12/2008 | DeLine et al. | 7,731,403 | B2 | 6/2010 | Lynam et al. |
| 7,468,651 | B2 | 12/2008 | DeLine et al. | 7,734,392 | B2 | 6/2010 | Schofield et al. |

| | | | |
|---|---|---|---|
| 7,742,864 B2 | 6/2010 | Sekiguchi | |
| 7,746,534 B2 | 6/2010 | Tonar et al. | |
| 7,771,061 B2 | 8/2010 | Varaprasad et al. | |
| 7,787,077 B2 | 8/2010 | Kondoh et al. | |
| 7,791,694 B2 | 9/2010 | Molsen et al. | |
| 7,795,675 B2 | 9/2010 | Darwish et al. | |
| 7,815,326 B2 | 10/2010 | Blank et al. | |
| 7,821,697 B2 | 10/2010 | Varaprasad et al. | |
| 7,822,543 B2 | 10/2010 | Taylor et al. | |
| 7,826,123 B2 | 11/2010 | McCabe et al. | |
| 7,830,583 B2 | 11/2010 | Neuman et al. | |
| 7,832,882 B2 | 11/2010 | Weller et al. | |
| 7,842,154 B2 | 11/2010 | Lynam | |
| 7,854,514 B2 | 12/2010 | Conner et al. | |
| 7,855,755 B2 | 12/2010 | Weller et al. | |
| 7,859,565 B2 | 12/2010 | Schofield et al. | |
| 7,859,737 B2 | 12/2010 | McCabe et al. | |
| 7,864,398 B2 | 1/2011 | Dozeman et al. | |
| 7,864,399 B2 | 1/2011 | McCabe et al. | |
| 7,871,169 B2 | 1/2011 | Varaprasad et al. | |
| 7,873,593 B2 | 1/2011 | Schofield et al. | |
| 7,888,629 B2 | 2/2011 | Heslin et al. | |
| 7,898,398 B2 | 3/2011 | DeLine et al. | |
| 7,898,719 B2 | 3/2011 | Schofield et al. | |
| 7,903,324 B2 | 3/2011 | Kobayashi et al. | |
| 7,903,335 B2 | 3/2011 | Nieuwkerk et al. | |
| 7,906,756 B2 | 3/2011 | Drummond et al. | |
| 7,914,188 B2 | 3/2011 | DeLine et al. | |
| 7,916,009 B2 | 3/2011 | Schofield et al. | |
| 7,916,380 B2 | 3/2011 | Tonar et al. | |
| 7,918,570 B2 | 4/2011 | Weller et al. | |
| 7,926,960 B2 | 4/2011 | Skiver et al. | |
| 7,937,667 B2 | 5/2011 | Kramer et al. | |
| 7,965,336 B2 | 6/2011 | Bingle et al. | |
| 7,965,357 B2 | 6/2011 | Van De Witte et al. | |
| 7,980,711 B2 | 7/2011 | Takayanagi et al. | |
| 7,994,471 B2 | 8/2011 | Heslin et al. | |
| 8,000,894 B2 | 8/2011 | Taylor et al. | |
| 8,004,768 B2 | 8/2011 | Takayanagi et al. | |
| 8,019,505 B2 | 9/2011 | Schofield et al. | |
| 8,027,691 B2 | 9/2011 | Bernas et al. | |
| 8,031,225 B2 | 10/2011 | Watanabe et al. | |
| 8,040,376 B2 | 10/2011 | Yamada et al. | |
| 8,044,776 B2 | 10/2011 | Schofield et al. | |
| 8,047,667 B2 | 11/2011 | Weller et al. | |
| 8,049,640 B2 | 11/2011 | Uken et al. | |
| 8,063,753 B2 | 11/2011 | DeLine et al. | |
| 8,072,318 B2 | 12/2011 | Lynam et al. | |
| 8,083,386 B2 | 12/2011 | Lynam | |
| 8,094,002 B2 | 1/2012 | Schofield et al. | |
| 8,095,260 B1 | 1/2012 | Schofield et al. | |
| 8,095,310 B2 | 1/2012 | Taylor et al. | |
| 8,100,568 B2 | 1/2012 | DeLine et al. | |
| 8,106,347 B2 | 1/2012 | Drummond et al. | |
| 8,121,787 B2 | 2/2012 | Taylor et al. | |
| 8,134,117 B2 | 3/2012 | Heslin et al. | |
| 8,144,033 B2 | 3/2012 | Chinomi et al. | |
| 8,154,418 B2 | 4/2012 | Hook et al. | |
| 8,162,493 B2 | 4/2012 | Skiver et al. | |
| 8,164,817 B2 | 4/2012 | Varaprasad et al. | |
| 8,169,307 B2 | 5/2012 | Nakamura et al. | |
| 8,177,376 B2 | 5/2012 | Weller et al. | |
| 8,179,236 B2 | 5/2012 | Weller et al. | |
| 8,179,437 B2 | 5/2012 | Schofield et al. | |
| 8,179,586 B2 | 5/2012 | Schofield et al. | |
| 8,194,132 B2 | 6/2012 | Dayan et al. | |
| 8,194,133 B2 | 6/2012 | De Wind et al. | |
| 8,217,887 B2 | 7/2012 | Sangam et al. | |
| 8,228,588 B2 | 7/2012 | McCabe et al. | |
| 2001/0026316 A1 | 10/2001 | Senatore | |
| 2001/0035853 A1 | 11/2001 | Hoelen et al. | |
| 2002/0049535 A1 | 4/2002 | Rigo et al. | |
| 2002/0085155 A1 | 7/2002 | Arikawa | |
| 2002/0092958 A1 | 7/2002 | Lusk | |
| 2002/0118321 A1 | 8/2002 | Ge | |
| 2002/0133144 A1 | 9/2002 | Chan et al. | |
| 2002/0149727 A1 | 10/2002 | Wang | |
| 2002/0154007 A1 | 10/2002 | Yang | |
| 2003/0002165 A1 | 1/2003 | Mathias et al. | |
| 2003/0007261 A1 | 1/2003 | Hutzel et al. | |
| 2003/0030724 A1 | 2/2003 | Okamoto | |
| 2003/0069690 A1 | 4/2003 | Correia et al. | |
| 2003/0090568 A1 | 5/2003 | Pico | |
| 2003/0090569 A1 | 5/2003 | Poechmueller | |
| 2003/0098908 A1 | 5/2003 | Misaiji et al. | |
| 2003/0103142 A1 | 6/2003 | Hitomi et al. | |
| 2003/0122929 A1 | 7/2003 | Minaudo et al. | |
| 2003/0133014 A1 | 7/2003 | Mendoza | |
| 2003/0137586 A1 | 7/2003 | Lewellen | |
| 2003/0156193 A1 | 8/2003 | Nakamura | |
| 2003/0169158 A1 | 9/2003 | Paul, Jr. | |
| 2003/0179293 A1 | 9/2003 | Oizumi | |
| 2003/0202096 A1 | 10/2003 | Kim | |
| 2003/0206256 A1 | 11/2003 | Drain et al. | |
| 2003/0214576 A1 | 11/2003 | Koga | |
| 2003/0214584 A1 | 11/2003 | Ross, Jr. | |
| 2003/0227546 A1 | 12/2003 | Hilborn et al. | |
| 2004/0004541 A1 | 1/2004 | Hong | |
| 2004/0027695 A1 | 2/2004 | Lin | |
| 2004/0036768 A1 | 2/2004 | Green | |
| 2004/0080404 A1 | 4/2004 | White | |
| 2004/0239243 A1 | 12/2004 | Roberts et al. | |
| 2004/0239849 A1 | 12/2004 | Wang | |
| 2005/0018738 A1 | 1/2005 | Duan et al. | |
| 2005/0024591 A1 | 2/2005 | Lian et al. | |
| 2005/0117095 A1 | 6/2005 | Ma | |
| 2005/0168995 A1 | 8/2005 | Kittelmann et al. | |
| 2005/0237440 A1 | 10/2005 | Sugimura et al. | |
| 2005/0270766 A1 | 12/2005 | Kung et al. | |
| 2006/0001641 A1 | 1/2006 | Degwekar et al. | |
| 2006/0050018 A1 | 3/2006 | Hutzel et al. | |
| 2006/0061008 A1 | 3/2006 | Karner et al. | |
| 2006/0076860 A1 | 4/2006 | Hoss | |
| 2006/0139953 A1 | 6/2006 | Chou et al. | |
| 2006/0187378 A1 | 8/2006 | Bong et al. | |
| 2006/0279522 A1 | 12/2006 | Kurihara | |
| 2007/0064108 A1 | 3/2007 | Haler | |
| 2007/0080585 A1 | 4/2007 | Lyu | |
| 2007/0086097 A1 | 4/2007 | Motomiya et al. | |
| 2007/0183037 A1 | 8/2007 | De Boer et al. | |
| 2007/0262732 A1 | 11/2007 | Shen | |
| 2008/0042938 A1 | 2/2008 | Cok | |
| 2008/0068520 A1 | 3/2008 | Minikey, Jr. et al. | |
| 2009/0002491 A1 | 1/2009 | Haler | |
| 2009/0040778 A1 | 2/2009 | Takayanagi et al. | |
| 2009/0052003 A1 | 2/2009 | Schofield et al. | |
| 2009/0096937 A1 | 4/2009 | Bauer et al. | |
| 2009/0201137 A1 | 8/2009 | Weller et al. | |
| 2009/0258221 A1 | 10/2009 | Diehl et al. | |
| 2009/0262192 A1 | 10/2009 | Schofield et al. | |
| 2009/0296190 A1 | 12/2009 | Anderson et al. | |
| 2010/0045899 A1 | 2/2010 | Ockerse | |
| 2010/0110523 A1 | 5/2010 | Varaprasad et al. | |
| 2010/0110553 A1 | 5/2010 | Anderson et al. | |
| 2010/0195226 A1 | 8/2010 | Heslin et al. | |
| 2010/0201896 A1 | 8/2010 | Ostreko et al. | |
| 2010/0245701 A1 | 9/2010 | Sato et al. | |
| 2010/0246017 A1 | 9/2010 | Tonar et al. | |
| 2010/0277786 A1 | 11/2010 | Anderson et al. | |
| 2010/0289995 A1 | 11/2010 | Hwang et al. | |

FOREIGN PATENT DOCUMENTS

| | | |
|---|---|---|
| DE | 941408 | 4/1956 |
| DE | 944531 | 7/1956 |
| DE | 7323996 | 11/1973 |
| DE | 2808260 | 8/1979 |
| DE | 3248511 A1 | 7/1984 |
| DE | 3301945 | 7/1984 |
| DE | 3614882 | 11/1987 |
| DE | 3720848 | 1/1989 |
| DE | 9306989.8 U1 | 7/1993 |
| DE | 4329983 | 8/1995 |
| DE | 4444443 A1 | 6/1996 |
| DE | 29703084 U1 | 6/1997 |
| DE | 29805142 U1 | 5/1998 |
| DE | 19741896 | 4/1999 |
| DE | 19755008 | 7/1999 |
| DE | 29902344 U1 | 7/1999 |

| | | | | | | |
|---|---|---|---|---|---|---|
| DE | 19934999 | 2/2001 | | JP | 05-213113 | 8/1993 |
| DE | 19943355 | 3/2001 | | JP | 05-257142 | 10/1993 |
| DE | 20118868 | 3/2002 | | JP | 60-80953 A | 3/1994 |
| DE | 10131459 | 1/2003 | | JP | 61-07035 A | 4/1994 |
| DE | 102005000650 | 7/2006 | | JP | 62-27318 A | 8/1994 |
| EP | 0299509 A2 | 1/1989 | | JP | 06-318734 | 11/1994 |
| EP | 0513476 A1 | 11/1992 | | JP | 07-146467 | 6/1995 |
| EP | 0524766 | 1/1993 | | JP | 07-175035 | 7/1995 |
| EP | 0729864 A1 | 12/1995 | | JP | 07-191311 | 7/1995 |
| EP | 0728618 A2 | 8/1996 | | JP | 07-266928 | 10/1995 |
| EP | 0825477 | 2/1998 | | JP | 07-267002 | 10/1995 |
| EP | 0830985 | 3/1998 | | JP | 07-277072 | 10/1995 |
| EP | 0928723 A2 | 7/1999 | | JP | 07-281150 | 10/1995 |
| EP | 937601 A2 | 8/1999 | | JP | 07-281185 | 10/1995 |
| EP | 1075986 | 2/2001 | | JP | 08-008083 | 1/1996 |
| EP | 1097848 A | 5/2001 | | JP | 08-083581 | 3/1996 |
| EP | 1152285 A2 | 11/2001 | | JP | 08-216789 | 8/1996 |
| EP | 1193773 | 3/2002 | | JP | 08-227769 | 9/1996 |
| EP | 1256833 | 11/2002 | | JP | 09-033886 | 2/1997 |
| EP | 0899157 | 10/2004 | | JP | 09-260074 | 3/1997 |
| EP | 1315639 | 2/2006 | | JP | 05-077657 | 7/1997 |
| FR | 1021987 A | 2/1953 | | JP | 09-220976 | 8/1997 |
| FR | 1461419 | 12/1966 | | JP | 09-230827 | 9/1997 |
| FR | 2585991 | 2/1987 | | JP | 09-266078 | 10/1997 |
| FR | 2672857 A1 | 8/1992 | | JP | 09-288262 | 11/1997 |
| FR | 2673499 A1 | 9/1992 | | JP | 10-076880 | 3/1998 |
| FR | 2759045 | 8/1998 | | JP | 10-190960 | 7/1998 |
| GB | 810010 | 3/1959 | | JP | 10-199480 | 7/1998 |
| GB | 934037 | 8/1963 | | JP | 10-206643 | 8/1998 |
| GB | 1008411 | 10/1965 | | JP | 10-221692 | 8/1998 |
| GB | 1136134 | 12/1968 | | JP | 10-239659 | 9/1998 |
| GB | 1553376 | 9/1979 | | JP | 10-276298 | 10/1998 |
| GB | 2137573 A | 10/1984 | | JP | 11-038381 | 2/1999 |
| GB | 2161440 | 1/1986 | | JP | 11-067485 | 3/1999 |
| GB | 2192370 | 1/1988 | | JP | 11-078693 | 3/1999 |
| GB | 2222991 | 3/1990 | | JP | 11-109337 | 4/1999 |
| GB | 2255539 A | 11/1992 | | JP | 11-160539 | 6/1999 |
| GB | 2351055 A | 12/2000 | | JP | 11-212073 | 8/1999 |
| GB | 2362494 | 11/2001 | | JP | 11-283759 | 10/1999 |
| JP | 50-000638 A | 1/1975 | | JP | 11-298058 | 10/1999 |
| JP | 52-146988 | 11/1977 | | JP | 11-305197 | 11/1999 |
| JP | 55-039843 | 3/1980 | | JP | 2000-131681 | 5/2000 |
| JP | 57-30639 | 2/1982 | | JP | 2000-153736 | 6/2000 |
| JP | 57-102602 | 6/1982 | | JP | 2000-159014 | 6/2000 |
| JP | 57-208530 | 12/1982 | | JP | 2000-255321 | 9/2000 |
| JP | 58-020954 | 2/1983 | | JP | 2000-330107 | 11/2000 |
| JP | 58-030729 | 2/1983 | | JP | 2001-083509 | 3/2001 |
| JP | 58-110334 | 6/1983 | | JP | 2001-097116 | 4/2001 |
| JP | 58-180347 | 10/1983 | | JP | 2001-222005 | 8/2001 |
| JP | 58-209635 | 12/1983 | | JP | 2002-072901 | 3/2002 |
| JP | 59-114139 | 7/1984 | | JP | 2002-120649 | 4/2002 |
| JP | 60-212730 | 10/1985 | | JP | 2002-122860 | 4/2002 |
| JP | 60-261275 | 12/1985 | | JP | 2002-162626 | 6/2002 |
| JP | 61-127186 | 6/1986 | | JP | 2002-352611 | 12/2002 |
| JP | 61-260217 | 11/1986 | | JP | 2003-182454 | 3/2003 |
| JP | 62-043543 | 2/1987 | | JP | 2003-267129 | 9/2003 |
| JP | 62-075619 | 4/1987 | | JP | 2004-182156 | 7/2004 |
| JP | 62-122487 | 6/1987 | | JP | 2005-148119 | 6/2005 |
| JP | 62-131232 | 6/1987 | | JP | 2005-280526 | 10/2005 |
| JP | 63-02753 | 1/1988 | | JP | 2005-327600 | 11/2005 |
| JP | 63-085525 | 4/1988 | | JP | 38-46073 | 11/2006 |
| JP | 63-106730 | 5/1988 | | JP | 2008-083657 | 4/2008 |
| JP | 63-106731 | 5/1988 | | KR | 20060038856 | 5/2006 |
| JP | 63-274286 | 11/1988 | | KR | 100663930 | 1/2007 |
| JP | 64-14700 | 1/1989 | | WO | WO 82/02448 | 7/1982 |
| JP | 01-123587 | 5/1989 | | WO | WO 86/06179 | 10/1986 |
| JP | 01-130578 | 5/1989 | | WO | WO 94/19212 | 9/1994 |
| JP | 02-122844 | 10/1990 | | WO | WO 96/21581 | 7/1996 |
| JP | 03-028947 | 3/1991 | | WO | WO 98/14974 | 4/1998 |
| JP | 03-28947 | 3/1991 | | WO | WO 98/38547 | 9/1998 |
| JP | 03-052097 | 3/1991 | | WO | WO 99/15360 | 4/1999 |
| JP | 30-061192 | 3/1991 | | WO | WO 00/23826 | 4/2000 |
| JP | 03-110855 | 5/1991 | | WO | WO 00/52661 | 9/2000 |
| JP | 03-198026 | 8/1991 | | WO | WO 00/55685 | 9/2000 |
| JP | 03-243914 | 10/1991 | | WO | WO 01/01192 | 1/2001 |
| JP | 04-114587 | 4/1992 | | WO | WO 02/18174 | 3/2002 |
| JP | 04-245886 | 9/1992 | | WO | WO 02/49881 | 6/2002 |
| JP | 05-080716 | 4/1993 | | WO | WO 03/021343 | 3/2003 |
| JP | 05-183194 | 7/1993 | | WO | WO 03/078941 | 9/2003 |

OTHER PUBLICATIONS

Edgar, Julian; Goodbye 12 Volts . . . Hello 42 Voltsl; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1998, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

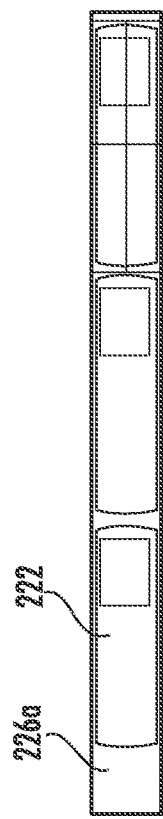
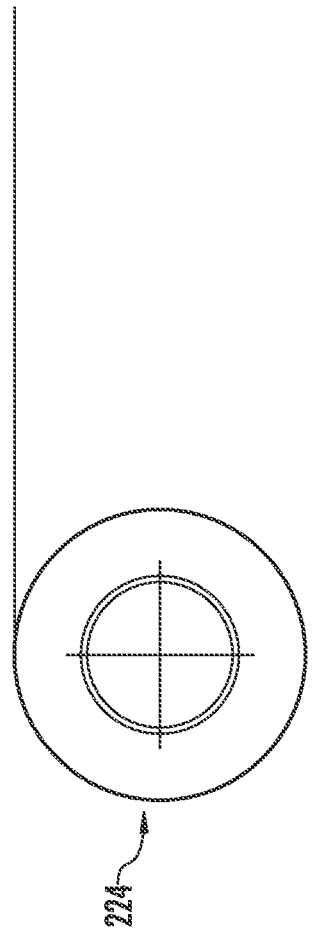
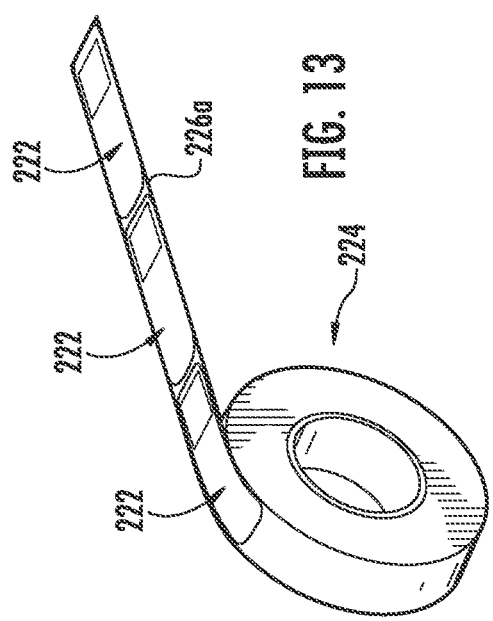

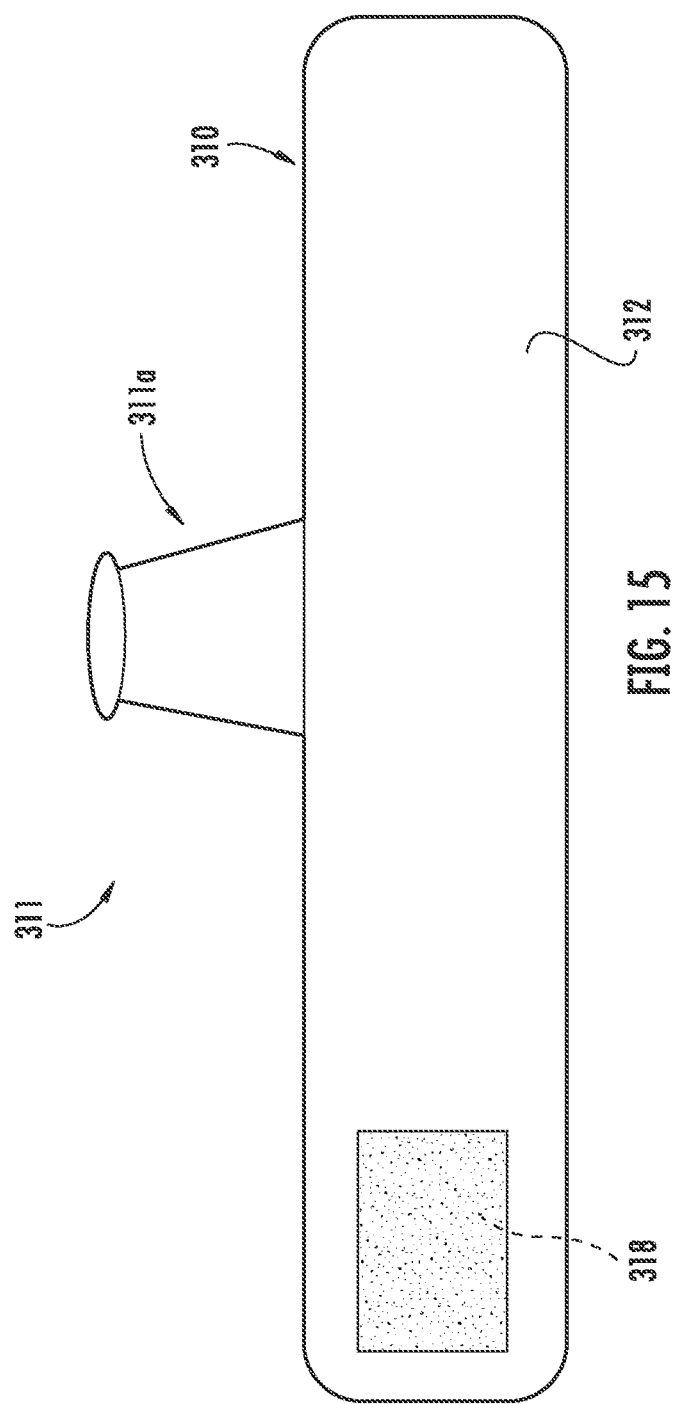

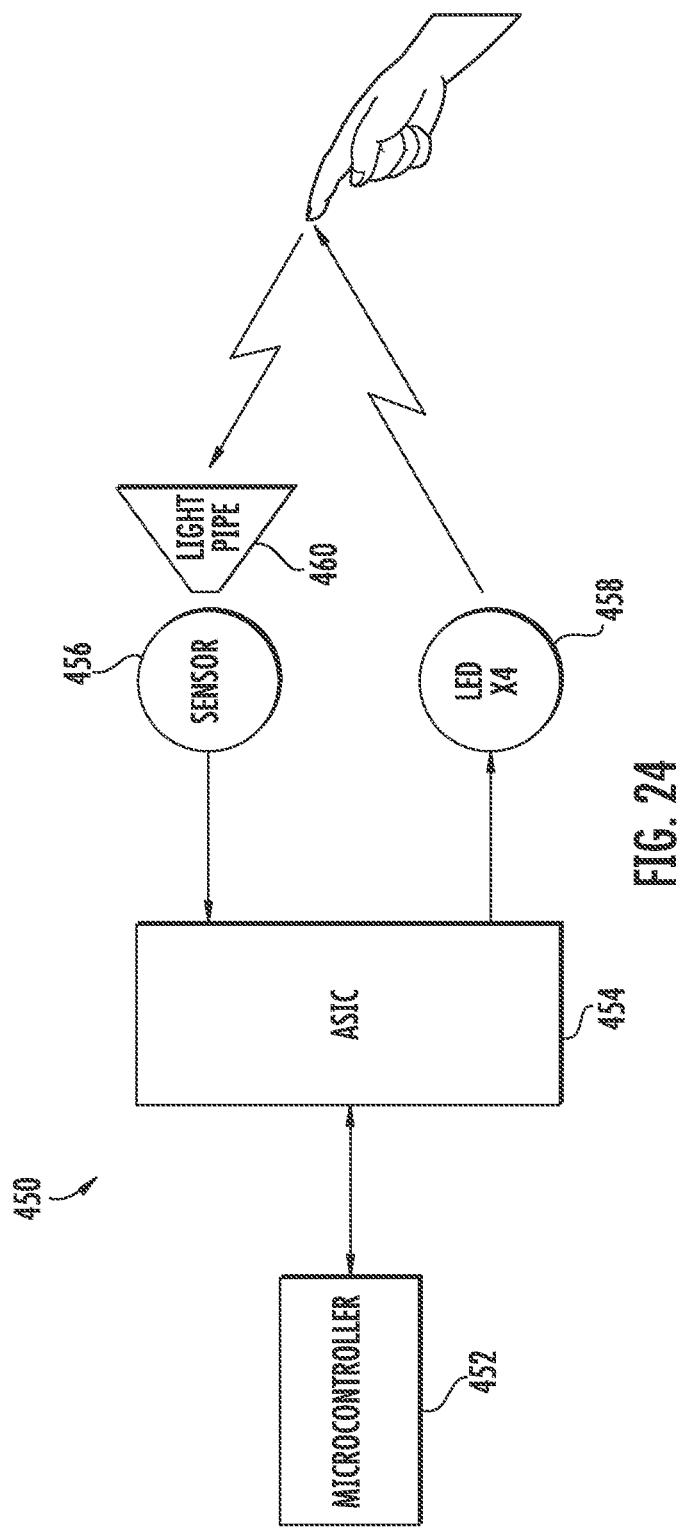

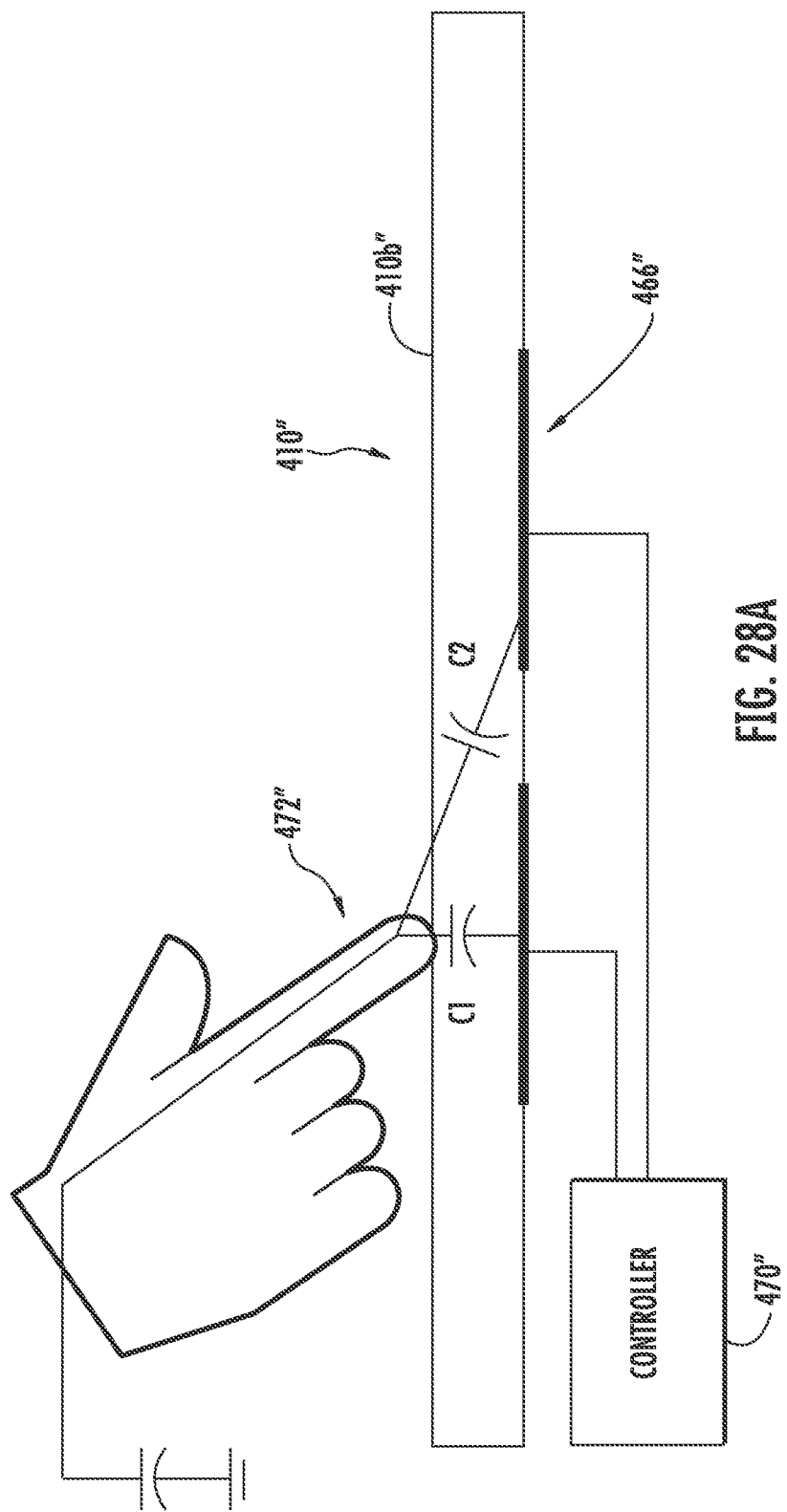

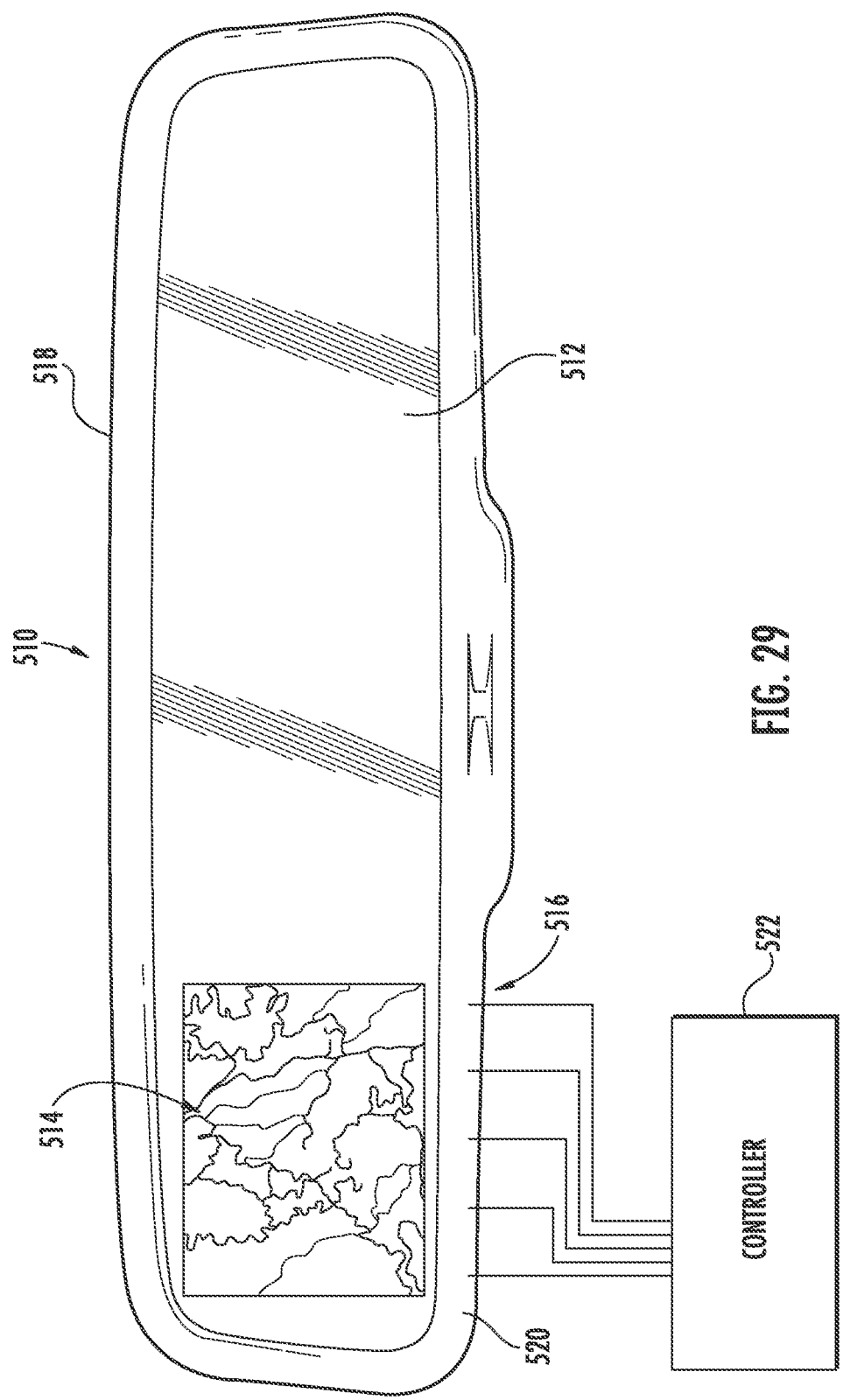

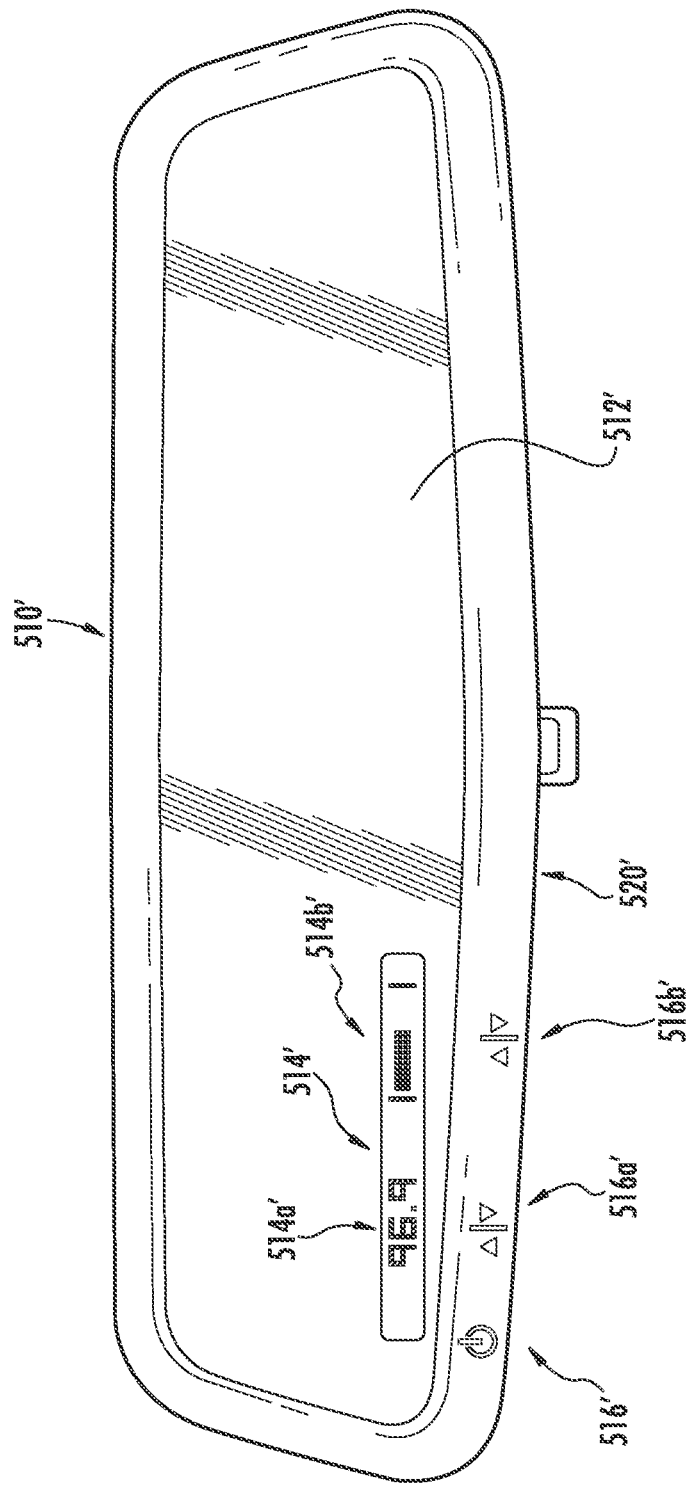

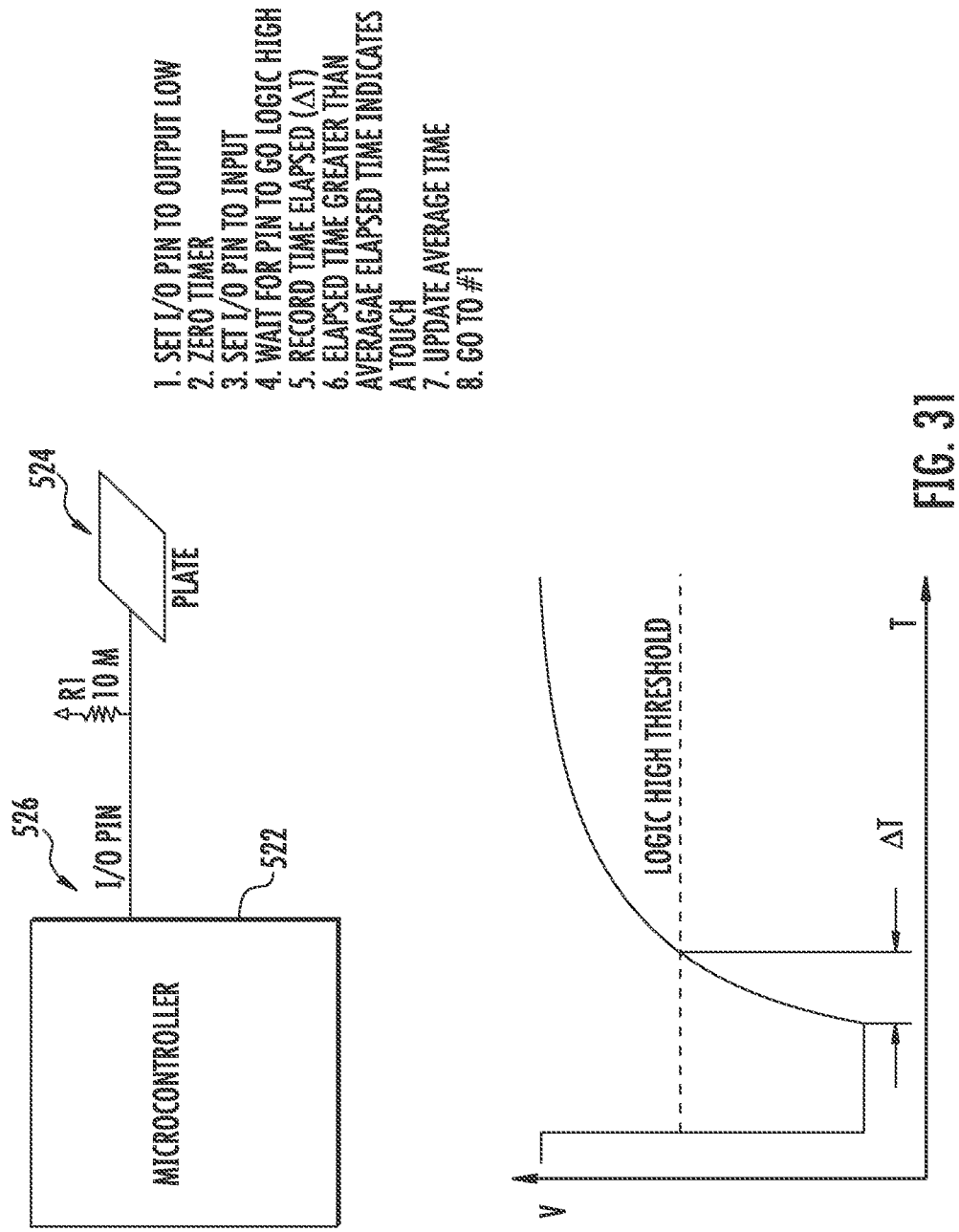

INTERIOR REARVIEW MIRROR SYSTEM

CROSS REFERENCE TO RELATED APPLICATIONS

The present application is a continuation of U.S. patent application Ser. No. 12/414,190, filed Mar. 30, 2009, now U.S. Pat. No. 8,154,418, which claims benefit of U.S. provisional application Ser. No. 61/040,902, filed Mar. 31, 2008; Ser. No. 61/048,687, filed Apr. 29, 2008; Ser. No. 61/050,810, filed May 6, 2008; Ser. No. 61/098,431, filed Sep. 19, 2008; and Ser. No. 61/112,436, filed Nov. 7, 2008, which are hereby incorporated herein by reference in their entireties.

FIELD OF THE INVENTION

The present invention relates to interior rearview mirror systems of vehicles.

BACKGROUND TO THE INVENTION

It is known to provide a video display at an interior rearview mirror assembly of a vehicle. Examples of such mirror assemblies and displays are described in U.S. Pat. Nos. 6,690,268; 7,184,190; 7,274,501; 7,370,983; and/or 7,446,650, which are all hereby incorporated herein by reference in their entireties.

SUMMARY OF THE INVENTION

The present invention provides an interior rearview mirror system for a vehicle. The mirror system includes an interior rearview mirror assembly and (a) a video display for displaying video images in response to an output of a rearward facing camera, (b) an indicator responsive to a detection of an object rearward of the vehicle and responsive to a distance and/or location of the detected object, and (c) a microphone. Optionally, the display module or device may be disposed at the rear of a prismatic substrate or at the rear of a front substrate of an electro-optic reflective element.

According to an aspect of the present invention, a mirror system of a vehicle includes an interior rearview mirror assembly having a reflective element and an information input display or keypad display (such as an alphanumeric keypad display) providing a display representative of a plurality of input characters. The information input display or keypad display is disposed behind the reflective element and viewable through the reflective element when the keypad display is backlit by a backlighting device. The reflective element comprises a transflective reflective element having a transflective mirror reflector that is partially reflecting of light incident thereon and partially transmitting of light therethrough. The keypad display is substantially not viewable or discernible to a person viewing the mirror assembly when the mirror assembly is normally mounted in a vehicle and when the keypad display is not backlit by the backlighting device. The reflective element comprises a touch screen function at the keypad display, and a control of the mirror system is operable to determine a location of a touch or proximity of an object at the reflective element and correlate the determined location to an input character of the keypad display.

The mirror system may include a video display for displaying video images, such as in response to an output of a rearward facing camera or other image capturing device of the vehicle. The keypad display is disposed at a main viewing region of the reflective element so as to provide a keypad display that is larger than the video display.

These and other objects, advantages, purposes and features of the present invention will become apparent upon review of the following specification in conjunction with the drawings.

BRIEF DESCRIPTION OF THE DRAWINGS

FIG. 13 is a perspective view of a roll of films or sheets that are configured to be adhered to the substrate of the mirror assembly to provide a window for the display;

FIGS. 14A-D are views of the roll of films or sheets of FIG. 13;

FIG. 15 is a plan view of another rearview mirror and display in accordance with the present invention;

FIG. 24 is a schematic of a touch screen of another mirror system in accordance with the present invention;

FIG. 28A is a schematic showing how the mirror assembly of FIG. 28 functions to detect a touch at a front surface of the reflective element;

FIG. 29 is a plan view of another mirror assembly in accordance with the present invention, with a plurality of touch or proximity sensors established at a bezel portion of the mirror assembly;

FIG. 30 is a plan view of a mirror assembly similar to FIG. 29, shown with touch or proximity sensors at the bezel portion of the mirror assembly for controlling a radio of the vehicle;

FIG. 31 is a schematic of a touch sensor or proximity sensor system suitable for use with the mirror assemblies of the present invention;

DESCRIPTION OF THE PREFERRED EMBODIMENTS

Figure 1:
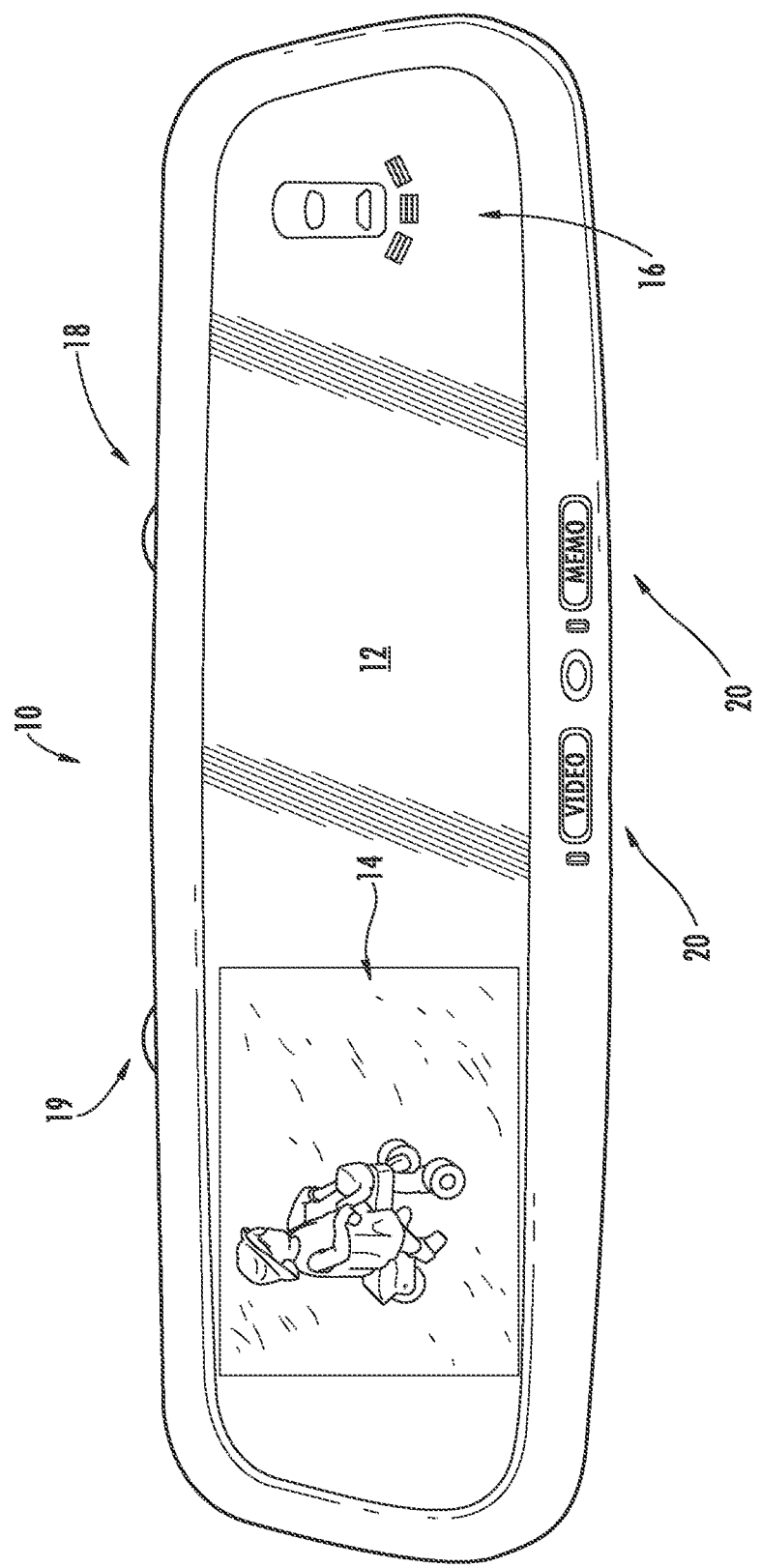
FIG. 1 is a plan view of an interior rearview mirror and display of an interior rearview mirror system in accordance with the present invention.

Referring now to the drawings and the illustrative embodiments depicted therein, an interior rearview mirror system includes an interior rearview mirror assembly having a video display and/or an LED display or indicator and/or a microphone (FIGS. 1-7). The video display may provide a video image of a scene rearward of the vehicle, such as captured by a rearward facing camera of the vehicle. The microphone may receive a vocal input and the system may record the vocal input, such as for recording memos or the like. The mirror system may play back the memos in response to a user input. The indicator may comprise an LED display and may an alert responsive to a distance and location of an object detected rearward of the vehicle.

Figure 2:
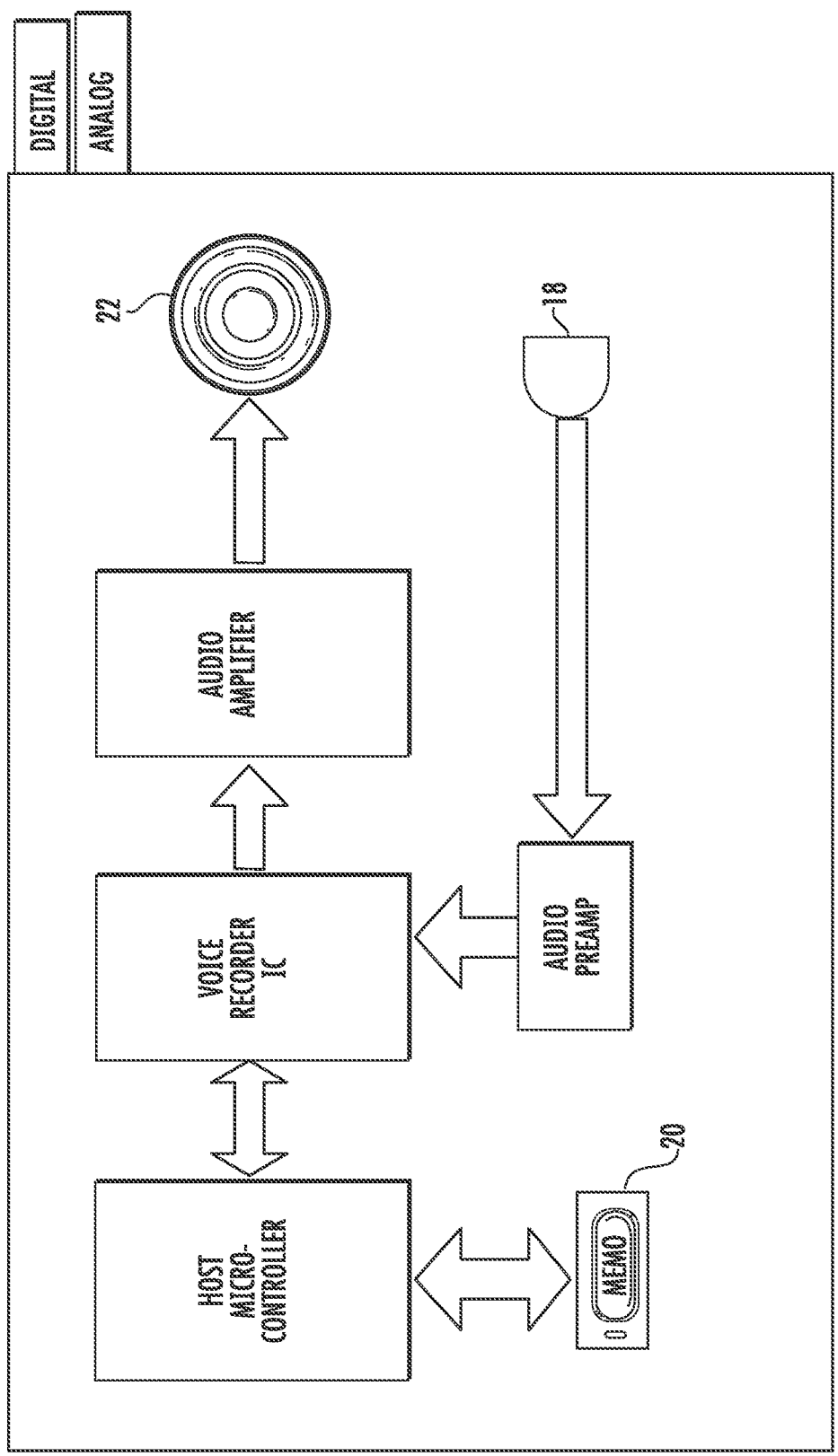
FIG. 2 is a schematic of a voice recorder system of the interior rearview mirror system.
Figure 3:
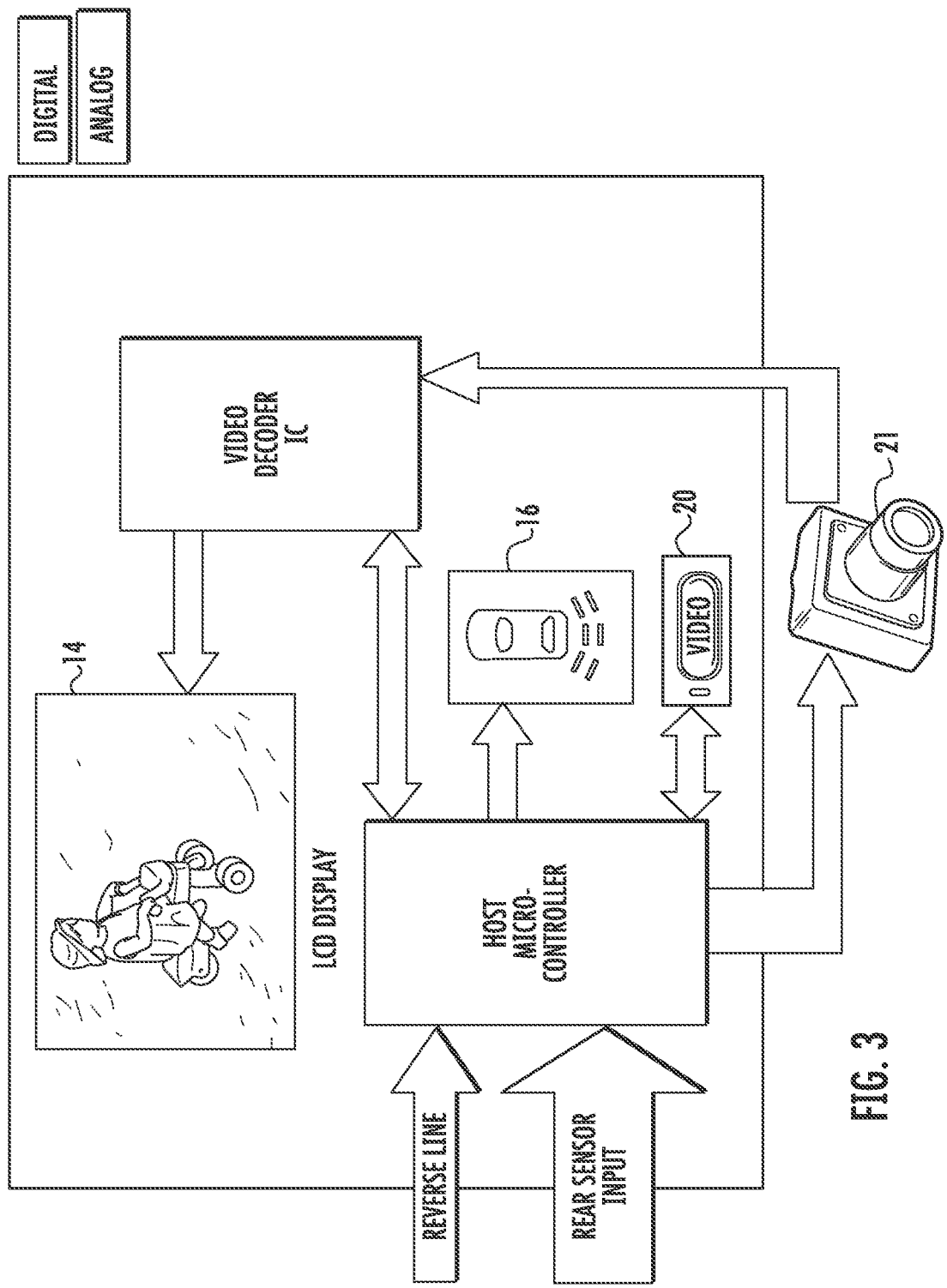
FIG. 3 is a schematic of a video mirror system of the interior rearview mirror system.
Figure 4:
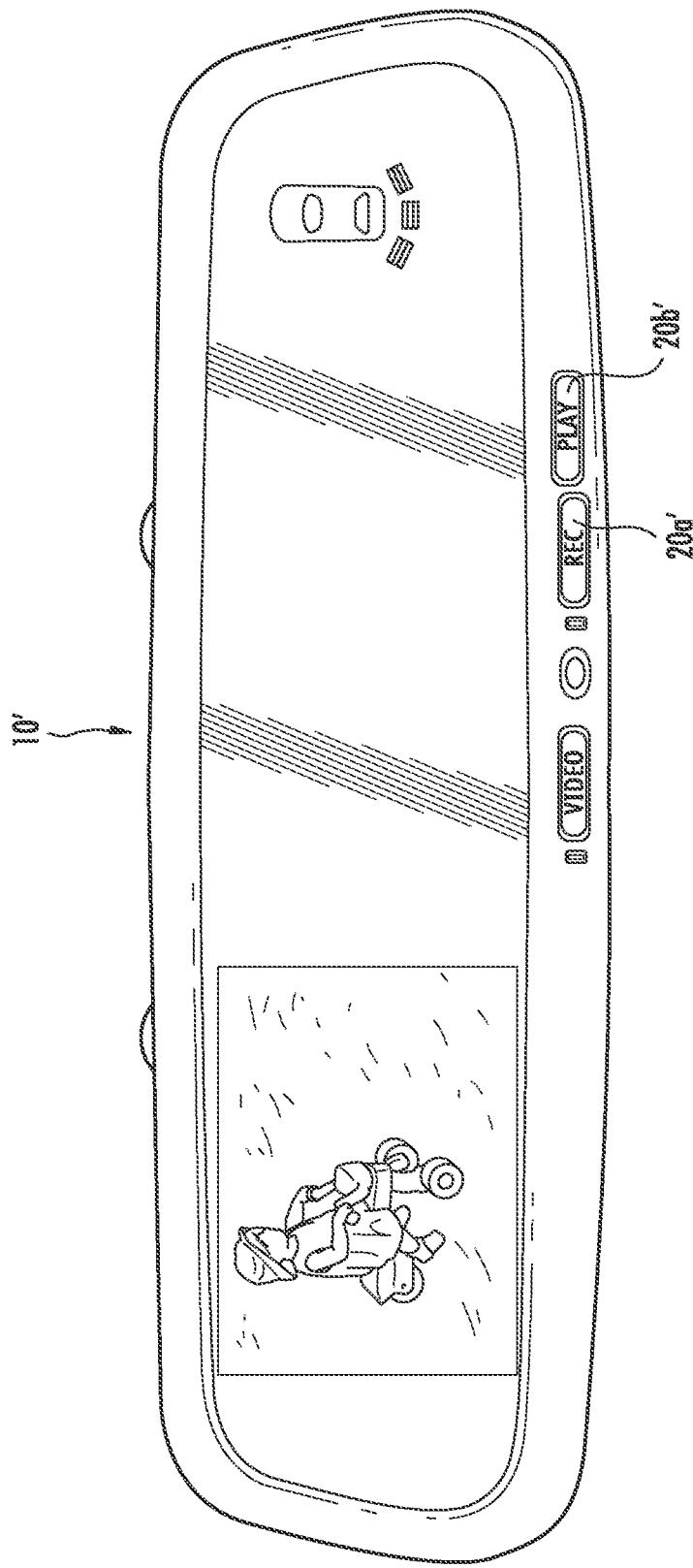
FIG. 4 is a plan view of another interior rearview mirror and display of an interior rearview mirror system in accordance with the present invention.

For example, and with reference to FIGS. 1-3, an interior rearview mirror assembly 10 may include a reflective element 12, a video display 14 and an LED display or indicator 16 and a microphone 18. The video display 14 and LED display and indicators 16 may be disposed behind the reflective element 12 and may be viewable through the reflective element when activated (and may be viewable through the mirror reflector when activated and substantially not viewable through the mirror reflector when deactivated). The mirror assembly 10 may include one or more user inputs or buttons 20. For example, a video button may toggle through various camera views provided by a rearward facing camera 21 and/or other cameras of the vehicle or associated with the mirror system. Optionally, a user input may be actuated to activate or control a recording device at or in or associated with the mirror assembly. The microphone 18 may be disposed at an upper portion of the mirror assembly (and optionally, for a mirror with a single microphone at an upper portion of the mirror casing at or towards a side of the mirror assembly, a non-functional microphone grill or cover element 19 may be provided at an upper portion of the mirror casing at or towards the other side of the mirror assembly to provide a uniform appearance to the mirror assembly). The mirror assembly may include a speaker 22, which may be disposed in the housing of the mirror assembly.

The mirror system or assembly may provide a recording device or system for recording memos or messages or the like in response to the driver or operator activating a user input. For example, the operator may actuate a button to activate a recording device (that receives signals captured by the microphone) to record a message. Optionally, the system may have a "one button-one memo" function that is operable as follows:

To record a memo (Option 1):
Press and hold "Memo" button until beep is heard (approximately 1 second).
Speak the memo to be recorded while holding the "Memo" button.
Release "Memo" button. Mirror will beep twice to confirm recording.
To record a memo (Option 2):
Press and hold "Memo" button until beep is heard (approximately 1 second).
Release the "Memo" button and speak memo to be recorded.
Press "Memo" button again. Mirror will beep twice to confirm recording.
To play back the memo:
Press "Memo" and release within 1 second.
Mirror will play back memo.
Mirror will beep once to indicate end of memo.
To stop the playback of a memo, press the "Memo" button and release.
To erase the memo (Option 1):
Press and hold "Memo" button until beep is heard (approx 1 second).
Immediately release "Memo" button without speaking.
Mirror will beep twice to confirm erase.

Optionally, a mirror assembly 10' (FIG. 4) may include a two button record and play function (with a first user input or button 20a' for activating a record feature and a second user input or button 20b' for activating a playback feature). For example, such a system may be operable as follows:

To select memo to be recorded:

Press "Rec" button and release within one second.

Mirror will beep once for Memo #1, twice for Memo #2, and three times for Memo #3 (of more or less times for any number of memos).

Keep pressing and releasing "Rec" button until desired Memo is selected.

To record selected memo:

Press and hold "Rec" button until a beep is heard.

Speak the memo to be recorded while holding the "Rec" button.

Release "Rec" button. Two beeps will be heard to confirm recording.

To select memo to be played back:

Press "Play" button and release within one second.

Mirror will beep once for Memo #1, twice for Memo #2, and three times for Memo #3.

Keep pressing and releasing "Rec" button until desired Memo is selected.

To play back a memo:

Press and hold "Play" button until beep is heard, then release.

Mirror will play back memo.

Mirror will beep once to indicate end of memo.

To stop the playback of a memo, press the "Play" button and release.

Figure 5:
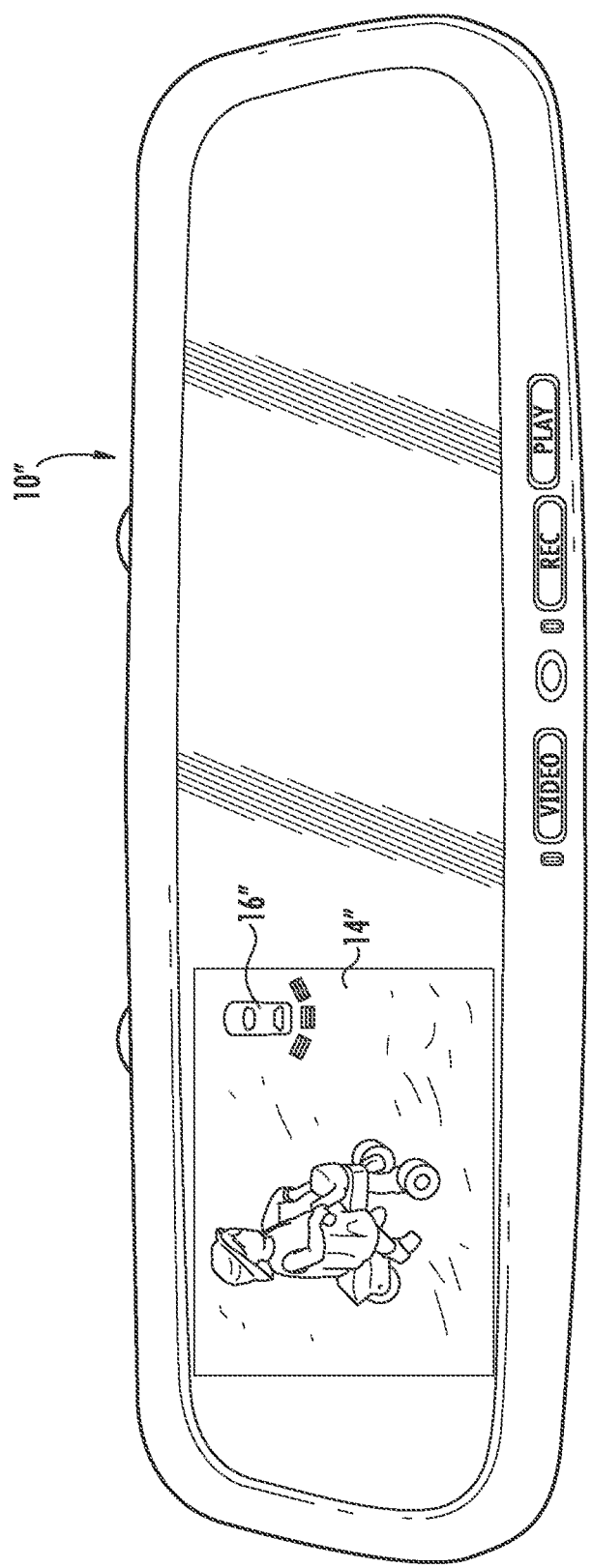
FIG. 5 is a plan view of another interior rearview mirror and display of an interior rearview mirror system in accordance with the present invention.
Figure 6:
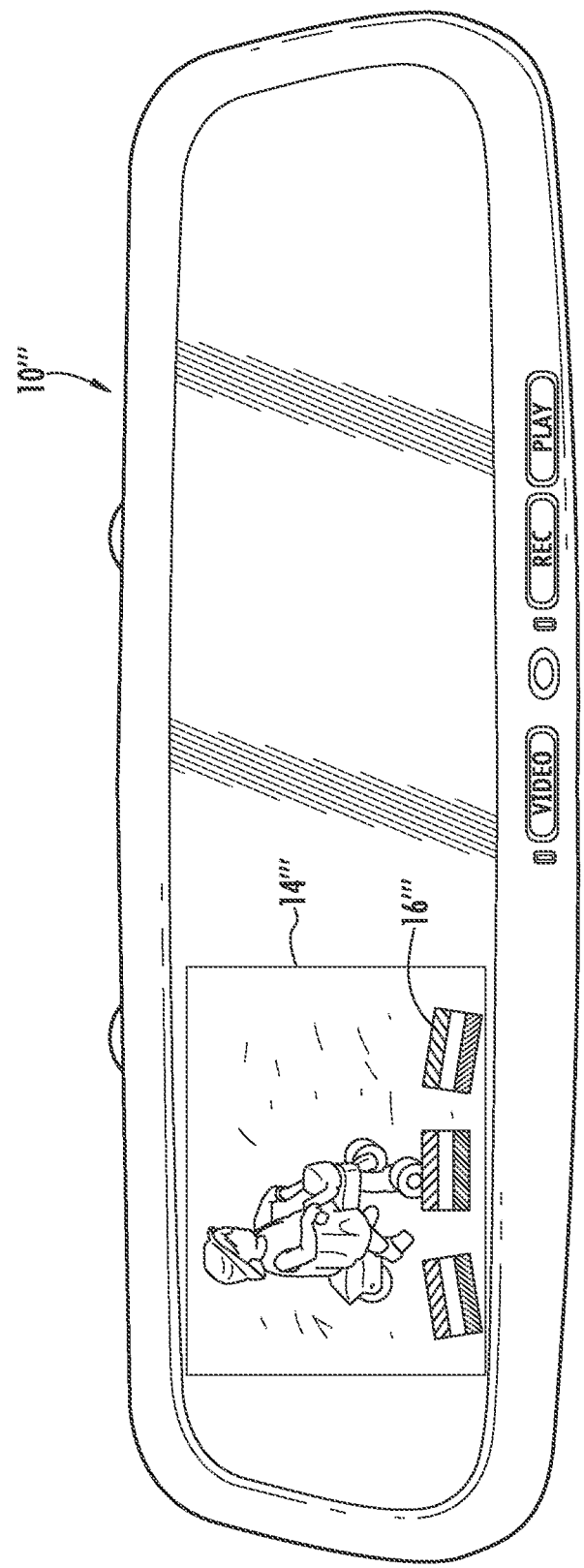
FIG. 6 is a plan view of another interior rearview mirror and display of an interior rearview mirror system in accordance with the present invention.

Optionally, and with reference to FIG. 5, a mirror assembly 10" may have an overlay or indicator 16" in the video display area 14" of the mirror. Thus, the driver may only have to look in one area of the mirror for reverse information. The overlay graphics may be generated in the LCM display or the image can be supplied by the camera. The overlay graphics may be any size and/or configuration depending on the particular application of the mirror assembly. Optionally, and with reference to FIG. 6, a mirror assembly 10''' may include an overlay or indicator 16''' that may provide colored bands (such as red, yellow and green bands at the side and center regions of the video display 14''') that may light up individually depending on the distance to and location of an object or obstacle detected rearward of the vehicle.

Figure 7:
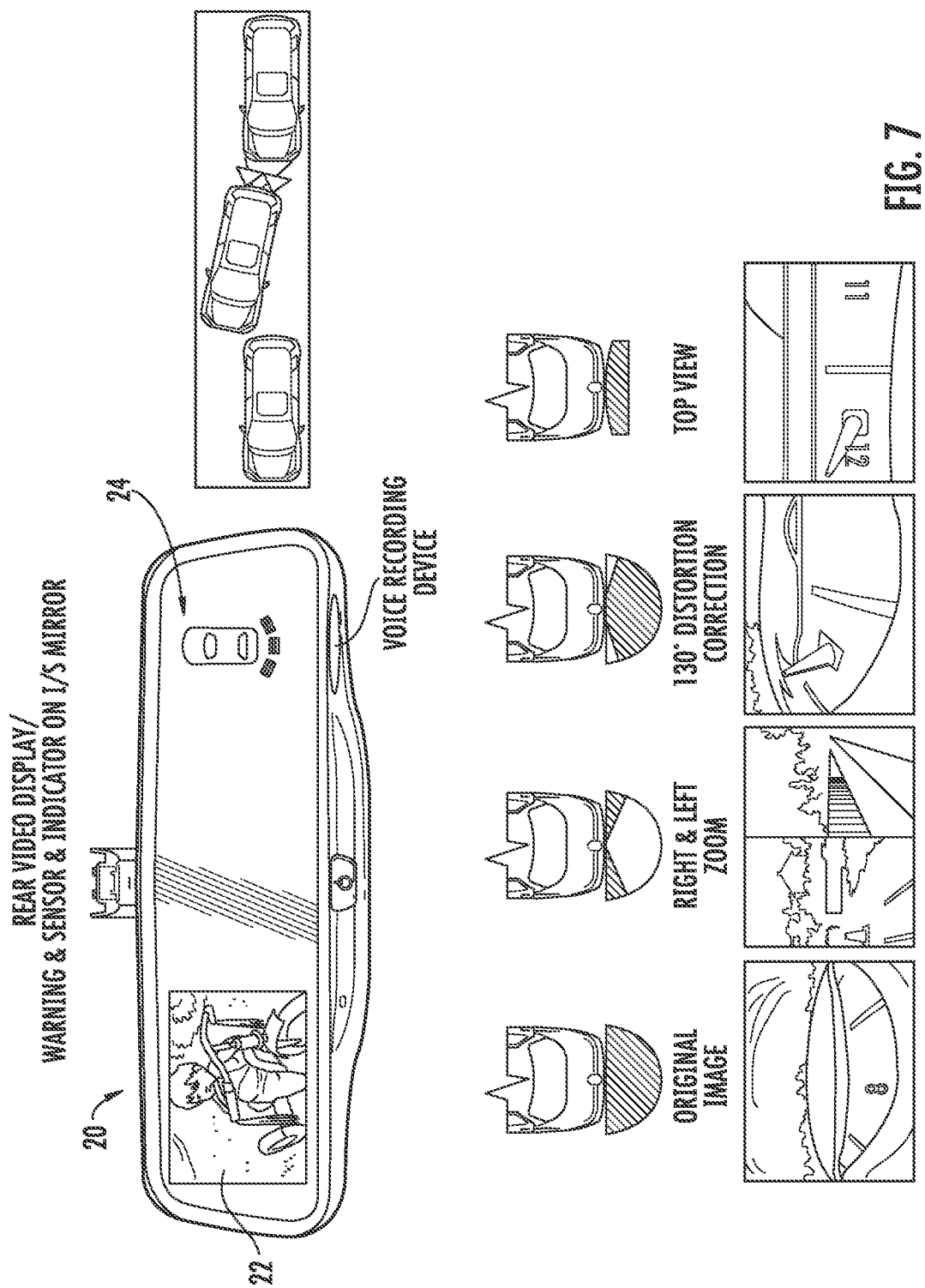
FIG. 7 is a plan view of another interior rearview mirror and display of an interior rearview mirror system in accordance with the present invention, including schematics of rearward views captured by a rearward facing camera of the vehicle.
Figure 8:
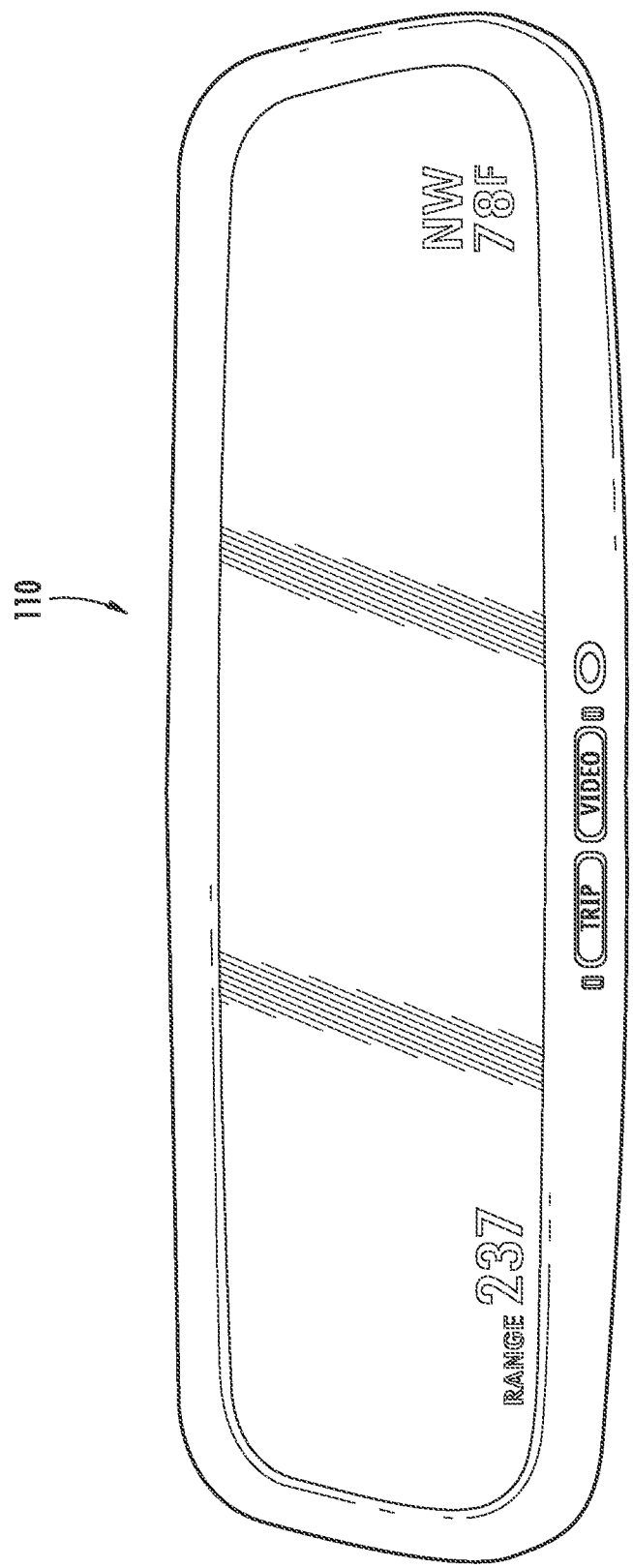
FIG. 8 is a plan view of another interior rearview mirror and display of an interior rearview mirror system in accordance with the present invention, with the mirror having multiple displays and showing the displays displaying trip and compass/temperature information.
Figure 9:
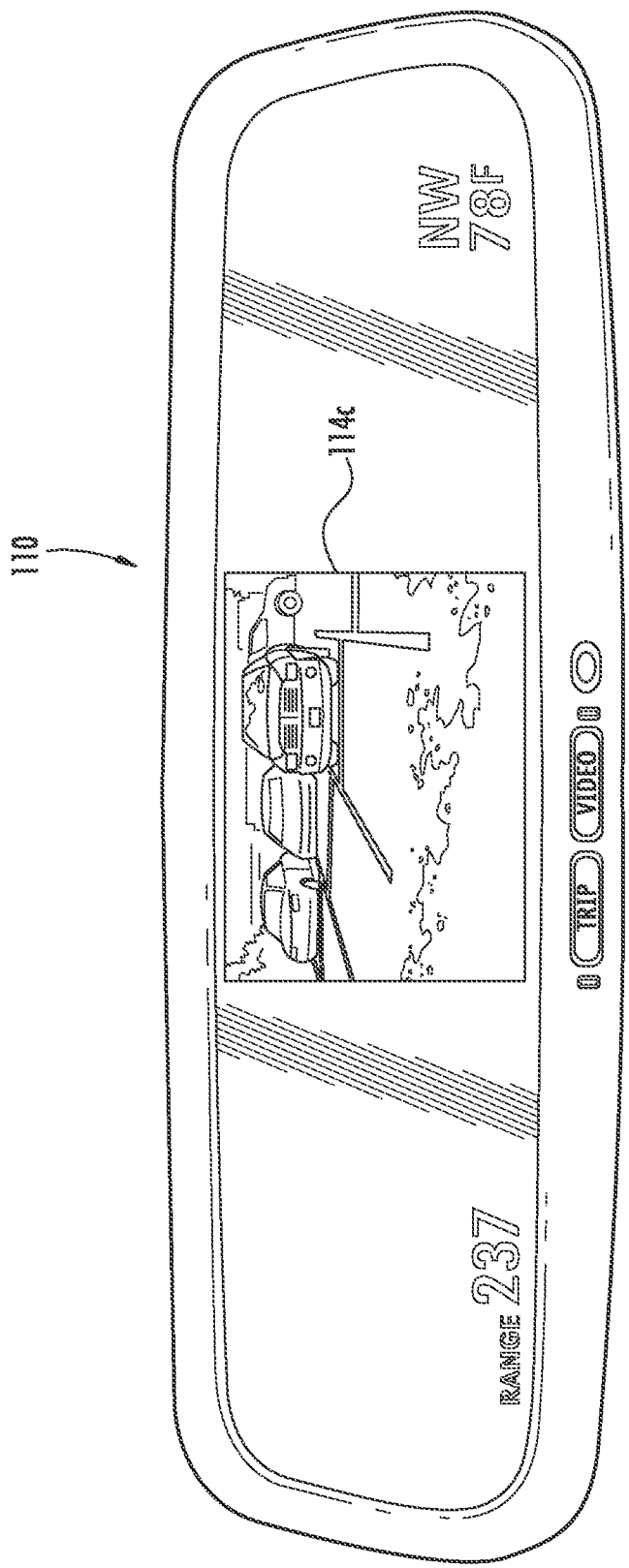
FIG. 9 is a plan view of the interior rearview mirror and display of FIG. 8, showing the center display displaying an image of the area rearward of the vehicle, which may be displayed in response to the driver of the vehicle selecting a reverse gear of the vehicle.
Figure 10:
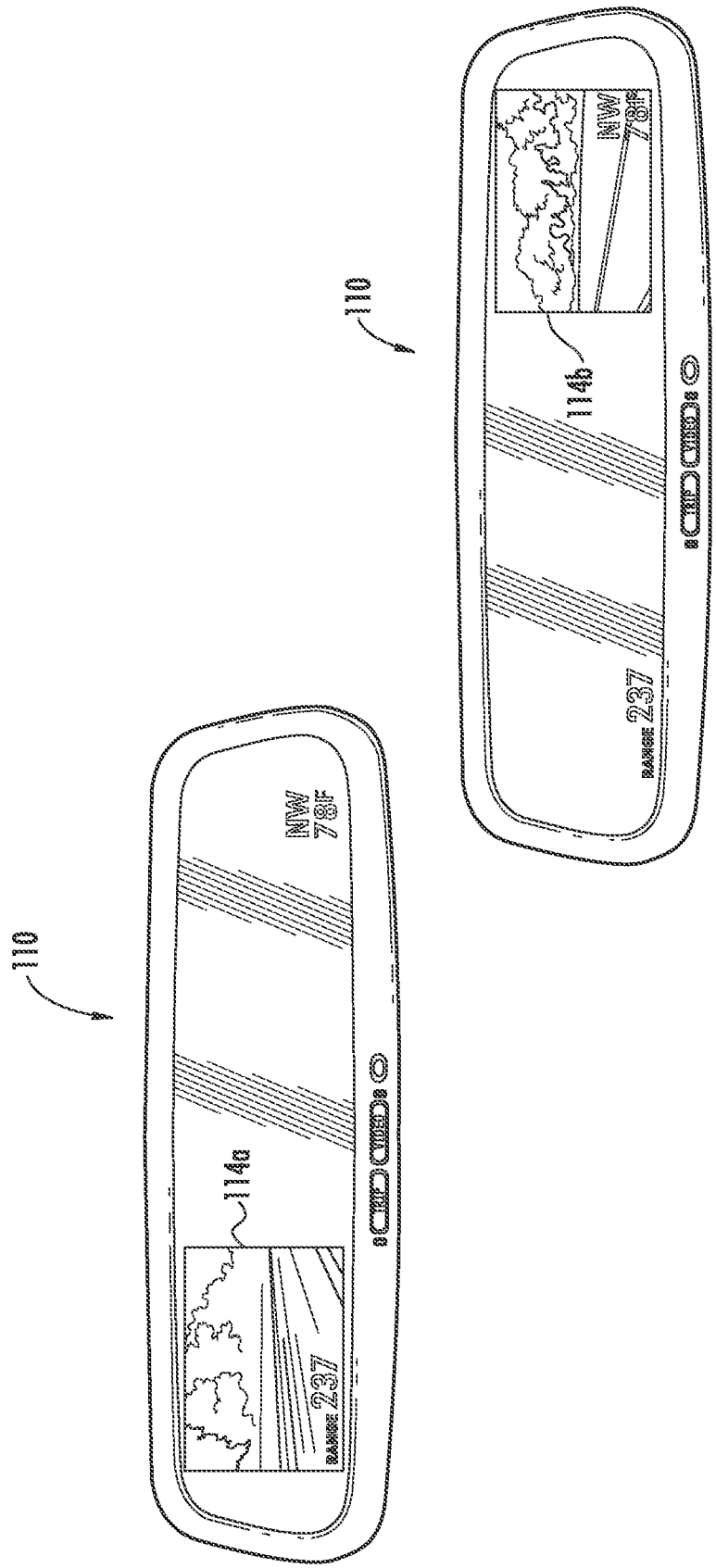
FIG. 10 is a plan view of the interior rearview mirror and display of FIGS. 8 and 9, showing the left display displaying the area to the left of the vehicle (such as captured by a camera having a generally sideward and rearward field of view at the left side of the vehicle), such as in response to the left hand turn signal being activated, and showing the right display displaying the area to the right of the vehicle (such as captured by a camera having a generally sideward and rearward field of view at the right side of the vehicle), such as in response to the right hand turn signal being activated.
Figure 11:
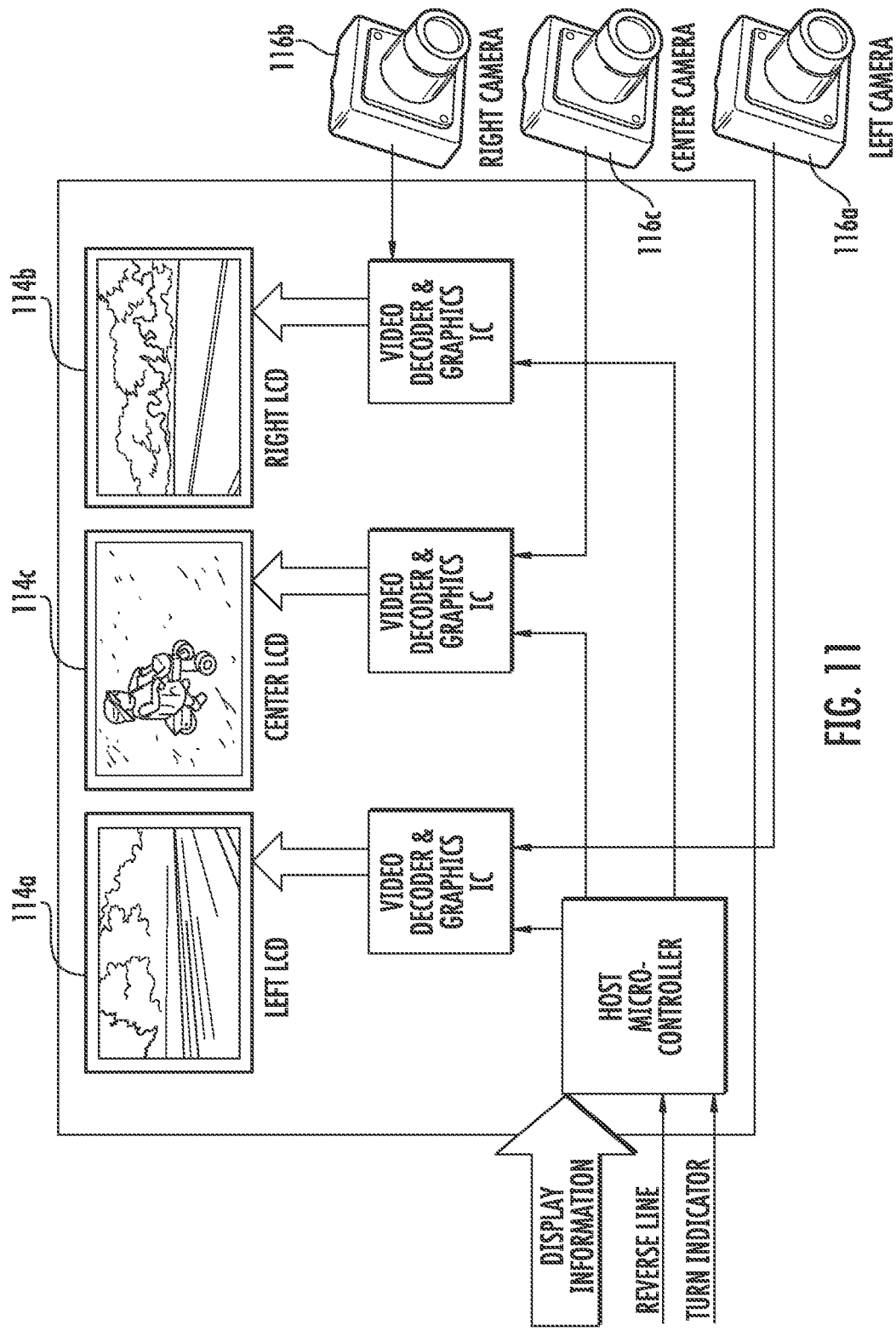
FIG. 11 is a schematic of the mirror system of FIGS. 8-10.

With reference to FIG. 7, a mirror assembly 20 may include a video display 22 and an indicator 24, such as similar to those described above, and the video display may provide different views of the scene rearward of the vehicle. Optionally, the user or driver may select which view he or she wants to see at the mirror via a user input or button at the mirror assembly.

As shown in FIGS. 8-11, a mirror system may include three displays at an interior rearview mirror assembly 110, with a left display 114a for displaying images of an area generally to the left side of the equipped vehicle, a right display 114b for displaying images of an area generally to the right side of the equipped vehicle, and a center display 114c for displaying images of an area generally to the rear of the equipped vehicle. The displays may display video images as captured by respective cameras of the vehicle. Optionally, and desirably, the center display 114c may be activated to display the rearward images (captured by a rearward facing camera 116c) in response to the gear actuator or shifter of the vehicle being placed into a reverse gear position. Optionally, the left and right video displays 114a, 114b may be activated to display the respective sideward and rearward images (such as captured by respective sidewardly and rearwardly facing cameras 116a, 116b) in response to activation of the appropriate or respective left or right turn signal of the vehicle. The mirror assembly and/or displays may display other information, such as distances, temperature and/or compass and/or trip data or information or the like.

The mirror reflector may comprise a transflective mirror reflector so that the display or displays is/are viewable by the driver of the vehicle when activated and the display or displays is/are not readily viewable or discernible when not activated.

Figure 12:
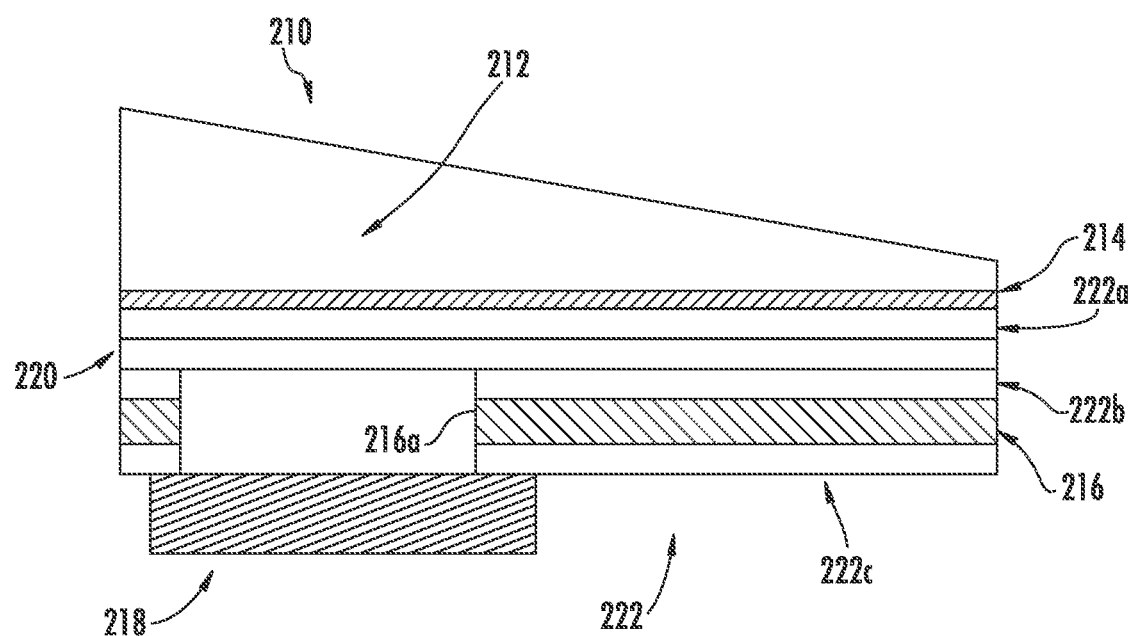
FIG. 12 is sectional view of another rearview mirror and display assembly in accordance with the present invention.

Referring now to FIG. 12, an interior prismatic mirror reflective element 210 includes a prismatic or wedge shaped substrate 212 having a transflective mirror reflector 214 disposed at the rear surface 212a of substrate 212. A light absorbing or masking element or opacifying element 216 is adhered or otherwise disposed to the rear of the mirror reflector 214, with a window or aperture 216a formed or established through the masking element 216. A display element or device 218 is disposed to the rear of the masking element 216 and generally at the window 216a so that information displayed by the display device 218 is viewable through the substrate 212 and mirror reflector 214. Optionally, and desirably, the display device is spaced affirmatively rearward from the reflective element substrate, in order to limit or reduce the viewability or discernibility of the display device when the display device is not activated and enhance its covertness, such that the mirror assembly provides a high transmission of the light or information emitted by the display device while providing enhanced covertness of the display device when it is not activated. In the illustrated embodiment, a transparent spacing element 220 is disposed between the mirror reflector 214 and the masking element 216 to space the masking element and display device slightly rearward from the mirror reflector 214 and substrate 212. Optionally, the spacing element may be transparent or may be tinted (such as a grey color or the like) to enhance the appearance of the mirror reflector. Optionally, the film or layer or element may have a refractive index close to that of glass, such as soda-lime glass or the like (such as a refractive index of between about 1.45 and about 1.75 or thereabouts at the sodium D line, or of between about 1.5 and about 1.65 or thereabouts at the sodium D line). The transparent spacing element is useful in assisting in rendering the presence of the un-illuminated display device or video screen substantially non-noticeable behind the transflective mirror element to a driver viewing such an interior transflective display-on-demand minor assembly when it is normally mounted and viewed in the vehicle, such as in a similar manner as the metal shim described in U.S. patent application Ser. No. 11/912,576, filed Oct. 25, 2007, now U.S. Pat. No. 7,626,749 and PCT Application No. PCT/US2006/018567, filed May 15, 2006, and published Nov. 23, 2006 as International Publication No. WO 2006/124682, which are hereby incorporated herein by reference in their entireties.

In the illustrated embodiment, the transparent spacing element 220 and masking element 216 are provided as a transparent plastic sheet or film 222 that is adherable to the rear of the substrate 212, such as to the rear of the mirror reflector 214 disposed at the rear surface 212a of substrate 212. Alternately, a thin glass sheet may be used. The sheet or film 222 may include a layer of clear adhesive 222a (preferably index-matched to the refractive index of soda-lime glass that is around 1.52 at the sodium D line) at a forward facing surface of the transparent spacing element 220 and another layer of adhesive 222b between the transparent spacing element 220 and the masking element 216. A third layer of adhesive 222c may be disposed at the rear of the masking element 216 for adhering the display device and/or other elements at the rear of the reflective element. As can be seen in FIG. 12, the adhesive layers 222b and 222c may also have a window or aperture formed therethrough that corresponds with the window or aperture 216a of masking element 216. As indicated, such adhesive layers preferably are substantially index-matched to glass.

Figure 14C:
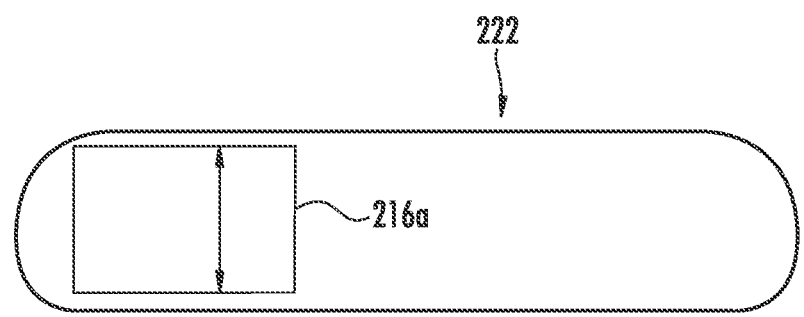
Figure 14D:
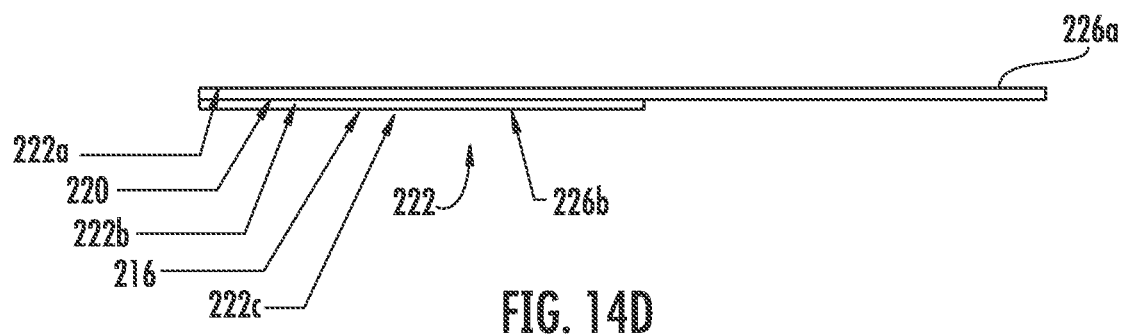

Optionally, and as shown in FIGS. 13-14D, the sheet or film 222 may be provided as a roll 224 or strip of sheets or films that are adhered to a peel away backing strip 226a, whereby the individual sheet or film 222 (including the transparent spacing element and masking element and adhesive layers) may be removed from the backing strip 226a and applied to the rear of the reflective element. The backing strip 226a may be provided as a roll whereby the strip may be unrolled to expose or access the individual sheets or films 222. Optionally, a die cut release liner 226b may be provided at the adhesive layer of the sheet or film 222 opposite the backing strip or rolled release liner 226a, such that the individual film or sheet may be removed from the rolled release liner 226a and adhered to or applied to the rear of the reflective element, and the rear adhesive layer 222c may remain unexposed (by its being covered with the die cut release liner 226b) until it is desired or appropriate to expose the adhesive layer 222c, such as when the display device is disposed at the rear of the sheet or film 222.

The liners and adhesives and layers may comprise any suitable materials, depending on the particular application of the sheets or films. For example, the rolled release liner may comprise clear colored PET material, such as a 3 Mil PET with a medium/light release from the adhesive layer 222a, while the die-cut release liner may comprise a paper material (such as a white paper material) that may be silicone coated on one side to ease removal from the adhesive layer 222c. Optionally, the 3 Mil PET liner may have an easy release silicone coating on one side and a slip coating on the other side. Optionally, the 3 Mil Facestock may be chemically treated on one side to promote ink adhesion, while the adhesive layer may comprise a water clear permanent acrylic adhesive or the like. Optionally, a water clear polyester over-laminating film with a print receptive coating may be disposed on one side for enhanced ink adhesion. The selected adhesive may provide enhanced clarity and enhanced balance of shear and peel strength, thus providing performance characteristics. The sheets or films thus may be highly suitable in applications requiring a high degree of durability and dimensional stability.

The display element or device may comprise any suitable display element, such as a video display screen or the like, and/or may comprise a touch screen or touch display. For example, the touch display may comprise a surface capacitive or projected capacitive touch panel display or the like. Thus, the touch screen may be disposed behind the mirror substrate, such that the mirror reflective element has a continuous front surface to enhance the appearance and the cleaning/wiping of the mirror reflective element.

Figure 16:
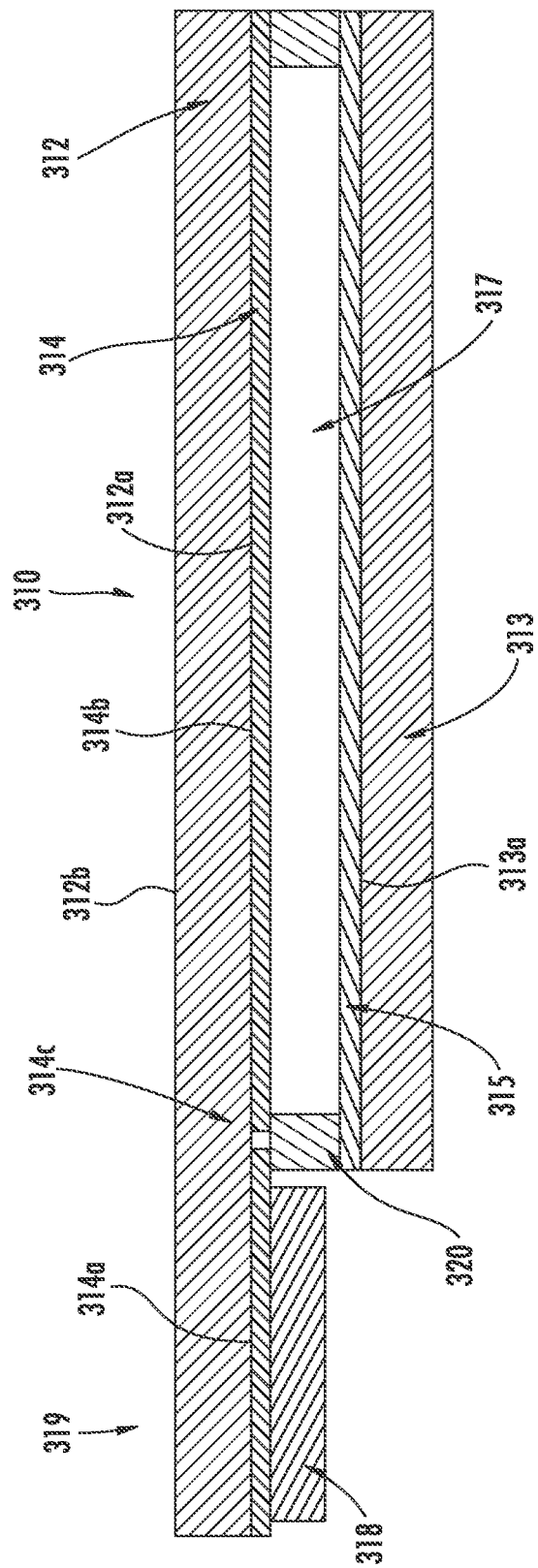
FIG. 16 is a sectional view of the rearview mirror and display of FIG. 15.

Optionally, and with reference to FIGS. 15 and 16, a reflective element assembly 310 for an interior rearview mirror assembly 311 (that is mountable to an interior portion of a vehicle by a mounting arm or structure 311a that may attach or adhere to a mounting element at the interior surface of the vehicle windshield or at an overhead console or headliner of the vehicle) includes a display element or device 318 that is operable to display information for viewing by the driver of the vehicle through at least a portion of the reflective element assembly 310. As shown in FIG. 16, reflective element assembly 310 comprises a variable reflectance reflective element having an electro-optic medium 317 (such as, for example, an electrochromic medium) disposed between a front substrate 312 and a rear substrate 313. The front substrate 312 has a transparent conductor or conductive layer or coating 314 (such as a thin film or layer or coating of indium tin oxide (ITO) or the like) disposed or deposited on the rear surface 312a of front substrate 312, while the rear substrate 313 has a reflector coating or layer 315 (such as a metallic coating or layer or the like) disposed or deposited on the front surface 313a of rear substrate 313 (so as to provide a "third surface reflector" at the front surface of the rear substrate and behind the electro-optic medium 317). The reflective element assembly 310 includes a perimeter seal 320 disposed around the electro-optic medium and between front substrate 312 and rear substrate 313 to space the substrates apart and to seal the electro-optic medium between the substrates.

As can be seen in FIG. 16, the front substrate 312 has a larger cross dimension than the rear substrate 313 and extends beyond a side edge of the rear substrate to provide a display region 319 at one side (such as the driver's side) of the mirror reflective element 310 (such as in a similar manner as described in U.S. patent application Ser. No. 12/187,725, filed Aug. 7, 2008, which is hereby incorporated herein by reference in its entirety). Display device 318 (such as a backlit LCD video screen or other suitable display element, such as an organic light emitting diode OLED screen or a low-cost monochrome multipixel vacuum fluorescent screen or the like) is operable to emit or project illumination or display information through the transparent conductor 314 and front substrate 312 so as to be viewable by the driver of the vehicle when the display device is activated. The transparent conductor 314 extends across the rear surface 312a of front substrate 312, and the portion 314a of the transparent conductor 314 at the display region 319 may be electrically isolated or insulated from the portion 314b of the transparent conductor at the principal reflecting region or main viewing region of the mirror (and at the electro-optic medium), such as via an electrically insulating demarcation line 314c formed or established through the transparent conductor 314 (such as a laser scribed break or gap in the transparent conductor) at an inboard region of the display region. Note that optionally, the portion 314a of the transparent conductor 314 at the display region may be dispensed with so that the display region is devoid of the transparent conductor (such as, for example, by masking the display region when the transparent electrical conductor coating of portion 314b is being deposited).

Thus, the principal reflecting region or main viewing region of the mirror reflective element may be variably reflectant responsive to dimming of the electro-optic medium via powering of the transparent conductor and the third surface reflector, while the display region 319 allows for viewing of the display information through the front substrate. Thus, the front surface 312b of the front substrate 312 is continuous across the reflective element to provide an unbroken front surface of the reflective element, which facilitates the likes of ease of wiping/cleaning and that presents to the driver in an attractive, utilitarian manner. Optionally, a user input display (such as a keypad display or the like, such as discussed below) may be disposed behind the front substrate at the display region, whereby a user may view and select and activate or control an accessory or feature of the mirror system or mirror assembly, such as in a similar manner as discussed below. Optionally, one or more light absorbing, substantially opaque hiding layers or coatings may be disposed at the rear of the front substrate and between the front substrate and the perimeter seal so as to effectively hide or conceal the perimeter seal from being readily viewable by a person viewing the reflective element. Such a light absorbing or substantially opaque hiding layer or coating may comprise any suitable material, such as a metallic material, such as a chromium metallic reflective layer or the like, and may utilize aspects of the metallic reflective perimeter bands described in U.S. Pat. Nos. 7,274,501; 7,255,451; and/or 7,184,190; and/or U.S. patent application Ser. No. 11/226,628, filed Sep. 14, 2005, and published Mar. 23, 2006 as U.S. Publication No. US 2006/0061008; and/or Ser. No. 11/912,576, filed Oct. 25, 2007, now U.S. Pat. No. 7,626,749, which are hereby incorporated herein by reference in their entireties.

Such a cross border or border band or separating or demarcating or hiding or bordering or framing or outlining layer or element or coating or strip or band (that may be an opaque or partially opaque or reflective coating or light absorbing coating or element) thus may be established at the perimeter edge regions of the front substrate and along the perimeter seal (and thus around the electro-optic active region) so as to outline or demarcate or border the perimeter of the display element or display region. The hiding layer thus may mask or hide from direct view of the driver the seal and/or other components or elements of the mirror reflector assembly construction that are to the rear of the front substrate and in the area of the bordering or hiding layer or element. The hiding layer thus serves as a demarcation element and a hiding or occluding element for the display element disposed behind the glass substrate at the display region of the mirror reflector assembly. Optionally, the hiding layer or demarcating or bordering layer may be implemented to demarcate or border other accessories or devices, such as other display devices or elements or a wide angle reflector element or the like (such as by utilizing aspects of the mirror assemblies described in U.S. patent application Ser. No. 12/187,725, filed Aug. 7, 2008, which is hereby incorporated herein by reference in its entirety).

Figure 17:
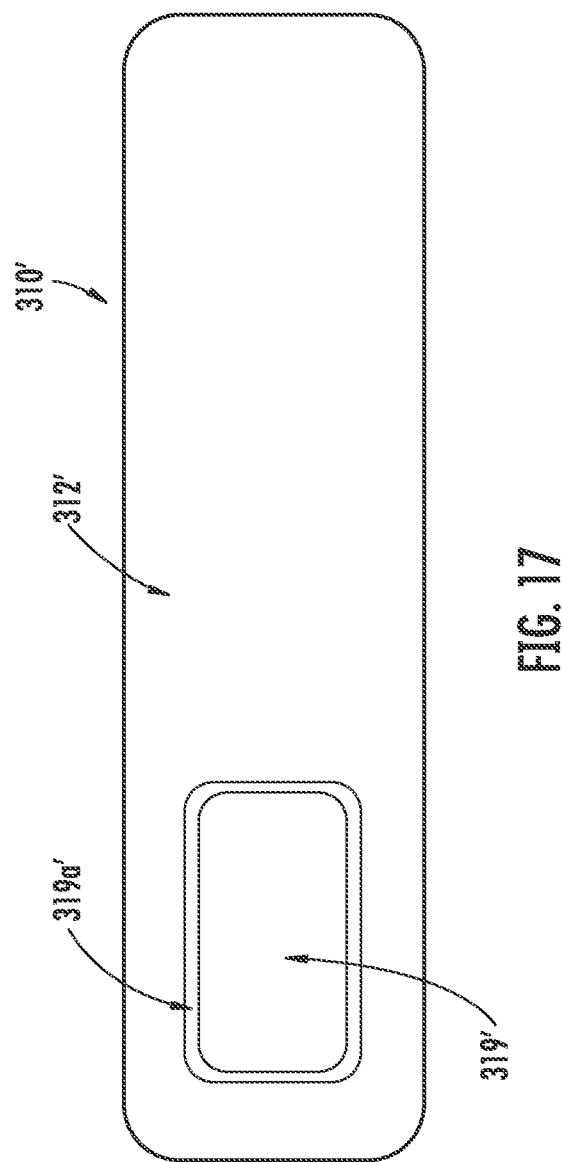
FIG. 17 is a plan view of another rearview mirror assembly in accordance with the present invention.

Optionally, and with reference to FIG. 17, a front substrate 312' of a mirror reflective element assembly 310' may have an aperture or window 319' cut or formed or otherwise established therethrough to provide a window at which the display element or device may be disposed. The edges 319a' of window 319' may be chamfered or seamed to provide an aesthetically pleasing window frame around the window to provide an enhanced appearance to the mirror reflective element and mirror assembly. The display element or device may be disposed behind the substrate with its viewing area at the window so that a person viewing the reflective element may readily view the information being displayed by the display element or device through the window or aperture in the front substrate. The mirror reflective element assembly 310' may otherwise be similar to mirror reflective element 310 discussed above, such that a detailed discussion of the mirror reflective elements need not be included herein.

Figure 18:
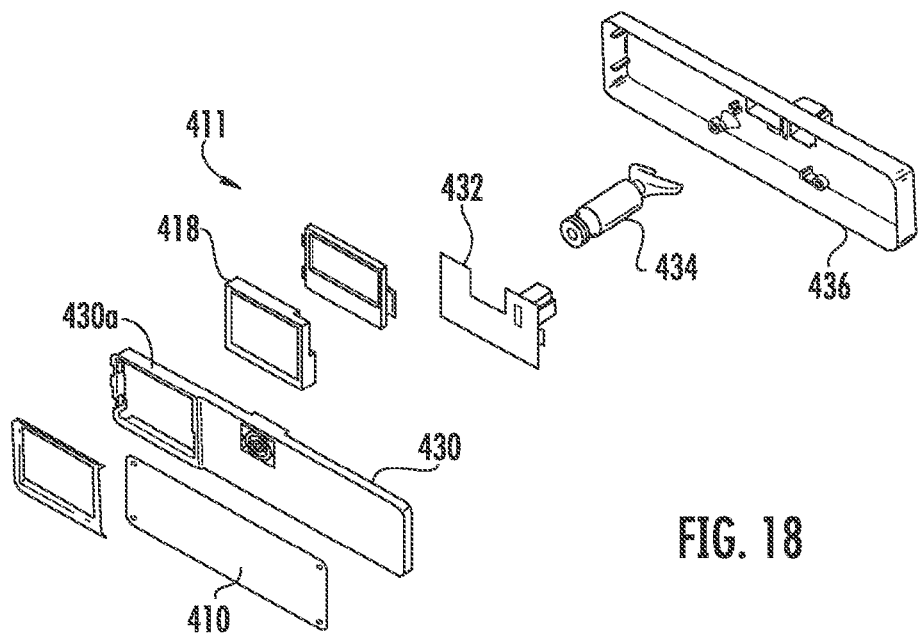
FIG. 18 is an exploded perspective view of another rearview mirror and display assembly in accordance with the present invention.

Optionally, and with reference to FIG. 18, an interior rearview mirror assembly 411 includes a video display module or element or device 418, such as in a similar manner as described in U.S. Pat. Nos. 6,690,268; 7,184,190; 7,274,501; and/or 7,370,983, and/or U.S. patent application Ser. No. 12/091,525, filed Apr. 25, 2008, now U.S. Pat. No. 7,855,755; Ser. No. 10/538,724, filed Jun. 13, 2005, and published on Mar. 9, 2006 as U.S. Publication No. US 2006/0050018; and/or Ser. No. 10/755,915, filed Jan. 13, 2004, now U.S. Pat. No. 7,446,650, which are all hereby incorporated herein by reference in their entireties. As can be seen in FIG. 18, mirror assembly 411 includes a reflective element 410 that is disposed at a front casing portion or back plate 430, with the back plate 430 including a display receiving portion 430a for supporting the display element at a side region proximate the driver side or end of the reflective element. The display element 418 may be received at the display receiving portion 430a and circuitry or a circuit board 432 may be disposed at the display element for electrically connecting the display element or module to power and/or control. The mirror assembly 411 may include a mounting structure 434 (such as a double ball mounting arm or the like) that may attach to the back plate 430 and that may extend from the back plate 430 and through a rear casing 436 of mirror assembly 411 and mount or attach to a mounting element or button at an interior portion of the vehicle, such as at an interior surface of the vehicle windshield or the like.

Figure 19:
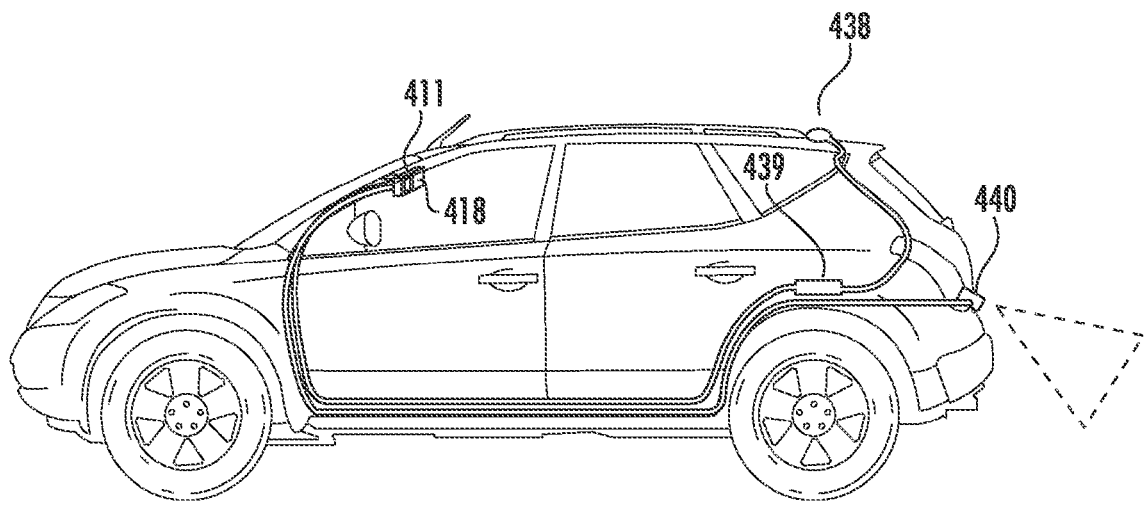
FIG. 19 is a side elevation of a vehicle incorporating a mirror system of the present invention.
Figure 20:
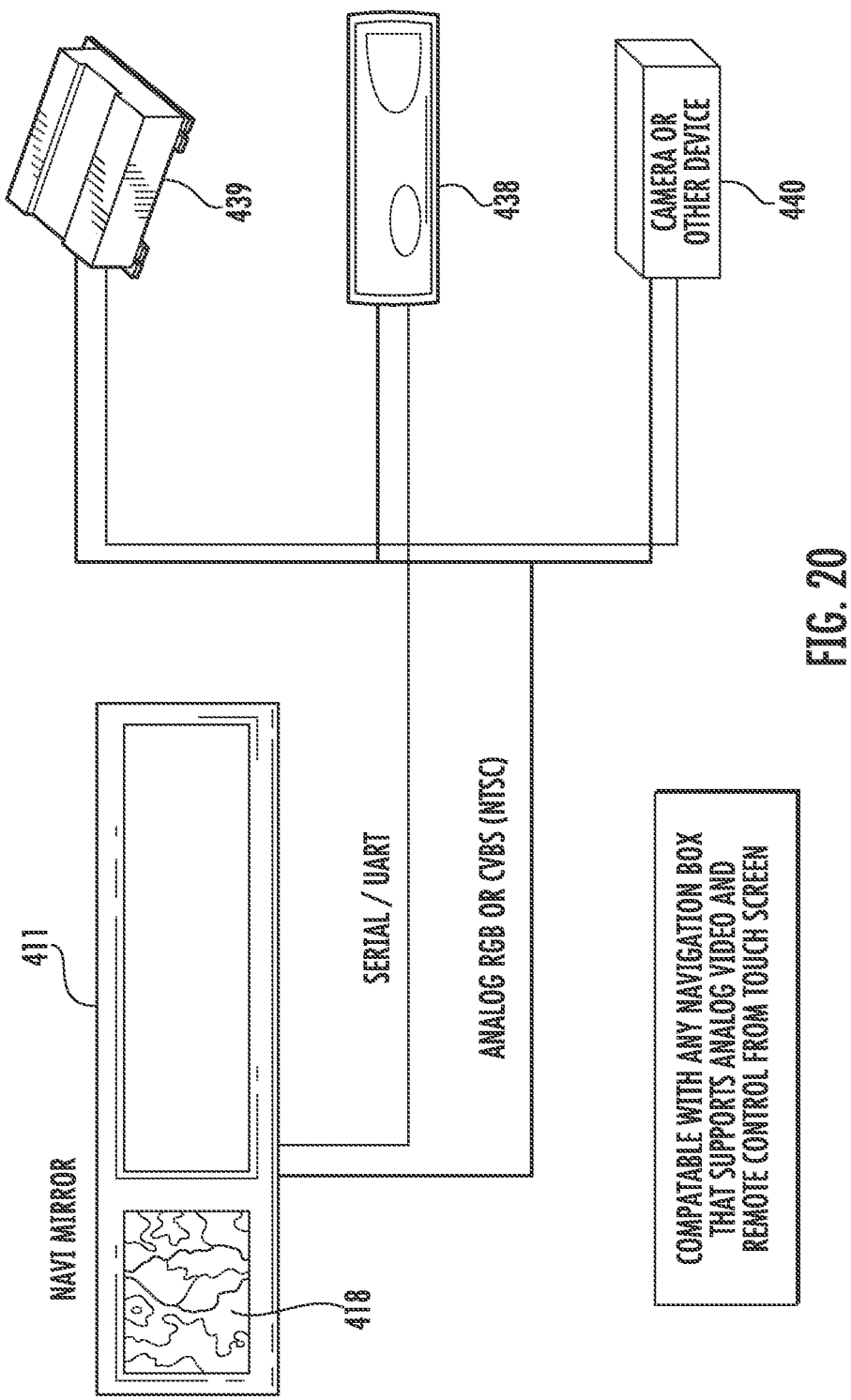
FIG. 20 is a schematic of a mirror system of the present invention.
Figure 21:
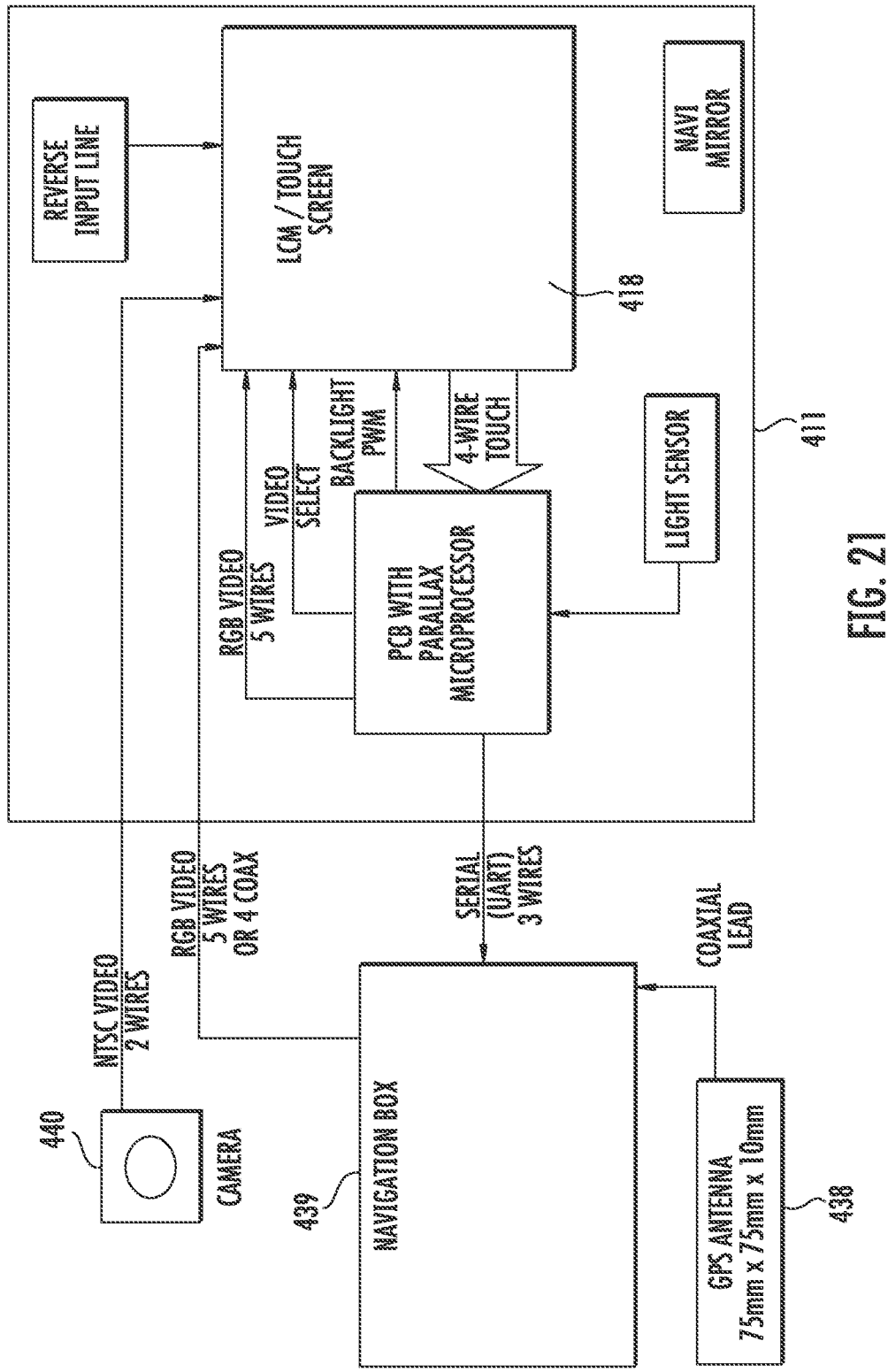
FIG. 21 is another schematic of a mirror system of the present invention.
Figure 22:
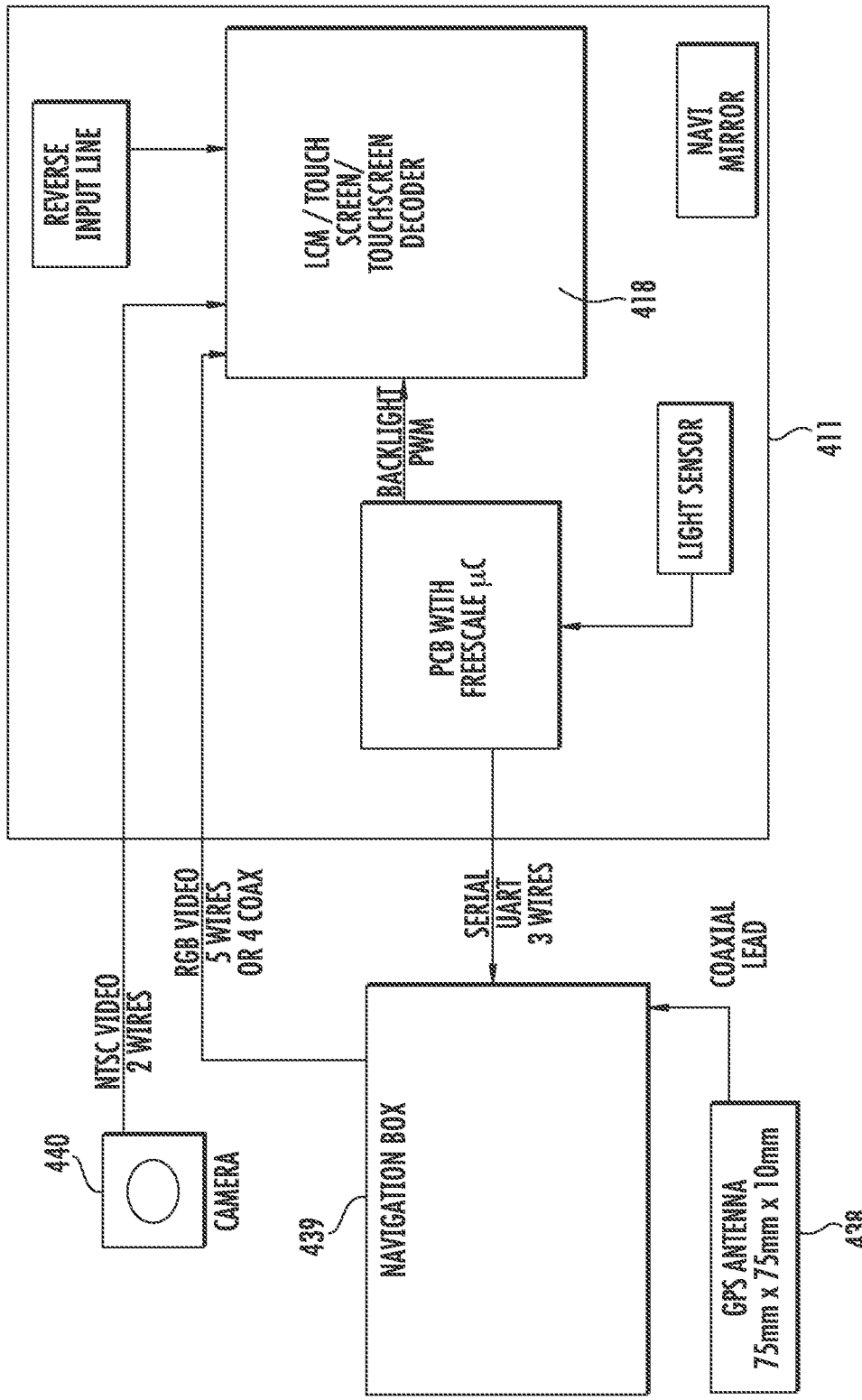
FIG. 22 is another schematic of a minor system of the present invention.

As shown in FIGS. 19 and 20, the display element or module 418 may be responsive to a global positioning system (GPS) antenna and/or module 438 and a navigation module or device 439 to display navigation information to the driver of the vehicle or the display element or module 418 may be responsive to a rearward facing camera or imaging sensor 440 to display video images of the area rearward of the vehicle so as to enhance the rearward viewing to the driver of the vehicle, such as when the driver is making a reversing maneuver and has shifted the gear selector device to a reverse gear position. The display module may be connected to the GPS module and/or navigation module and/or camera via any suitable connecting means, such as a serial/UART connection and/or an analog RGB or CVBS (NTSC) video connection or the like. The display module may be compatible with any suitable navigation module that supports analog video and remote control from a touch screen or the like at or of the display module. Optionally, and as shown in FIGS. 21 and 22, other connections and configurations may be implemented while remaining within the spirit and scope of the present invention.

Figure 23A:
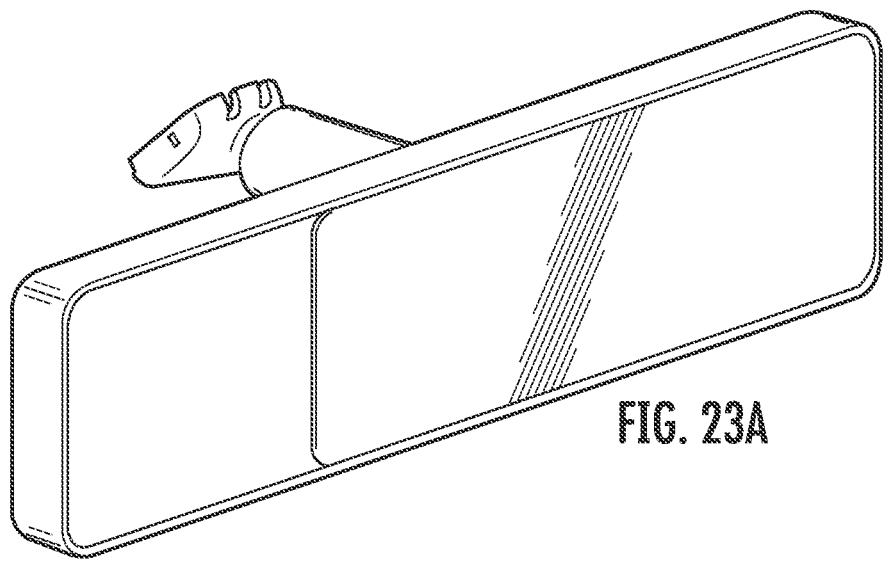
FIGS. 23A-J are views of other rearview mirrors and displays in accordance with the present invention.
Figure 23B:
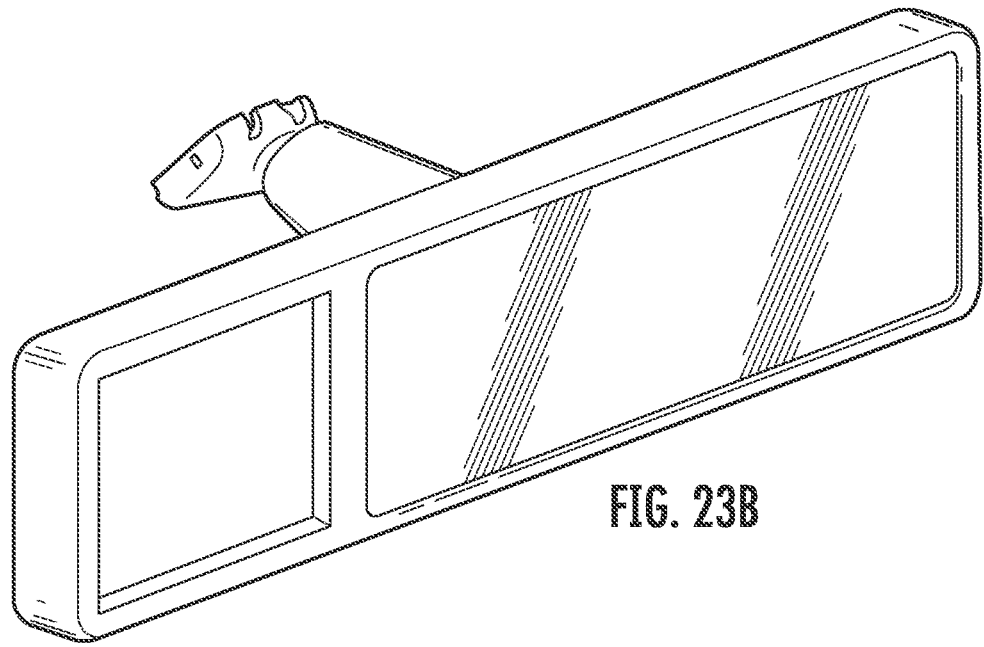
Figure 23D:
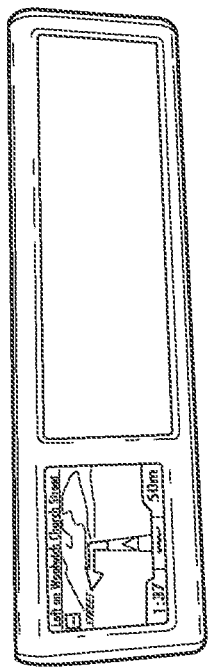
Figure 23F:
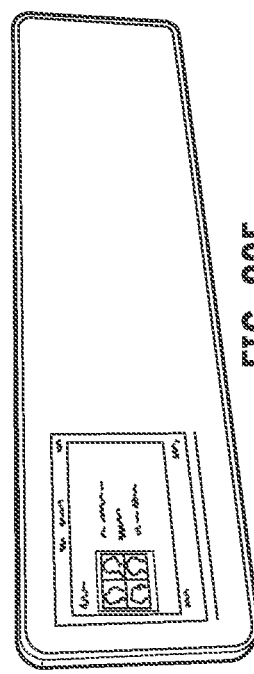
Figure 23C:
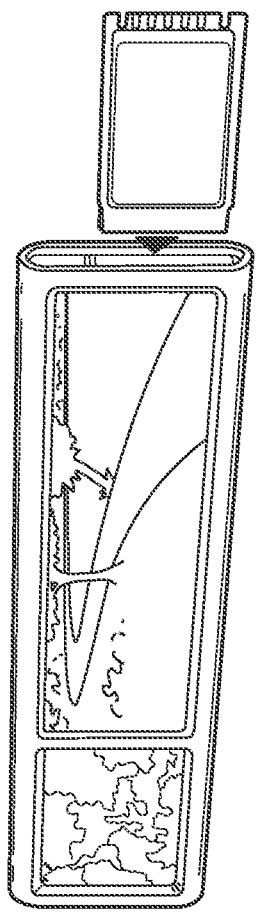
Figure 23E:
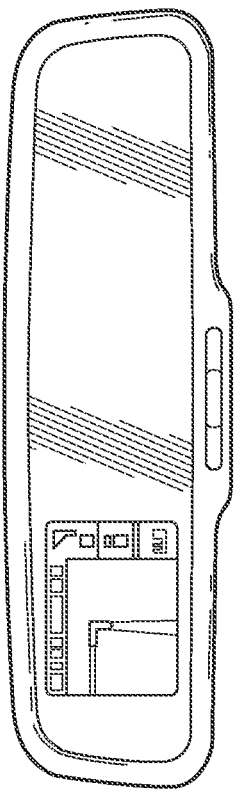
Figure 23G:
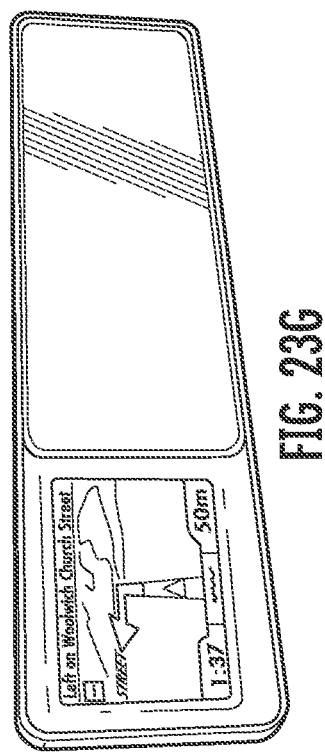
Figure 23H:
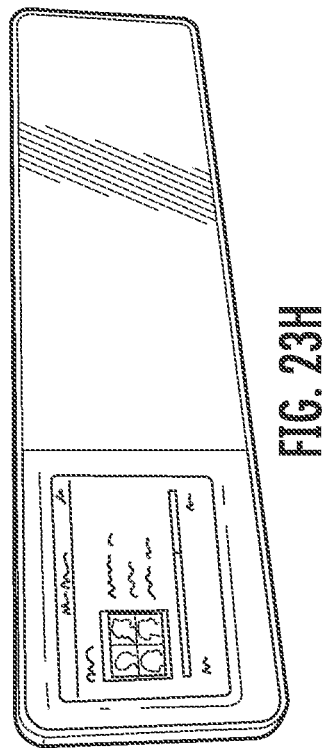
Figure 23I:
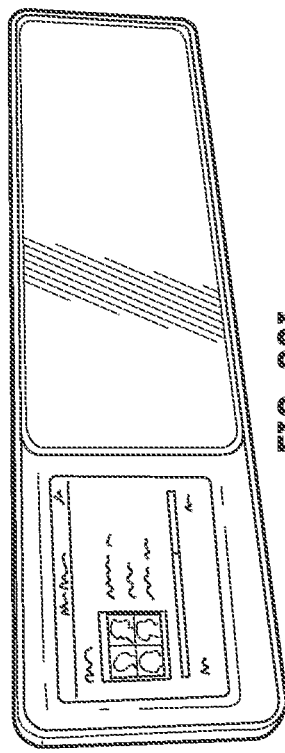
Figure 23J:
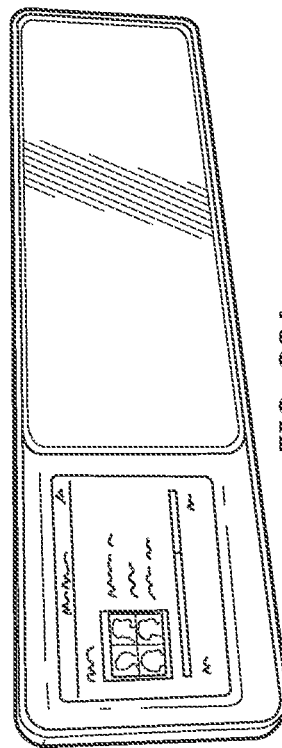

Optionally, and as shown in FIGS. 23A-J, the mirror assembly may comprise various configurations. For example, the display module or screen may be at a separate display region that is separate from the reflective element (such as shown in FIGS. 23A-D and 23G-J), or the display screen may be disposed behind the front substrate of the reflective element (such as shown in FIGS. 23E and 23F), and optionally with a window or aperture formed in the substrate and with the edges of the window being chamfered or seamed to provide an enhanced appearance to the mirror reflective element (such as shown in FIG. 23F and such as discussed above with respect to FIG. 17). Thus, the likes of a standard "off-the-shelf" touch activated unit, such as a Garmin or Tom-Tom navigational GPS unit or the like, may be disposed immediately to the rear of the reflective element and the driver of the vehicle can reach up to and touch-activate the touch screen of the unit by passing his or her finger through the window or aperture formed in the substrate of the refractive element. Other configurations, both electro-optic and non-electro-optic (such as prismatic) may be implemented while remaining within the spirit and scope of the present invention.

The display module or display element or display screen may comprise any suitable display element or device. For example, the display element may comprise a high intensity VF display, a high intensity VF monochrome multiplexed display, a high intensity LED display, an OLED display, a HUD display, an LED display, or a thin film transistor (TFT) display or the like.

Optionally, the display module and/or the reflective element may comprise a "touch screen" or "individual reconfigurable buttons" or inputs to provide enhanced user selection and/or control of the display module and other accessories associated with the mirror assembly. For example, a touch screen could be established by utilizing a coating on the reflective element and adding additional switch options around the touch screen that may be used to control the camera and/or other features. When the vehicle is in a reverse gear, a dedicated or vehicle LIN/CAN communication bus can control the camera features directly from the mirror. The camera control may be accomplished via buttons in a mask area around the touch screen so that none of the active screen area is used to simulate the buttons while the vehicle is in its reverse gear. This would allow the camera and other feature buttons to be controlled by the mirror microprocessor and the touch screen could be controlled by the navigation microprocessor or microprocessors (such as at a remote navigation module) if requested. Optionally, the video mirror may have a glass substrate that covers the display and that may include an anti-smudge and anti-static coating to minimize fingerprints on the front glass substrate.

Such reconfigurable inputs may allow vehicle or mirror manufacturers to provide inputs that the customer may activate to control and change some of the system features, such as digital zoom, multiple overlay options, top view as well as other features. The video mirror advantage gives the vehicle manufacturers the option to readily add a reverse aid feature without having an on-board screen (such as a navigation screen) and minimal vehicle architecture changes at a very competitive price. In order to utilize the camera features, the mirror supplier may utilize the CAN or LIN bus of the vehicle in order to accomplish the human-machine interface.

Optionally, and with reference to FIG. 24, the mirror system may include a video display and optical touch screen 450 that is operable to detect the presence of a user's finger at or near the touch screen and to detect the touch of the user's finger at the touch screen. In the illustrated embodiment, optical touch screen 450 includes a microcontroller 452, an ASIC or ASIC chip or element 454, an optical sensor 456 and one or more illumination sources 458, such as a plurality of light emitting diodes (LEDs) or the like. Optionally, a light pipe or light directing element 460 may be disposed at or near the sensor 456 (such as at or near the edge of the mirror bezel or elsewhere at the mirror assembly depending on the particular application of the display/touch screen) to gather and direct light toward the optical sensor 456. The display screen may be disposed at the mirror assembly and behind the reflective element (such as behind a transflective display on demand reflective element), and the sensor may be disposed at the display screen or touch screen or elsewhere at the mirror assembly, such as at the bezel of the mirror assembly, with the light pipe directing light toward the optical sensor to enhance the sensing performance of the optical sensor. Optionally, such a light pipe may not be necessary if the sensor is disposed behind a transflective reflective element and the sensor or system is capable of amplifying and conditioning the signal enough to provide a sufficient output signal indicative of the sensed light at the mirror glass.

In the illustrated embodiment, the light sources 458 comprise one or more of the backlighting LEDs of the backlit video display screen, such as a backlit thin film transistor (TFT) video display screen. The system thus may include support circuitry to temporarily electrically isolate the selected LEDs (such as four LEDs at the corner regions of the video display screen) from the rest of the backlighting string of LEDs and put the selected LEDs at least temporarily or episodically under the control of the ASIC. The system may also include software algorithms that run on the host microcontroller to interpret the data gathered from the ASIC.

The touch screen 450 may detect the presence or approach of the user's finger (such as in response to a change in the light sensed by the optical sensor) and may actuate portions of the touch screen that correspond to the detected presence or detected location of the user's finger. For example, four LEDs 458 may be selectively or sequentially individually and episodically actuated or energized to provide controlled illumination at particular respective locations of the display screen/touch screen, and the light sensor 456 may detect a change in the level of light at or near the screen. For example, an LED at each corner of the display screen may be selected for episodic energization and the optical sensor 456 may detect the light levels at each time of energization of each LED, whereby the control or microcontroller 452 may determine the general location of the user's finger by detecting a change in the light level corresponding to actuation or energization of one of the LEDs as compared to the others, with such a detected change in detected light levels being indicative of the user's finger (or other object) approaching that LED and reflecting the light emanating from the respective LED toward the sensor or light pipe. By processing the output of the light sensor in conjunction with the timing of the activation of the respective LEDs, the system can determine at which area (such as a quadrant of the screen corresponding to a respective corner LED of the display screen) the user's finger is located and activate the touch screen elements at or near that location.

The optical touch screen of the present invention is built around a high sensitivity and ambient light immune optical sensor system, such as the type developed by Mechaless, a subsidiary of Elmos Semiconductor. The touch screen concept utilizes, for example, the backlighting LEDs of a TFT video module in a transflective, display on demand video mirror system as the light stimulus. By briefly and sequentially taking the four corner LEDs (or other advantageously positioned LEDs) out of their backlighting role and putting them in the control of the touch screen ASIC, the timing of the stimulus is known by the system. While each of the LEDs is under the control of the ASIC, the ASIC simultaneously reads the output of the optical sensor, whose input is the light received by the sensor, such as the light gathered by the light pipe. A detected increase in light level compared to the ambient level is indicative that a user's finger (or other object) has approached the screen, while a detected increase in light level when one of the LEDs is activated compared to when the other LEDs are individually activated is indicative that a user's finger (or other object) is at a particular area or region at or near the one LED. An algorithm running on the microcontroller utilizes the data returned by the sensor for all four LEDs, in their respective time slots, to determine the position of the user's finger and thereby can activate the touch screen controls or elements, if one exists, at or near or under the finger position. Optionally, with advanced algorithms, the system may utilize 3-axis data so as to enhance detection of the user's finger and to detect the approach of the user's finger or to "see" the user's finger approaching the touch screen.

Thus, the display screen/touch screen of the present invention provides the ability to detect the presence or approach of a user's finger or other object at the screen so as to actuate the touch screen aspects of the screen before the user's finer contacts the touch screen. The present invention thus provides enhanced performance and can operate under reduced power because the touch screen aspects or circuitry of the screen or module are only activated when it is appropriate to have them activated, such as when a user's finger or other object is approaching a particular area of the touch screen. The use of the LEDs of the backlit display screen provides a common light source for both the video display screen and the sensing system and thus does not require a separate light source at the mirror assembly for detecting the presence of the user's finger.

One of the challenges of having a navigation feature (such as a navigation display and associated user inputs) in the interior rearview mirror is difficulties a user may encounter when entering text (such as, for example, addresses for target destinations or the like). Because the size of the LCM is typically about 3.5 inches, the characters on any keypad provided at the touch screen video display may be limited in size (or may require that the user scroll through the characters to arrive at the desired character). Optionally, a rearview mirror system or rearview mirror assembly in accordance with the present invention may provide an enhanced or larger touch screen or optical touch screen or sensor at a substantial portion of the mirror reflective element to provide a larger and more user friendly keypad or supplemental keypad that may be readily viewed and used by a user of the mirror system.

Figure 25:
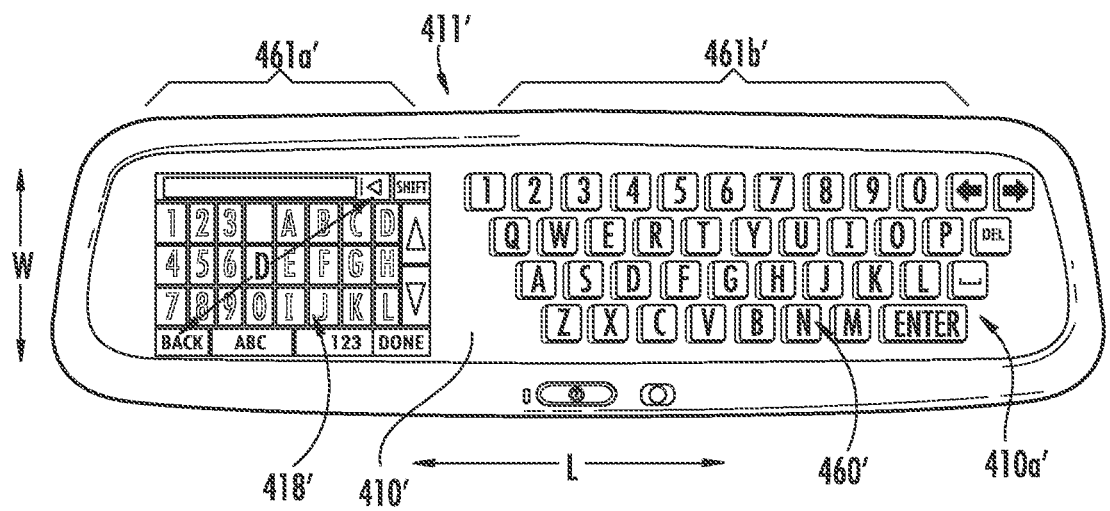
FIG. 25 is a plan view of another mirror system in accordance with the present invention, with the interior rearview mirror assembly providing a touch screen at the reflective element.
Figure 26:
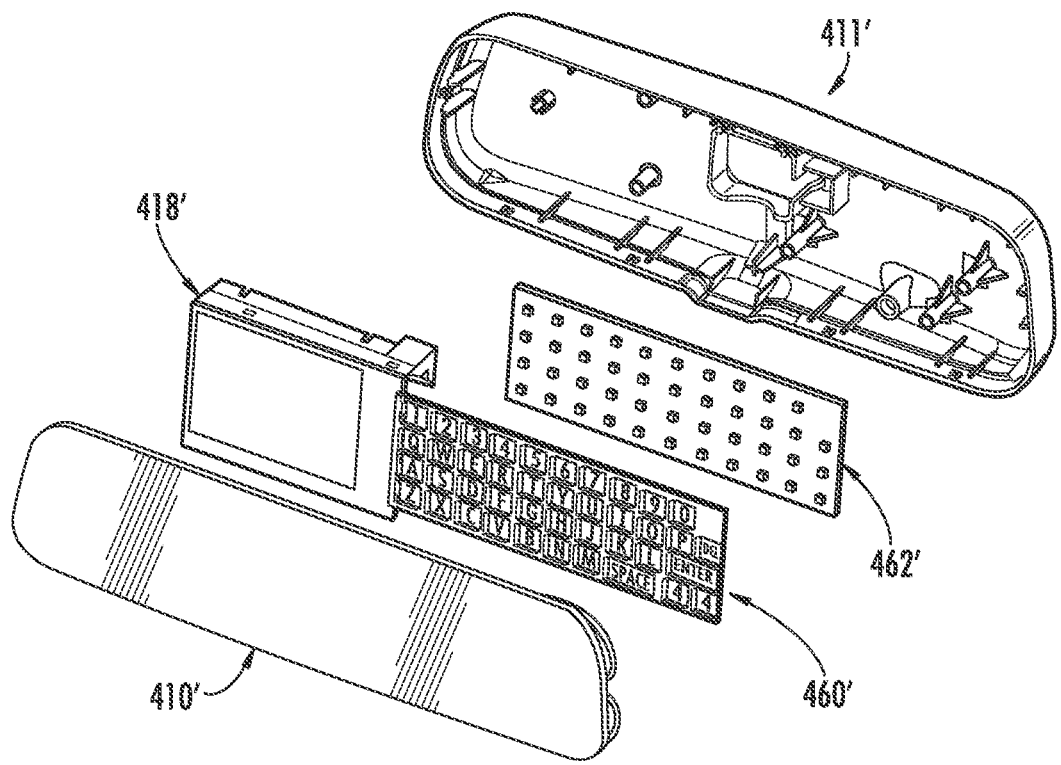
FIG. 26 is an exploded perspective view of the mirror system of FIG. 25.

For example, and with reference to FIGS. 25 and 26, a mirror assembly 411' includes a reflective element 410' and a display device or element 418' at a display viewing region or video display viewing region 461$a$' (such as toward or at a side region proximate a driver side or end of the reflective element). The mirror assembly 411' includes a keypad mask or element 460' that may be disposed behind the reflective element 410' at a main viewing region or area 461$b$', such as at or behind a touch screen portion 410$a$' of the reflective element 410'. The mirror assembly 411' may include a back light device 462' (such as an array of light emitting diodes or the like) that is operable to backlight the keypad mask 460' so that the keypad mask (such as alphanumeric characters arranged like a typical keyboard, such as for a computer, or such as any suitable input display or array of inputs or characters that a user may discern and understand for controlling one or more features of the video display and/or other accessory of the mirror system and/or the vehicle) is readily viewable through the transflective reflective element when the back light device 462' is activated (but the partially transmissive and partially reflective transflective reflective element limits viewability or discernibility of the keypad when the back light device is deactivated). The back light device may comprise a plurality of illumination sources or LEDs disposed at a circuit element, such as a printed circuit board or the like, and the circuit element may include or support or be connected to circuitry associated with the back light device and/or the display module and/or the reflective element dimming control and/or any other accessory or system associated with the mirror assembly.

In the illustrated embodiment, the transflective reflective element comprises the main viewing region 461$b$' and the video display viewing region 461$a$', with the main viewing region being larger than the video display viewing region and encompassing a substantial portion of the mirror reflector of the reflective element. For example, and with reference to FIG. 25, the mirror assembly may have a length dimension L of about eight to twelve inches or thereabouts and a width or height dimension W of about two to four inches or thereabouts. The video display may have a display screen that has a diagonal dimension D of less than about five inches, such as less than about four inches, and greater than about two and a half inches. Thus, and as can be seen in FIG. 25, the mirror assembly may provide a user input or touch screen at main viewing region 461$b$' that is larger than the video display viewable at video display viewing region 461$a$'.

The information input display or keyboard display may comprise a display representative of a plurality of user inputs, wherein the information input display is backlit by the backlighting device 462' and wherein the information input display is disposed behind the reflective element and viewable through the transflective mirror reflector at the main viewing region when the information input display is backlit by the backlighting device. The information input display may be substantially not viewable or discernible to a person viewing the mirror assembly when the mirror assembly is normally mounted in a vehicle and when the backlighting device is deactivated. The reflective element provides a touch screen function at the information input display, and a control of the mirror system or mirror assembly may be operable to determine a location of a touch or proximity of an object at the reflective element and correlate the determined location to an input character of the information input display.

Optionally, the control may activate the backlighting device and enable operation of the touch screen in response to a user input, such as in response to a user pressing a button or otherwise actuating a user input at the mirror assembly, such as at a bezel portion of the mirror assembly or the like. Optionally, the control may deactivate the backlighting device and disable operation of the touch screen in response to a period of time elapsing following the activation of the backlighting device and/or following a detection of a touch or proximity of an object at the touch screen. Optionally, the backlighting device may be activated and the touch screen may be enabled in response to the vehicle ignition being on (such as when the vehicle ignition is on and the vehicle engine is running) with the vehicle not in motion and/or in response to the vehicle ignition being on with the vehicle engine not running (such as when the ignition key is first turned to the on position but before the engine is started).

The touch screen portion 410$a$' of reflective element 410' allows a user's finger (either by touching or approaching the glass reflective element) to be detected, such as by an optical touch screen or sensor as described above of by other suitable touch screen technology at the reflective element. For example, an optical touch screen may be operable to detect the presence of a user's finger or stylus at or near areas or regions that correspond to respective characters or numbers or letters of an alphanumeric keypad mask, and the processor may determine which character the user's finger or stylus is at and generate an appropriate output signal indicative of the "touched" character. For example, the system may detect the user's finger at the letter "D" of the key pad and may provide a corresponding input to the navigation system or the like of the vehicle. Optionally, and desirably, the front surface of the reflective element (the surface generally facing the driver of the vehicle when the mirror assembly is normally mounted in a vehicle) may have an anti-bacterial coating or layer disposed thereon.

The mirror assembly 411' includes a housing 414' and an attachment plate and mounting bracket (such as a double ball or double pivot joint mounting assembly or configuration) for adjustably mounting the reflective element 410' to an interior portion of a vehicle, such as the interior surface of the vehicle windshield or the like. The circuit element 464' (FIG. 27), such as a printed circuit board or the like, may have a connector and harness extending therefrom for attaching to or electrically connecting to a vehicle harness or the like, with the back light device 462' disposed at or in front of the circuit element or circuit board 464' and operable to backlight the keypad so that it the keypad 460' is viewable through the reflective element when the illumination sources are activated. The reflective element 410' may be supported at the housing 414' and/or a bezel portion, and a mask element (such as an opaque layer or element to limit light passage therethrough) may be disposed at or behind the rear surface of the reflective element to provide an opaque layer at the rear of the reflective element with a window established for the video display screen to be viewable through the reflective element when the video display module is activated (and may include a plurality of smaller windows or a single large window at the keypad so that light from the illumination sources passes through the window/windows of the mask element and through the keypad so that the keypad is viewable through the reflective element when the illumination sources are activated). The reflective element 410' (such as an electro-optic reflective element subassembly, such as an electrochromic reflective element subassembly) includes a touch screen function and the circuit element or circuit board 464' includes touch controller circuitry (and may include other circuitry or sensors or accessories depending on the particular application and desired electrical content of the mirror assembly).

Figure 27:
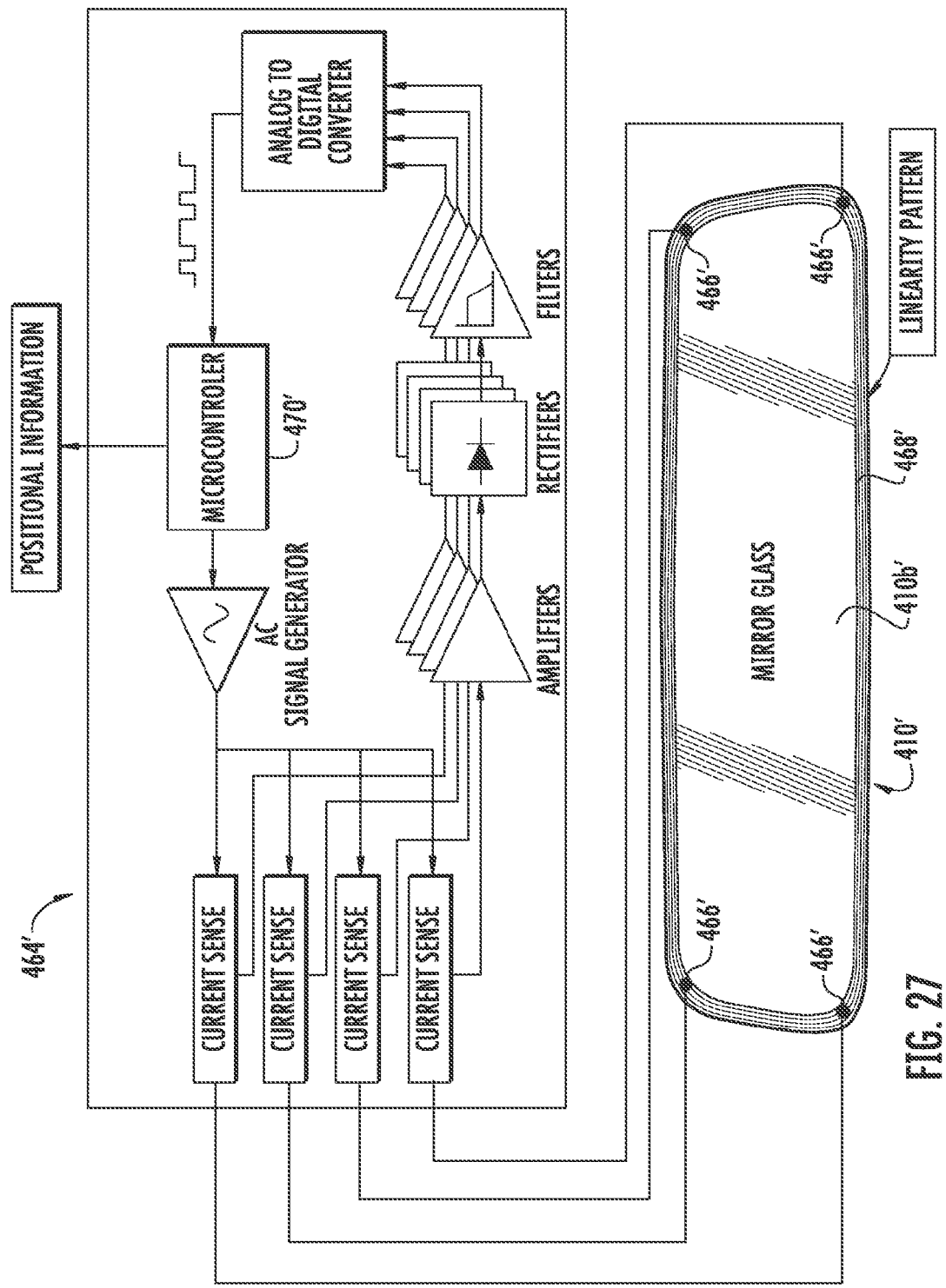
FIG. 27 is a schematic of another mirror assembly in accordance with the present invention, with the mirror assembly providing a touch screen at the reflective element.
Figure 27A:
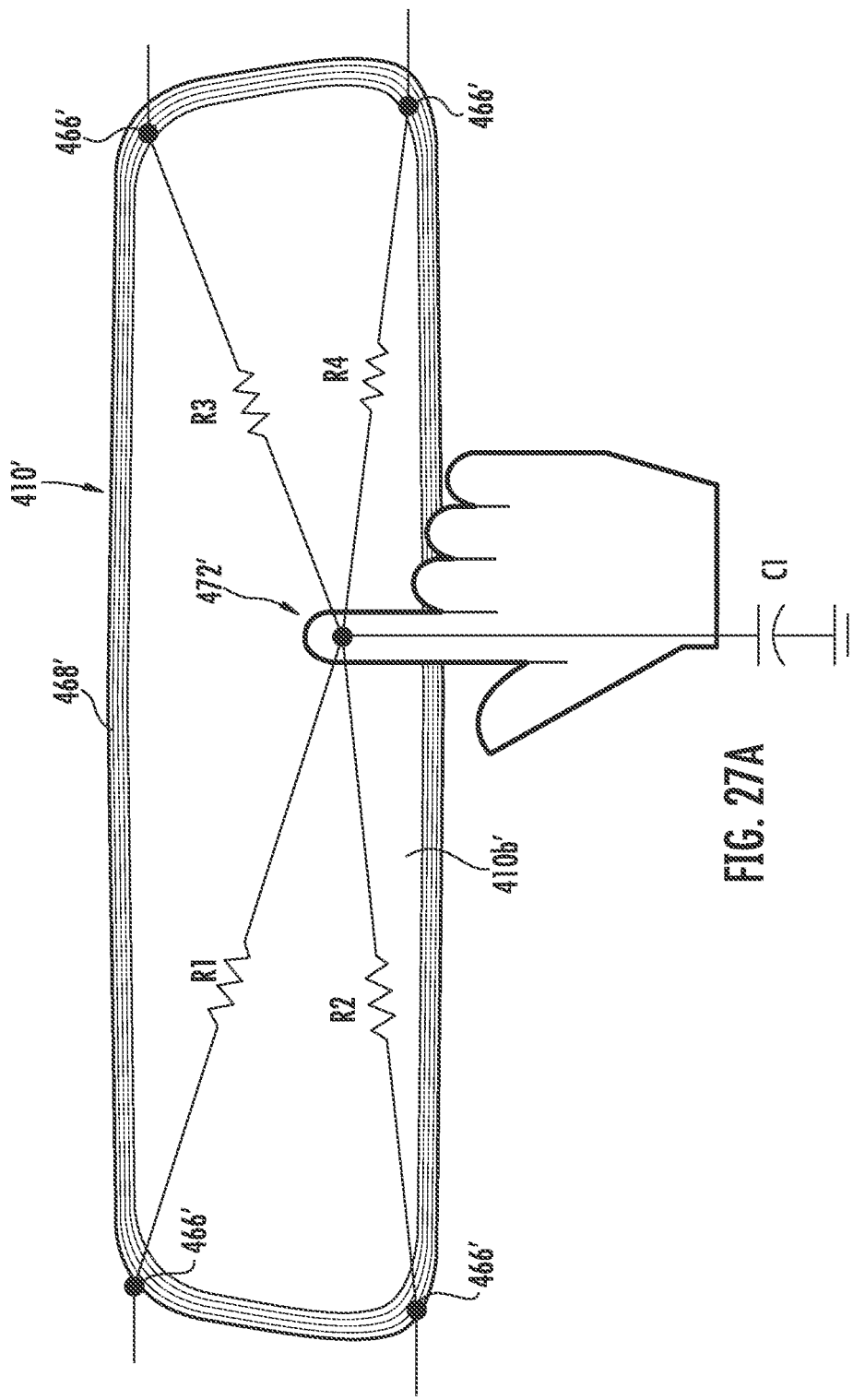
FIG. 27A is a schematic showing how the mirror assembly of FIG. 27 functions to detect a touch at a front surface of the reflective element.

Optionally, and with reference to FIGS. 27 and 27A, the touch screen of the reflective element 410' may comprise a surface capacitive touch screen or touch screen system incorporated at the mirror glass, and may determine the location of a touch at the front surface 410$b$' of the reflective element by sensing the current flow at a plurality (such as, for example, four) discrete locations or connections or nodes 466' around the perimeter of the reflective element. For example, the front surface 410$b$' of the reflective element 410' may be coated with a transparent conductive coating or layer, such as a coating of indium tin oxide (ITO) or the like, which is electrically conductively connected to the corner connections or nodes 466'. The system may generate an electrical current and provide the current to the nodes 466' and thus to the transparent conductive coating at the front surface of the reflective element. Optionally, a conductive trace 468' may be disposed around the perimeter edge of the reflective element and conductively connected to the nodes 466'. The conductive trace may be disposed in a pattern that facilitates linearization of the response the system receives when a person touches the front surface of the reflective element.

Thus, when the mirror is activated (such as when the vehicle ignition is on or when the video display module is activated or in response to a user input or the like), and when the touch screen system is activated and the current is communicated to the nodes 466' and surface coating, the touch screen may determine the location of a touch at the front surface of the reflective element. For example, when a finger 472' (or other object, such as a stylus or the like) touches the front surface 410$b$' of the reflective element 410' (such as shown in FIG. 27A), the finger conducts or draws current away from the glass. The amount of current that then flows through each node varies depending on the proximity of the touch to that node (due to the difference in resistance to the current flow from the respective nodes and across the front surface of the reflective element to the touched location). The amount of current that flows through each of the nodes 466' can be measured and compared (such as by a controller or microcontroller or processor 470') to the current flowing through the other nodes. The sensed current or relative current draw at the nodes 466' is processed by the controller or microcontroller or processor 470' to determine the position or location of the touch at the front surface of the reflective element. The controller 470' may then determine which character or letter or number of the keypad the determined location corresponds to and may generate an appropriate signal to the appropriate circuitry of the mirror system.

Figure 28:
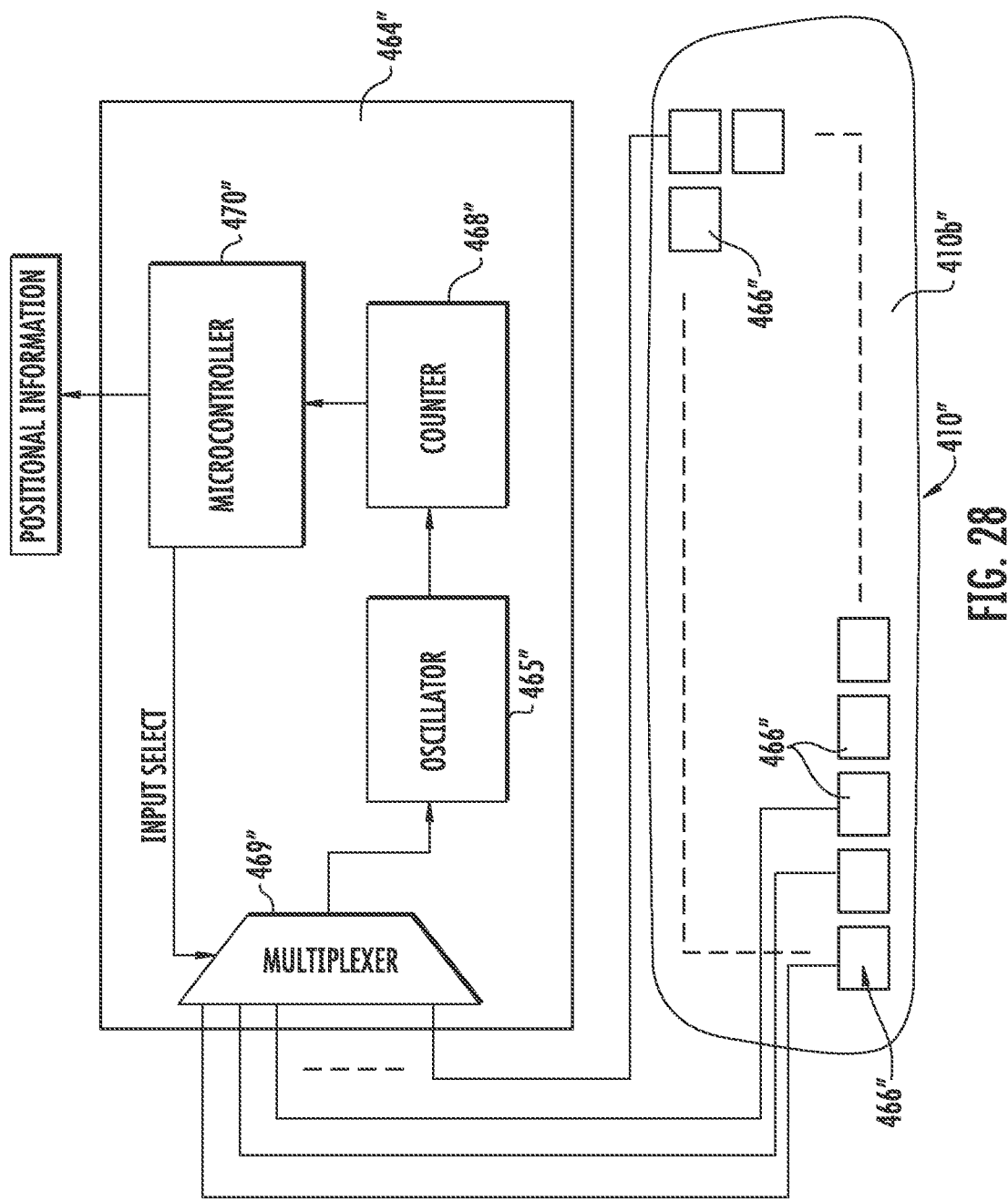
FIG. 28 is a schematic of another mirror assembly in accordance with the present invention, with the mirror assembly providing a touch screen at the reflective element.
Figure 32:
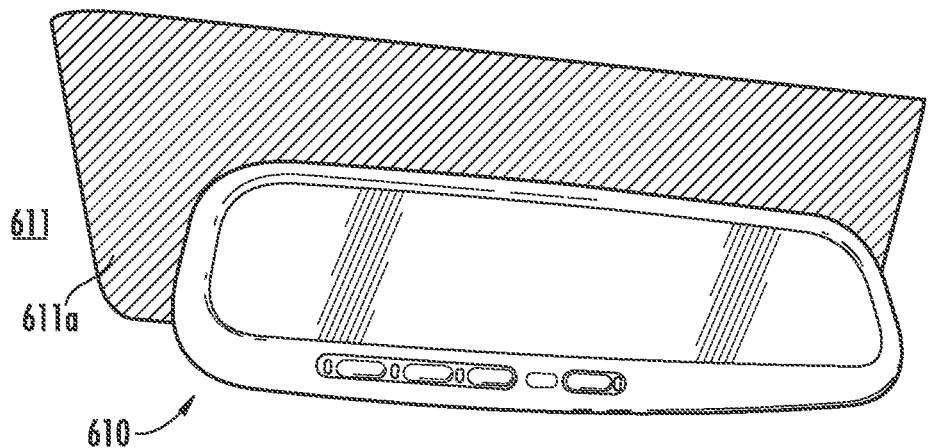
FIG. 32 is a perspective view of another rearview mirror and display in accordance with the present invention.

Optionally, and with reference to FIGS. 28 and 28A, the touch screen of a mirror reflective element 410" may comprise a projective capacity touch screen or touch screen system incorporated at the mirror glass, and may determine the location of a touch at the front surface 410$b$" of the reflective element 410" by sensing a change in frequency of an oscillator 465" and determining the location of the touch responsive to the sensed or detected or determined change in frequency. As shown in FIG. 28, the oscillator 465" may be disposed at or on a circuit element 464" (such as a printed circuit board or the like), which may include or support a controller 470", a counter 468" and a multiplexer 469". The multiplexer 469" is in electrical communication with a plurality of sensing wires or pads 466" at the mirror reflective element 410" (such as behind the mirror glass). The system detects a capacitance that is formed between a user's finger (or other object) and a projected capacitance of the sensing pads 466", whereby the controller 470" can determine the location of the touch (or proximity) of the finger or object 472" responsive to the detected capacitance and corresponding change in frequency of the oscillator 465".

Thus, when the mirror is activated (such as when the vehicle ignition is on or when the video display module is activated or in response to a user input or the like), and when the touch screen system is activated, the touch screen may determine the location of a touch at the front surface of the reflective element. For example, when a finger 472" (or other object, such as a stylus or the like) touches or approaches the front surface 410$b$" of the reflective element 410" (such as shown in FIG. 28A), the capacitance formed between the user's finger and the sensing pads 466" varies depending on the proximity of the touch to the pads. The detected increase in capacitance at a proximate pad or pads is detected, which results in a decrease in the frequency of the oscillator 465". The change in frequency is processed by the controller or microcontroller or processor 470" to determine the position or location of the touch at the front surface of the reflective element. The controller 470" may then determine which character or letter or number of the keypad the determined location corresponds to and may generate an appropriate signal to the appropriate circuitry of the mirror system.

The pads may be arranged in a grid pattern or array (such as shown in FIG. 28), or may be arranged at discrete points or may be otherwise arranged depending on the particular application of the touch screen system and mirror reflective element assembly. The pads may be arranged at the rear of a rear substrate of an electro-optic reflective element assembly and thus function to detect the proximity of the finger or object as it approaches and/or touches the front surface of a front substrate of the electro-optic reflective element assembly.

The touch pads may be in the form of transparent conductive areas or pads at the back or front of the mirror reflective element glass substrate or substrates. The grid or array of pads may be established using multiple conductive layers. Optionally, for example, the touch pads may be disposed behind the mirror reflector or reflective surface (such as at the third or fourth surface of the reflective element assembly) or in front of the mirror reflector (such as at the second or first surface of the reflective element assembly). Optionally, and desirably, the touch pads may be disposed at the first surface (the front surface of the front substrate) to avoid any shielding of the pads by the conductive coatings at the second, third and/or fourth surfaces of the reflective element assembly, and may have a thin protective coating on top or over the first or front surface of the reflective element and the touch pads (such as a protective coating of the types described in U.S. Pat. Nos. 6,201,642; 6,454,449; 5,179,471; 5,751,489; 5,073,012; and/or 5,523,877, and/or U.S. patent application Ser. No. 11/218, 374, filed Sep. 2, 2005, now U.S. Pat. No. 7,507,438, which are hereby incorporated herein by reference in their entireties). Optionally, the touch pads may be disposed at the rear or back surface of a third glass substrate (such as an ultrathin glass substrate of the types described in U.S. Pat. Nos. 7,338, 177 and/or 7,420,756, which are hereby incorporated herein by reference in their entireties) that may be disposed at the front of the reflective element (and may be adhered to the front surface of the front substrate, such as via an optical adhesive or the like, such as by utilizing aspects of the mirror assemblies described in U.S. Pat. Nos. 5,073,012; 5,115,346; 5,355,245; and 5,523,877, and/or U.S. patent application Ser. No. 10/603,518, filed Jun. 25, 2003, and published Jan. 8, 2004 as U.S. Patent Publication No. US 2004/0004605, now U.S. Pat. No. 7,345,680; and/or Ser. No. 12/187,725, filed Aug. 7, 2008, and published Feb. 12, 2009 as U.S. Patent Publication No. US 2009/0040306, which are hereby incorporated herein by reference in their entireties).

The mirror reflective element of the present invention thus may display various indicia or characters or icons (such as a keypad as described above) and may detect the location of a user's touch to determine what indicia or character the user touched the front surface of the reflective element. Although shown and described as determining a touch location relative to a keypad display, clearly the mirror assembly may have other forms of displays at or behind the reflective element and may determine the location of the touch and corresponding input for the video display or other accessory associated with the mirror system and/or the vehicle. Also, other touch screen systems are contemplated, such as resistive touch screens, surface acoustic wave touch screens, capacitive touch screens, infrared touch screens, strain gauge touch screens, optical imaging touch screens, dispersive signal touch screens, acoustic pulse recognition touch screens and/or the like, for use with the keypad or other touch sensing functions at a mirror reflective element assembly in accordance with the present invention. The touch screen system or systems may utilize aspects of the mirror and/or touch screen systems described in U.S. Pat. Nos. 4,490,227; 4,650,557; 4,655,811; 5,725,957; 6,001,486; 6,087,012; 6,970,160; 6,440,491; 6,620,454; 6,627,918; 6,706,552; 6,787,240; 6,488,981; 6,549,193; 6,727,895; 6,842,171; and/or 7,165,323; and/or U.S. patent application Ser. No. 09/946,228, filed Sep. 5, 2001 by Ippel et al. for PLASTIC SUBSTRATE FOR INFORMATION DEVICE AND METHOD FOR MAKING SAME; Ser. No. 09/974,209, filed Oct. 10, 2001; Ser. No. 10/744,522, filed Dec. 23, 2003 by Halsey et al. for METHOD FOR MAKING AN INTERACTIVE INFORMATION DEVICE; Ser. No. 10/798,171, filed Mar. 11, 2004 by Getz for LASER DELETION FOR TOUCH SCREEN; Ser. No. 11/218,374, filed Sep. 2, 2005 by Cherif et al. for DISPLAY SUBSTRATE WITH DIFFUSER COATING, now U.S. Pat. No. 7,507,438; and/or Ser. No. 11/440,855, filed May 25, 2006, and/or PCT Application No. PCT/US2008/68987, filed Jul. 2, 2008, and published on Jan. 8, 2009 as International Publication No. WO 2009006512, and/or International Application No. PCT/US2008/071034, filed Jul. 28, 2008, and published Feb. 5, 2009 as International Publication No. WO 2009/018094, which are all hereby incorporated herein by reference in their entireties.

Thus, the entire surface of the mirror (or a substantial portion or surface of the mirror reflective element) may be used to provide a larger touch screen than that previously provided at the video display screen. Because the area of the LCM video display may be much less than the remaining area of the reflective element assembly, it can be advantageous to implement a supplemental keypad at the reflective element. In the illustrated embodiment, such a supplemental keypad is provided by using an alphanumeric mask and a backlight device disposed behind the transflective reflective element. The backlight device generates enough light so that the keypad is visible through the reflective surface when the backlight device is activated, and when the backlight is not activated, the keypad is substantially not viewable or discernible by a person viewing the reflective element.

Although shown as having a backlit keypad display or user input display that is provided as a mask element at the rear of the reflective element, it is envisioned that the user input display may comprise a backlit mask element or may comprise a backlit reconfigurable display (such as a TFT LCD display or the like). Optionally, the mirror assembly may comprise two separate displays or display elements, such as a video display and a separate backlit user input display such as described above, or the mirror assembly may comprise a single display element or device or module disposed behind and substantially encompassing the mirror reflective element. For example, a portion of a larger single display element or device or module may be used to display video images (such as at a video display viewing region such as at or toward a driver side of the mirror assembly) and another portion of the display element or device or module may be used to display user input characters, such as for a keypad or the like.

Optionally, and desirably, the keypad may function cooperatively with the automotive OEM navigation system and/or with a navigation system of the mirror assembly or system. In typical automotive navigation systems, the ability to enter text may be limited to operation when the vehicle is in a static condition (when the vehicle is not moving). Because rear vision (such as by viewing through the rear window of the vehicle by viewing the reflected images at the interior rearview mirror) is not needed when the vehicle is static, the supplement keypad can be viewable at the principal reflecting region or main viewing region of the reflective element and may be used during such static or non-moving conditions without effecting driver safety.

The final display luminance (and especially for a TFT LCD display element showing video or full color video or still images), when measured through the reflective element and mirror reflector is preferably greater than about 300 candelas per meters squared ($cd/m^2$), more preferably greater than about 500 $cd/m^2$, and more preferably greater than about 1,000 $cd/m^2$ and more preferably greater than about 2,000 $cd/m^2$. Optionally, the information input display or keyboard display may be displayed or backlit so as to have a display luminance (when measured through the reflective element and mirror reflector) is preferably greater than about 300 $cd/m^2$, more preferably greater than about 500 $cd/m^2$, and more preferably greater than about 1,000 $cd/m^2$ and more preferably greater than about 2,000 $cd/m^2$. This is to help ensure that the driver can discern any video image and/or user input character or indicia being displayed or backlit against the sunlight streaming in through the rear window and incident at the display area or main viewing area of the interior mirror reflective element that will tend to wash-out the video image and/or information input display unless the video image and/or information input display is sufficiently bright. For such display elements (such as a TFT LCD video display or the like) or other display types, the desired degree of luminance may be achieved by, but is not limited to, cold cathode fluorescent tubes, white light emitting light emitting diodes (LEDs), such as an array of white light emitting LEDs arranged behind the keypad display, or white light generated through color mixing of red, green, and blue LEDs, or other suitable illumination sources or elements, located at the vide display element and/or keypad display or user input display and rearward of the reflective element.

Optionally, the mirror assembly may include one or more user inputs at the bezel portion of the mirror assembly, and the user inputs may comprise touch or proximity sensors disposed behind the bezel portion. For example, and with reference to FIG. 29, an interior rearview mirror assembly 510 may include a reflective element 512, a video display 514 and one or more user inputs or buttons 516, which may comprise touch sensors or proximity sensors or plates disposed behind the bezel portion with indicia or button shapes or the like established at the viewable surface of the bezel portion. Interior rearview mirror assembly 510 includes a housing 518 and an attachment plate and mounting bracket (such as a double ball or double pivot joint mounting assembly or configuration) for adjustably mounting the reflective element 512 to an interior portion of a vehicle, such as the interior surface of the vehicle windshield or the like. The user inputs 516 are disposed along or established at or behind a bezel portion 520 of the mirror assembly 510, such as at a region of the bezel portion at or near or below the video display 514. The user inputs 516 are electrically connected or linked to a controller or microcontroller or processor or microprocessor 522, whereby the controller determines when a person's finger (or other object) approaches and/or touches the bezel portion at the user inputs and determines the appropriate input associated with the location of the touch or proximity of the finger or object.

The user inputs or capacitive touch sensors 516 are thus disposed at the bezel portion of the mirror rather than in or on a glass substrate of the reflective element. A user may touch the bezel at the appropriate location to activate a function. With reference to FIG. 29, the user inputs 516 may be associated with a video display 514, whereby actuation of the user inputs may control the video display. Optionally, the touch sensors or user inputs may function to control or actuate other accessories. For example, and with reference to FIG. 30, user inputs 516' at bezel portion 520' of mirror assembly 510' may be operable to control a radio, with power, tuning and volume "buttons" molded into the bezel portion. A display device 514' may be disposed at or behind (and viewable through) the reflective element 512', and may be operable to display the radio information, such as the station to which the radio is tuned, the volume of the radio, the selected band, and/or the like. As shown in FIG. 30, the display device 514' may be located at or near the user inputs 516', with the tuning buttons or inputs 516a' located below the tuning display 514a' and the volume buttons or inputs 516b' located below the volume display 514b', so as to ease a user's understanding and cognitive awareness of the function of the molded user inputs at the bezel portion of the mirror assembly.

On the back of or molded into the bezel would be a touch sensitive plate 524 (FIG. 31), such as for each function of the user inputs. The controller 522 may include an algorithm for measuring capacitance by evaluating the step response in the time domain (or may measure a change in frequency). When the sensitive area (proximate the plate or plates) is touched (or approached), the increase in capacitance increases the time it takes for the capacitor to charge to a threshold charge level, such as the logic high threshold in FIG. 31. This change or time delay may be measured by the controller, such as by using a timer in the controller. For example, and with reference to FIG. 31, the controller may include an input/output pin 526 for each plate 524, and the input/output pin may be set to a low output (where the controller may drive the pin to a zero or low voltage to discharge the associated or respective capacitor). The input/output pin may then be set to input (whereby the controller releases the driving voltage and no longer drives the pin toward a zero voltage such that the capacitor may begin to accumulate a charge), and the controller may reset the timer or set the timer to zero. The controller may then record the time elapsed from when the pin is set to input and the pin signal thus begins to increase (indicative of the charge or increase in voltage at the capacitor as the capacitor charges) to when the signal reaches the predetermined or selected threshold level (such as a voltage of about ½, of the applied voltage). When the controller registers that the charge has reached the threshold level, the controller determines the elapsed time ΔT (FIG. 31), such as by reading the timer or timing device or counter, and if the measured elapsed time is greater than an average elapsed time or threshold elapsed time, then the controller determines that a "touch" is being made at that location. The controller may then control the appropriate function, and may update the average elapsed time, and return to the beginning and repeat the process.

Optionally, the user inputs may utilize aspects of the touch or proximity switches described in U.S. Pat. Nos. 6,001,486; 6,310,611; 6,320,282; 6,627,918; 6,690,268; 7,224,324; 7,249,860; 7,253,723; 7,255,451; 7,360,932; and/or 7,446,924, and/or U.S. patent application Ser. No. 10/538,724, filed Jun. 13, 2005, and published on Mar. 9, 2006 as U.S. Publication No. US 2006/0050018, which are hereby incorporated herein by reference in their entireties, or the inputs may comprise other types of buttons or switches, such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field. When a voltage is applied to the sensor, the sensor generates the electric field, which emanates through any dielectric material, such as plastic or the like (such as through the plastic bezel portion), at the sensor. When a conductive mass (suoh as a person's finger or the like, or metal or the like) enters the electric field, the sensor may detect a change in the field and may indicate such a detection. Optionally, other types of switches or buttons or inputs or sensors may be incorporated into the user inputs to provide the desired function or functions, while remaining within the spirit and scope of the present invention.

Optionally, the video display module may provide a graphic overlay to enhance the driver's cognitive awareness of the distances to objects to the rear of the vehicle (such as by utilizing aspects of the systems described in U.S. Pat. Nos. 5,670,935; 5,949,331; 6,222,447; and 6,611,202; and/or PCT Application No. PCT/US08/76022, filed Sep. 11, 2008 and published Mar. 19, 2009 as International Publication No. WO 2009/036176, which are hereby incorporated herein by reference in their entireties. Such graphic overlays may be generated at or by the camera circuitry or the mirror or display circuitry. Optionally, the display module may comprise a high luminance 3.5 inch (or larger or smaller) video display with basic overlay capability designed into the mirror assembly.

Optionally, and with reference to FIGS. 32-36, an interior rearview mirror assembly 610 may include a display device 612 that is operable to emit or project display information toward and onto the windshield 611 in an area proximate the interior rearview mirror assembly, such as at an area generally above the mirror assembly and at or near the driver side of the mirror assembly. Interior rearview mirror assembly 610 is mounted to a mounting button or element adhered to or affixed to an interior surface of the vehicle windshield 611, with a tinted area 611a of the windshield at an area proximate the mirror assembly, such as a tinted area that has a darkened fit (such as a black ceramic frit layer or the like) disposed thereat or established thereat, and with the mounting button or element mounting the mirror assembly generally at the tinted area (such an area is sometimes termed a shade band area at the upper windshield area and may be executed by locally tinting/coloring the PVB laminating interlayer used in laminated windshield constructions and/or by adding a coating or layer locally to the innermost glass surface of the windshield).

Figure 33:
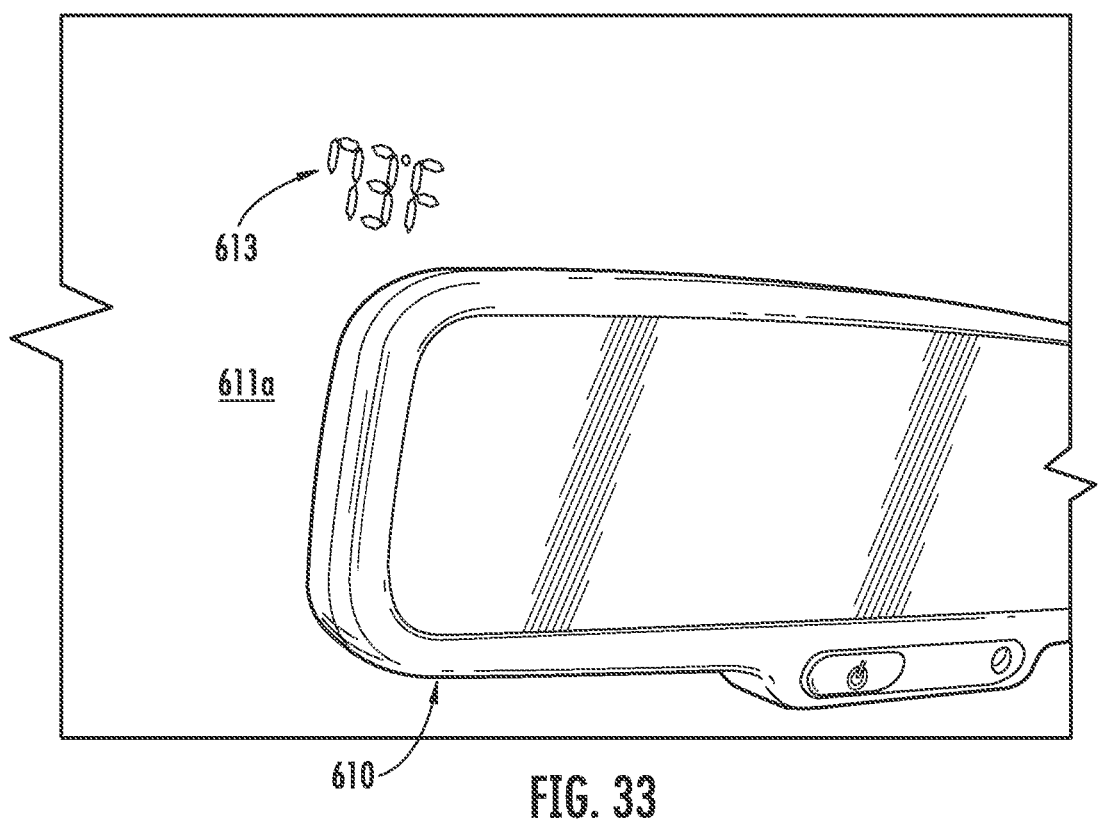
FIG. 33 is another perspective view of the mirror and display of FIG. 32, with the display activated to project display information at the frit region of the windshield proximate the mirror assembly.
Figure 34:
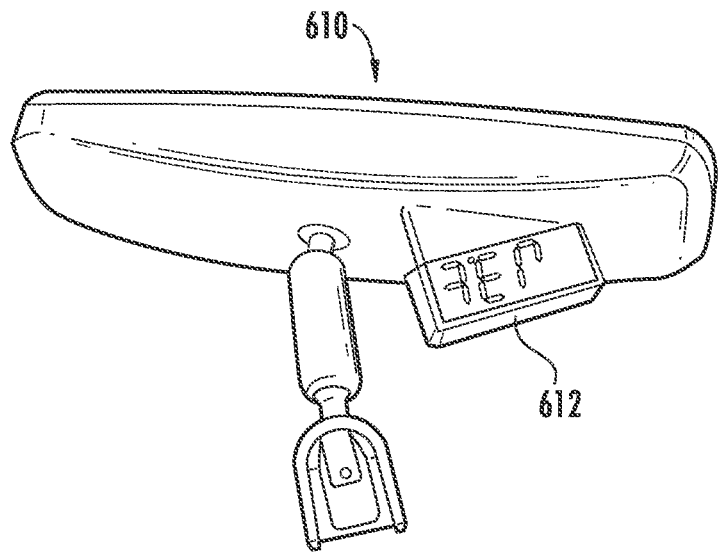
FIG. 34 is a perspective view of the mirror and display of FIGS. 32 and 33, showing the display element at the rear of the mirror assembly.
Figure 35:
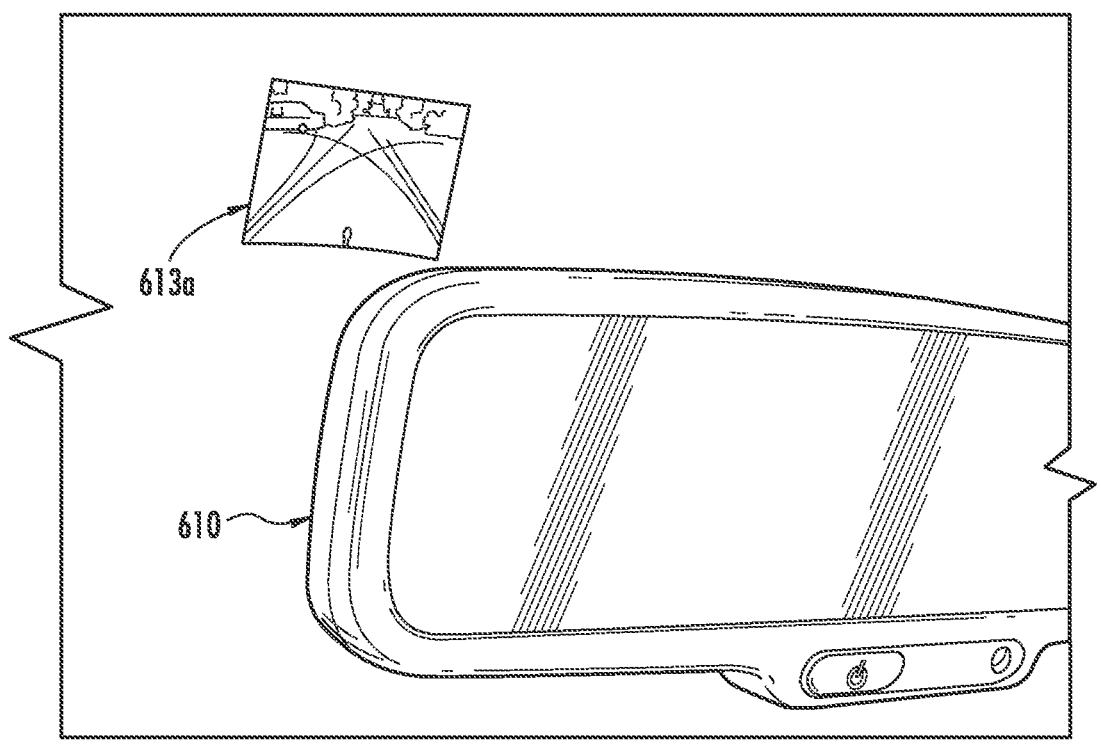
FIG. 35 is another perspective view of the mirror and display of FIGS. 32-34, with the display activated to project backup display information at the frit region of the windshield proximate the mirror assembly.
Figure 36:
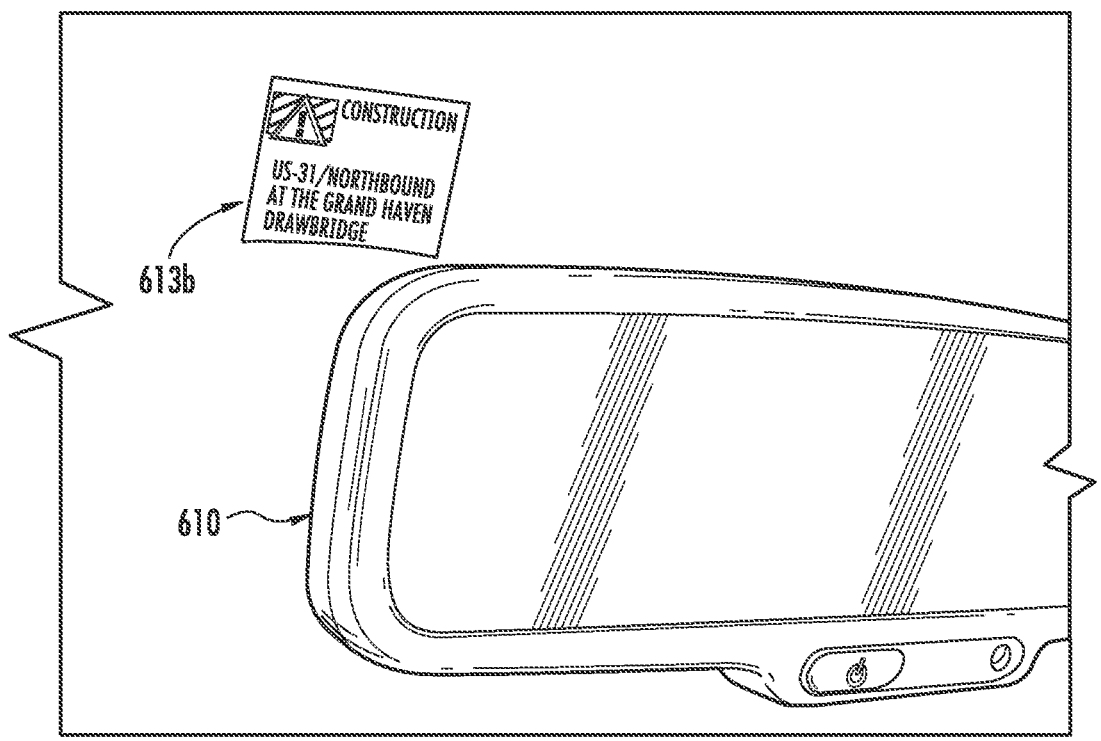
FIG. 36 is another perspective view of the mirror and display of FIGS. 32-35, with the display activated to project navigation display information at the frit region of the windshield proximate the mirror assembly.

As can be seen with reference to FIGS. 33 and 34, display device 612 is disposed at the rear casing of the mirror assembly and is operable to project a mirror image of the display information toward the windshield so that the display information is viewable in its proper orientation and format by the driver of the vehicle when viewing generally forwardly and toward the mirror assembly. As shown in FIGS. 33 and 34, the display device may display temperature data or information 613 or compass heading data or information, such as automatically or in response to a user input. Optionally, and as shown in FIG. 35, the display device 612 may project or emit other information, such as, for example, video images 613a, such as video images captured by a video camera of the vehicle, such as video images captured by a rearward viewing reverse aid camera to assist the driver in maneuvering the vehicle in reverse (and which may be activated in response to the driver selecting the reverse gear of the vehicle). Optionally, and as shown in FIG. 36, the display device 612 may project or emit navigational information 613b, such as direction heading information or a selected route information or the like, such as in response to a navigation system of the mirror assembly or vehicle or the like. Optionally, the display device may display other information, depending on the particular application of the mirror and display system and the desired or appropriate information being displayed to the driver of the vehicle by the display device.

Optionally, the windshield display mirror may incorporate an LCD element, a LED element or a VFD display element or the like situated on the forward side of the mirror (toward the windshield). The display is thus situated so as to allow the driver to see a reflection of the display on the windshield and generally at the tinted area of the windshield. To improve the contrast of the display, a dark tint can be added to the windshield in the area where the reflection of the display is to be viewed. Such a configuration is readily accommodated, since many vehicles already have a dark tint or shade-band or the like in the area above and about the mirror assembly. Optionally, the tint may be a smoke-colored tint similar to that used for the privacy windows in limousines, rather than blue tint or dots painted on the surface of the glass, but other tinting configurations may be implemented while remaining within the spirit and scope of the present invention.

Optionally, the interior mirror assembly may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are all hereby incorporated by reference herein in their entireties. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly.

Optionally, the mirror assembly may include one or more displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,338,177; 7,274,501; 7,255,451; 7,195,381; 7,184,190; 5,668,663; 5,724,187 and/or 6,690,268, and/or in U.S. patent application Ser. No. 11/520,193, filed Sep. 13, 2006, now U.S. Pat. No. 7,581,859; Ser. No. 12/091,525, filed Apr. 25, 2008, now U.S. Pat. No. 7,855,755; Ser. No. 11/226,628, filed Sep. 14, 2005, and published Mar. 23, 2006 as U.S. Publication No. US 2006/0061008; Ser. No. 10/538,724, filed Jun. 13, 2005, and published Mar. 9, 2006 as U.S. Publication No. US 2006/0050018; and/or Ser. No. 11/912,576, filed Oct. 25, 2007, now U.S. Pat. No. 7,626,749, which are all hereby incorporated herein by reference in their entireties, so that the displays are viewable through the reflective element, while the display area still functions to substantially reflect light, in order to provide a generally uniform prismatic reflective element even in the areas that have display elements positioned behind the reflective element. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, which are all hereby incorporated herein by reference in their entireties.

Optionally, the interior rearview mirror assembly may comprise a prismatic mirror assembly or a non-electro-optic mirror assembly or an electro-optic or electrochromic mirror assembly. For example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371; and 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,274,501; 7,249,860; 7,289,037; 7,338,177; and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties. The camera or camera module may comprise any suitable camera or imaging sensor, and may utilize aspects of the cameras or sensors described in U.S. patent application Ser. No. 12/091,359, filed Apr. 24, 2008; and/or Ser. No. 10/534,632, filed May 11, 2005 and published Aug. 3, 2006 as U.S. Patent Publication No. US-2006-0171704A1, now U.S. Pat. No. 7,965,336; and/or U.S. Pat. No. 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; and 7,004,606; and/or U.S. patent application Ser. No. 11/315,675, filed Dec. 22, 2005 and published Aug. 17, 2006 as U.S. Patent Publication No. US-2006-0184297A1, now U.S. Pat. No. 7,720,580; and/or Ser. No. 10/534,632, filed May 11, 2005 and published Aug. 3, 2006 as U.S. Patent Publication No. US-2006-0171704A1, now U.S. Pat. No. 7,965,336, and/or PCT Application No. PCT/US2008/076022, filed Sep. 11, 2008, published Mar. 19, 2009 as International Publication No. WO 2009/036176, and/or PCT Application No. PCT/US2008/078700, filed Oct. 3, 2008, published on Apr. 9, 2009 as International Publication No. WO 2009/046268, which are all hereby incorporated herein by reference in their entireties.

The camera module and circuit chip or board and imaging sensor of the present invention may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; and 7,339,149, and U.S. patent application Ser. No. 11/105,757, filed Apr. 14, 2005, now U.S. Pat. No. 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; and 6,946,978, and/or in U.S. patent application Ser. No. 10/643,602, filed Aug. 19, 2003, now U.S. Pat. No. 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,038,577; 5,929,786 and/or 5,786,772, and/or U.S. patent application Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional application Ser. No. 60/618,686, filed Oct. 14, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. patent application Ser. No. 11/201,661, filed Aug. 11, 2005, now U.S. Pat. No. 7,480,149; and/or Ser. No. 11/226,628, filed Sep. 14, 2005, and published on Mar. 23, 2006 as U.S. Publication No. US 2006/0061008, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. An interior rearview minor system of a vehicle, said interior rearview mirror system comprising:

an interior rearview mirror assembly having a reflective element, wherein said reflective element comprises a front substrate and a rear substrate and an electro-optic medium disposed between said front substrate and said rear substrate and bounded by a perimeter seal;

wherein said front substrate has a first surface that generally faces a driver of the vehicle when said interior rearview minor assembly is normally mounted at the vehicle, and wherein said front substrate has a second surface opposite said first surface;

wherein said second surface of said front substrate has a transparent conductive coating established thereat;

wherein said rear substrate has a third surface that contacts said electro-optic medium and a fourth surface opposite said third surface, and wherein said third surface of said rear substrate has a metallic mirror reflector established thereat;

wherein the surface area of said first surface is larger than the surface area of said third surface and wherein no part of said rear substrate extends beyond any part of said front substrate to be viewable by a viewer viewing said first surface of said front substrate;

wherein said reflective element comprises (i) an electro-optic active region where said electrochromic medium is disposed and is bounded by said perimeter seal and (ii) a user input region outboard of said electro-optic active region;

wherein a hiding band is disposed at said second surface of said front substrate and at a location that generally corresponds to said perimeter seal when said front and rear substrates are mated together, and wherein said hiding band substantially hides said perimeter seal from view by a viewer viewing said first surface of said front substrate;

at least one backlit user input disposed at said reflective element at said user input region and outboard of said perimeter seal and said electro-optic medium, wherein said at least one backlit user input comprises a capacitive touch sensor;

wherein an isolation line is established at said second surface of said front substrate to electrically isolate a first portion of said transparent conductive coating that is at said user input region and outboard of said perimeter seal and said electro-optic medium from a second portion of said transparent conductive coating that is at said electro-optic active region and in contact with said electro-optic medium;

wherein said isolation line is established via scribing said transparent conductive coating at said second surface of said front substrate; and a control, wherein said control is operable to determine a location of a touch or proximity of a finger of a user that is at or near said first surface of said front substrate at said user input region, and wherein said control generates an output signal indicative of a determined touch or proximity of a finger of a user.

2. The interior rearview mirror system of claim 1, wherein said perimeter seal covers said isolation line.

3. The interior rearview mirror system of claim 1, comprising a display device comprising a display representative of a plurality of individual alphanumeric input characters, wherein said plurality of individual alphanumeric input characters of said display device is backlit by a backlighting device, and wherein said display device is backlit by said backlighting device responsive to at least one of (i) a user input, (ii) a signal indicative of an initial ignition-on condition, (iii) the vehicle ignition on and the vehicle not in motion, and (iv) the vehicle ignition on and the vehicle engine not running, and wherein said backlighting device is deactivated in response to at least one of (a) a period of time elapsing following the activation of said backlighting device, (b) a period of time elapsing following detection of a touch or proximity of an object at said reflective element, and (c) movement of the vehicle, and wherein said interior rearview mirror assembly includes an indicator responsive to a detection of an object rearward of the vehicle and responsive to at least one of a distance to the detected object and a location of the detected object, and wherein said interior rearview mirror assembly includes a microphone, and wherein said mirror system provides a recording function at said mirror assembly and wherein an operator can selectively activate and control a record and playback device of said interior rearview mirror assembly.

4. The interior rearview mirror system of claim 1, wherein said at least one backlit user input comprises a plurality of individual reconfigurable inputs that provide enhanced user selection and control of accessories associated with said interior rearview mirror assembly.

5. The interior rearview mirror system of claim 4, wherein said plurality of individual reconfigurable inputs are operable to control and change features of said interior rearview mirror system.

6. The interior rearview mirror system of claim 1, wherein said at least one backlit user input comprises a plurality of backlit user inputs.

7. The interior rearview mirror system of claim 6, wherein said plurality of backlit user inputs are part of a touch screen.

8. The interior rearview mirror system of claim 7, wherein said touch screen comprises a projective capacitive touch screen.

9. The interior rearview mirror system of claim 1, wherein said control is operable to determine a location of a touch or proximity at said first surface by sensing a change in frequency of an oscillator and determining the location of the touch or proximity responsive to the determined change in frequency.

10. The interior rearview mirror system of claim 9, wherein circuitry including said oscillator is disposed in said interior rearview mirror assembly.

11. The interior rearview mirror system of claim 10, wherein said circuitry comprises a counter and a multiplexer.

12. The interior rearview mirror system of claim 11, wherein said isolation line is established via laser scribing said transparent conductive coating at said second surface of said front substrate.

13. An interior rearview mirror system of a vehicle, said interior rearview mirror system comprising:

an interior rearview mirror assembly having a reflective element, wherein said reflective element comprises a front substrate and a rear substrate and an electro-optic medium disposed between said front substrate and said rear substrate and bounded by a perimeter seal;

wherein said front substrate has a first surface that generally faces a driver of the vehicle when said interior rearview mirror assembly is normally mounted at the vehicle, and wherein said front substrate has a second surface opposite said first surface;

wherein said second surface of said front substrate has a transparent conductive coating established thereat;

wherein said rear substrate has a third surface that contacts said electro-optic medium and a fourth surface opposite said third surface, and wherein said rear substrate has a mirror reflector established at a surface thereof;

wherein said reflective element comprises (i) an electro-optic active region where said electrochromic medium is disposed and is bounded by said perimeter seal and (ii) a user input region outboard of said electro-optic active region;

wherein a hiding band is disposed at said second surface of said front substrate and at a location that generally corresponds to said perimeter seal when said front and rear substrates are mated together, and wherein said hiding band substantially hides said perimeter seal from view by a viewer viewing said first surface of said front substrate;

at least one backlit user input disposed at said reflective element at said user input region and outboard of said perimeter seal and said electro-optic medium, wherein said at least one backlit user input comprises a capacitive touch sensor;

wherein an isolation line is established at said second surface of said front substrate to electrically isolate a first portion of said transparent conductive coating that is at said user input region and outboard of said perimeter seal and said electro-optic medium from a second portion of said transparent conductive coating that is at said electro-optic active region and in contact with said electro-optic medium;

wherein said perimeter seal covers said isolation line;

wherein said isolation line is established via laser scribing said transparent conductive coating at said second surface of said front substrate; and a control, wherein said control is operable to determine a location of a touch or proximity of a finger of a user that is at or near said first surface of said front substrate at said user input region, and wherein said control generates an output signal indicative of a determined touch or proximity of a finger of a user.

14. The interior rearview mirror system of claim 13, wherein said at least one backlit user input comprises a plurality of individual reconfigurable inputs that provide enhanced user selection and control of accessories associated with said interior rearview mirror assembly.

15. The interior rearview mirror system of claim 14, wherein said plurality of individual reconfigurable inputs are operable to control and change features of said interior rearview mirror system.

16. The interior rearview mirror system of claim 13, wherein said at least one backlit user input comprises a plurality of backlit user inputs.

17. The interior rearview mirror system of claim 13, wherein said control is operable to determine a location of a touch or proximity at said first surface by sensing a change in frequency of an oscillator and determining the location of the touch or proximity responsive to the determined change in frequency.

18. An interior rearview mirror system of a vehicle, said interior rearview mirror system comprising:

an interior rearview mirror assembly having a reflective element, wherein said reflective element comprises a front substrate and a rear substrate and an electro-optic medium disposed between said front substrate and said rear substrate and bounded by a perimeter seal;

wherein said front substrate has a first surface that generally faces a driver of the vehicle when said interior rearview mirror assembly is normally mounted at the vehicle, and wherein said front substrate has a second surface opposite said first surface;

wherein said second surface of said front substrate has a transparent conductive coating established thereat;

wherein said rear substrate has a third surface that contacts said electro-optic medium and a fourth surface opposite said third surface, and wherein said rear substrate has a mirror reflector established at a surface thereof;

wherein said reflective element comprises (i) an electro-optic active region where said electrochromic medium is disposed and is bounded by said perimeter seal and (ii) a user input region outboard of said electro-optic active region;

wherein a hiding band is disposed at said second surface of said front substrate and at a location that generally corresponds to said perimeter seal when said front and rear substrates are mated together, and wherein said hiding band substantially hides said perimeter seal from view by a viewer viewing said first surface of said front substrate;

at least one backlit user input disposed at said reflective element at said user input region and outboard of said perimeter seal and said electro-optic medium, wherein said at least one backlit user input comprises a projective capacitive touch sensor;

wherein an isolation line is established at said second surface of said front substrate to electrically isolate a first portion of said transparent conductive coating that is at said user input region and outboard of said perimeter seal and said electro-optic medium from a second portion of said transparent conductive coating that is at said electro-optic active region and in contact with said electro-optic medium;

wherein said perimeter seal covers said isolation line; and a control, wherein said control is operable to determine a location of a touch or proximity of a finger of a user that is at or near said first surface of said front substrate at said user input region, and wherein said control generates an output signal indicative of a determined touch or proximity of a finger of a user.

19. The interior rearview mirror system of claim 18, wherein said at least one backlit user input comprises a plurality of backlit user inputs.

20. The interior rearview mirror system of claim 18, wherein said control is operable to determine a location of a touch or proximity at said first surface by sensing a change in frequency of an oscillator and determining the location of the touch or proximity responsive to the determined change in frequency.

* * * * *

UNITED STATES PATENT AND TRADEMARK OFFICE
CERTIFICATE OF CORRECTION

| | |
|---|---|
| PATENT NO. | : 8,508,383 B2 |
| APPLICATION NO. | : 13/429544 |
| DATED | : August 13, 2013 |
| INVENTOR(S) | : Kenneth C. Peterson et al. |

It is certified that error appears in the above-identified patent and that said Letters Patent is hereby corrected as shown below:

In the Specification

Column 3
Line 5, "minor" should be --mirror--

Column 6
Line 43, "minor" should be --mirror--

Column 15
Line 14, "410h" should be --410b--

Column 19
Line 66, "1/2," should be --1/2--

Column 20
Line 31, "suoh" should be --such--
Line 62, "fit" should be --frit--

In the Claims

Column 24
Line 37, Claim 1, "minor" should be --mirror--
Line 46, Claim 1, "minor" should be --mirror--

Signed and Sealed this
Twenty-fourth Day of December, 2013

Margaret A. Focarino
*Commissioner for Patents of the United States Patent and Trademark Office*